(12) United States Patent
Nakagawa et al.

(10) Patent No.: US 8,694,460 B2
(45) Date of Patent: Apr. 8, 2014

(54) MOVEMENT DETERMINATION APPARATUS AND MOVEMENT DETERMINATION METHOD

(75) Inventors: Itaru Nakagawa, Kawasaki (JP); Kazuo Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 13/004,115

(22) Filed: Jan. 11, 2011

(65) Prior Publication Data
US 2011/0178979 A1 Jul. 21, 2011

(30) Foreign Application Priority Data

Jan. 15, 2010 (JP) .................................. 2010-7390

(51) Int. Cl.
*G06F 17/00* (2006.01)
(52) U.S. Cl.
USPC ........................... 706/54; 340/988; 455/456.1
(58) Field of Classification Search
USPC ............................................ 706/54; 304/992
See application file for complete search history.

(56) References Cited

U.S. PATENT DOCUMENTS

| | | | |
|---|---|---|---|
| 6,342,847 B1* | 1/2002 | Archuleta et al. | 340/988 |
| 6,970,796 B2 | 11/2005 | Tashev | |
| 7,199,726 B2* | 4/2007 | Fomukong | 340/988 |
| 7,243,001 B2* | 7/2007 | Janert et al. | 700/214 |
| 7,487,056 B2 | 2/2009 | Tashev | |
| 2007/0149216 A1* | 6/2007 | Misikangas | 455/456.1 |
| 2007/0247316 A1* | 10/2007 | Wildman et al. | 340/572.4 |
| 2008/0248815 A1* | 10/2008 | Busch | 455/456.5 |
| 2009/0005987 A1* | 1/2009 | Vengroff et al. | 701/300 |
| 2009/0319560 A1* | 12/2009 | Cheng et al. | 707/102 |
| 2010/0127919 A1* | 5/2010 | Curran et al. | 342/357.07 |
| 2010/0139576 A1* | 6/2010 | Kim et al. | 119/721 |
| 2012/0115475 A1* | 5/2012 | Miyake et al. | 455/435.1 |

FOREIGN PATENT DOCUMENTS

| | | |
|---|---|---|
| JP | 2005-249789 A | 9/2005 |
| JP | 4302474 | 5/2009 |
| JP | 2010-257309 | 11/2010 |

OTHER PUBLICATIONS

Japanese Office Action mailed Nov. 26, 2013 for corresponding Japanese Application No. 2010-007390, with partial English-language translation.

* cited by examiner

*Primary Examiner* — Jeffrey A Gaffin
*Assistant Examiner* — David H Kim
(74) *Attorney, Agent, or Firm* — Fujitsu Patent Center

(57) ABSTRACT

A movement determination apparatus includes an acquiring unit that acquires a plurality of position information of an object at desired periods, a classifying unit that classifies the plurality of position information acquired by the acquiring unit into a plurality of measurement segments, an estimating unit that estimates existence regions of the object in the plurality of measurement segments, on a basis of the classified plurality of position information, and a determining unit that determines movement of the object position by comparing the existence regions.

18 Claims, 51 Drawing Sheets

FIG. 6

HISTORY FILE 151

| LOCATING -DEVICE ID | ACQUIREMENT DATE AND TIME | ESTIMATED COORDINATE POINTS | ERROR REGION | SEGMENT |
|---|---|---|---|---|
| A | 04/01 : 09 : 05 : 00 | (x95, y95) | .... | 9-10 O'CLOCK |
| A | 04/01 : 09 : 15 : 00 | (x95, y915) | .... | |
| A | 04/01 : 09 : 25 : 00 | ⋮ | ⋮ | |
| ⋮ | .... | | | |
| A | 04/01 : 09 : 55 : 00 | | | |
| A | 04/01 : 10 : 05 : 00 | .... | .... | 10-11 O'CLOCK |
| A | 04/01 : 10 : 15 : 00 | | | |
| A | 04/01 : 10 : 25 : 00 | ⋮ | ⋮ | |
| ⋮ | .... | | | |
| A | 04/01 : 10 : 55 : 00 | | | |
| A | 04/01 : 11 : 05 : 00 | .... | .... | 11-12 O'CLOCK |
| A | 04/01 : 11 : 15 : 00 | | | |
| A | 04/01 : 11 : 25 : 00 | ⋮ | ⋮ | |
| ⋮ | .... | | | |
| A | 04/01 : 11 : 55 : 00 | | | |

FIG. 7

EXISTENCE-REGION FILE 152

| LOCATING -DEVICE ID | SEGMENT | EXISTENCE REGION | MOVEMENT FLAG |
|---|---|---|---|
| A | 9-10 O'CLOCK | .... | 1 |
| A | 10-11 O'CLOCK | .... | .... |
| A | 11-12 O'CLOCK | .... | 1 |
| ⋮ | ⋮ | ⋮ | ⋮ |

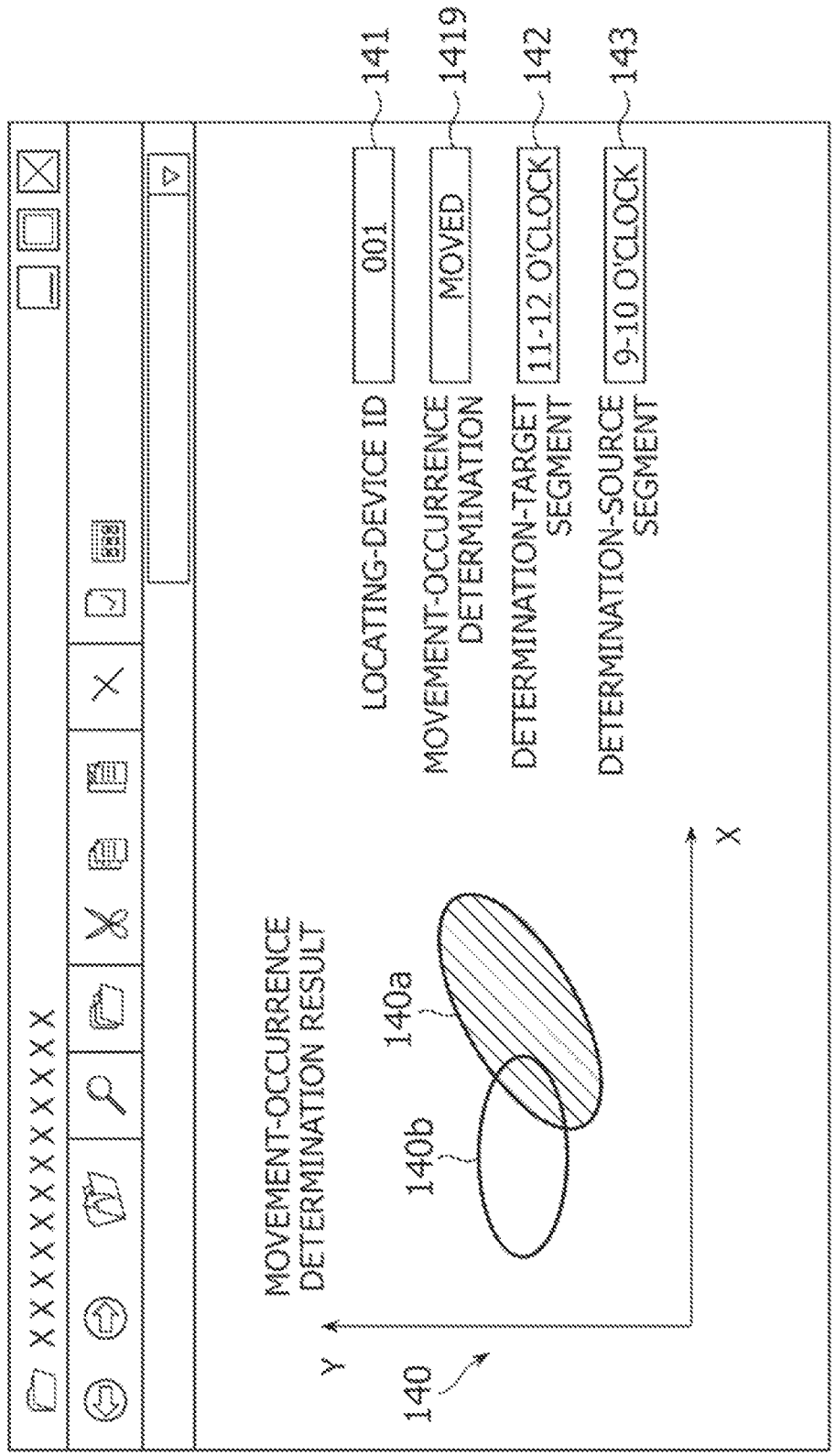

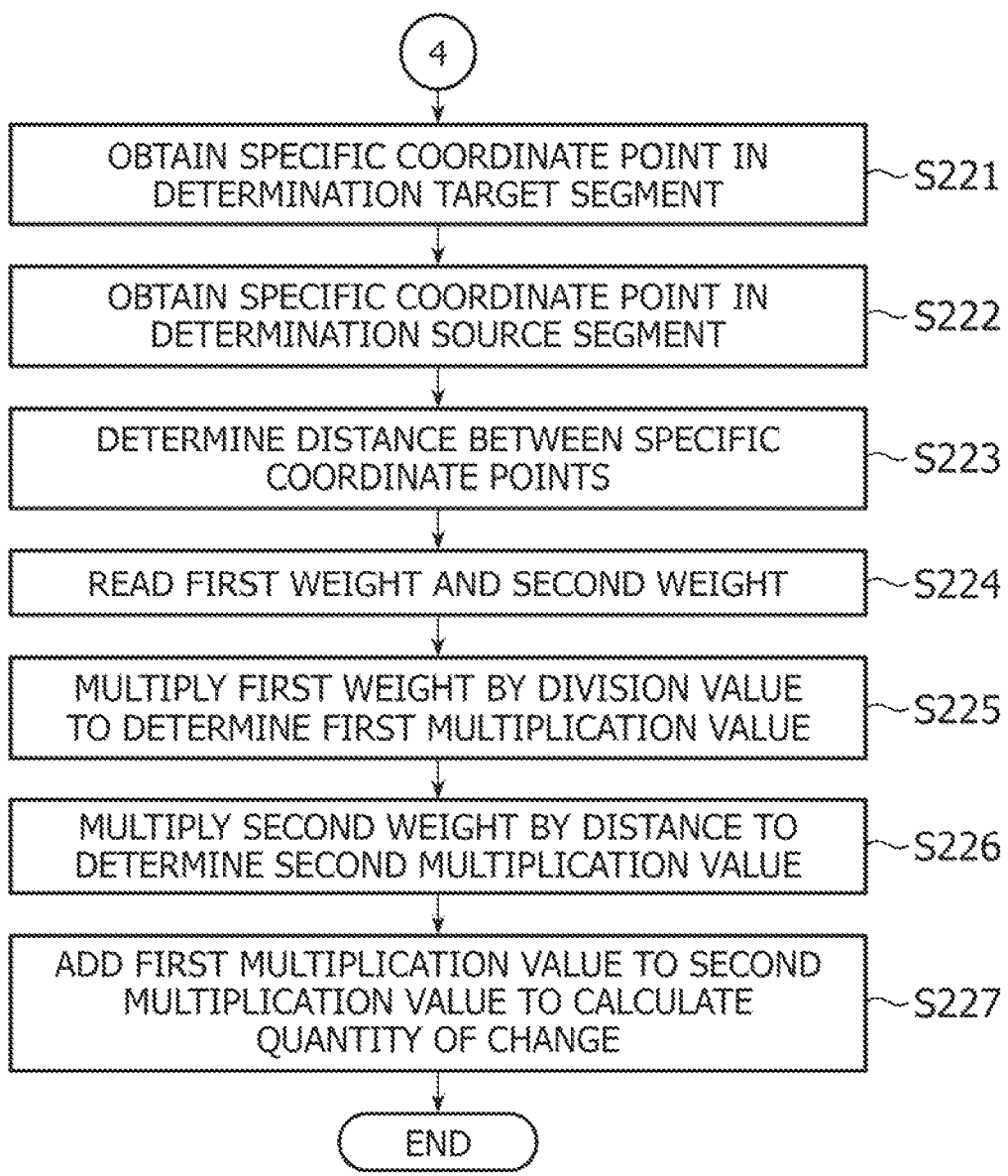

FIG. 33

GROUP FILE 153

| GROUP ID | LOCATING-DEVICE ID | DETERMINATION SEGMENT |
|---|---|---|
| 01 | A, B | 2009/04/01/10:00~10:10 |
| 02 | C, D | .... |
| 03 | F, G | .... |
| ⋮ | ⋮ | ⋮ |

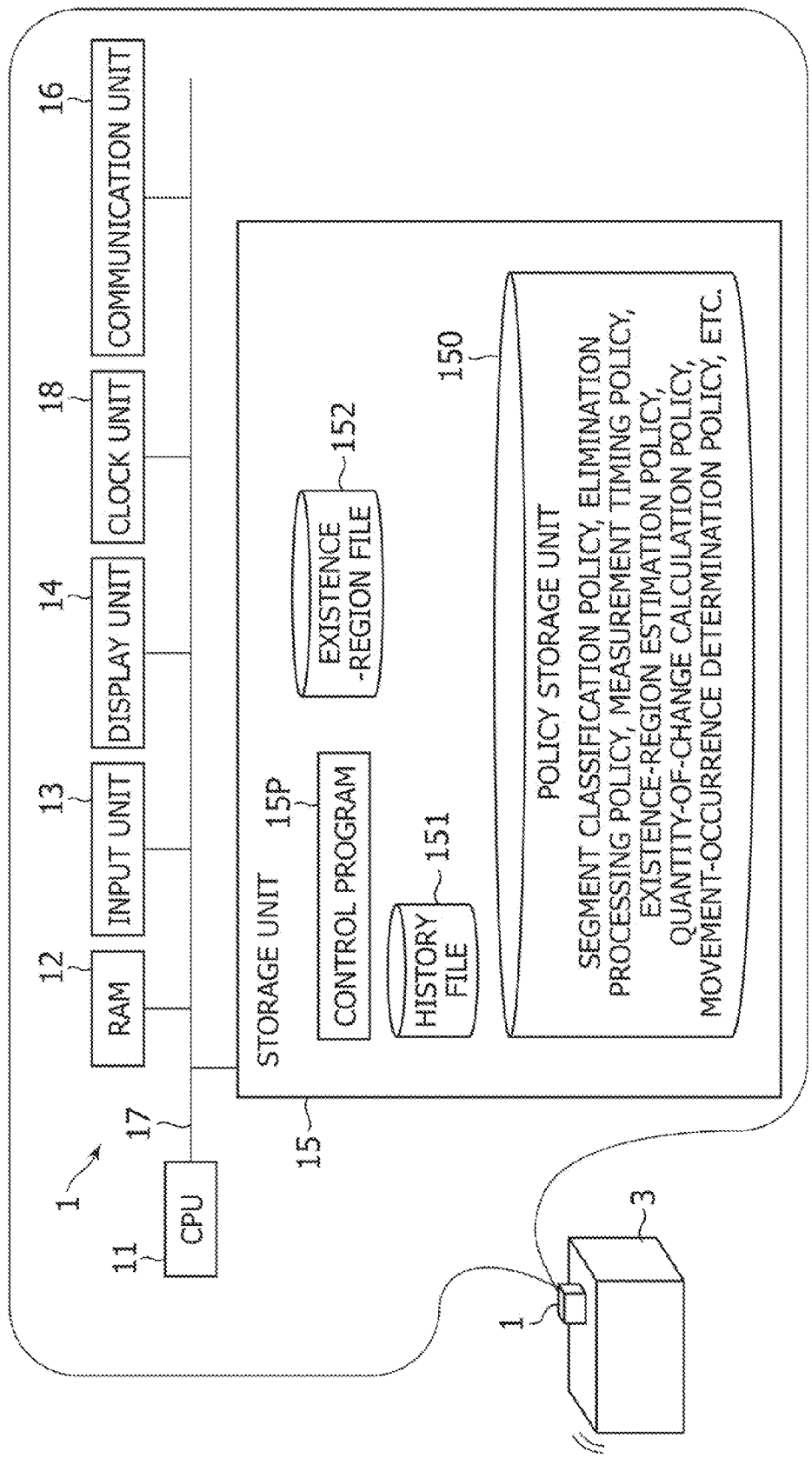

MOVEMENT DETERMINATION APPARATUS AND MOVEMENT DETERMINATION METHOD

CROSS-REFERENCE TO RELATED APPLICATIONS

This application is based upon and claims the benefit of priority of the prior Japanese Patent Application No. 2010-007390, filed on Jan. 15, 2010, the entire contents of which are incorporated herein by reference.

FIELD

The present invention relates to a movement determination apparatus and a movement determination method.

BACKGROUND

In position-location technology, position location systems using GPS (global positioning systems), cellular phone base stations, wireless LAN (local area networks), or the like are used to locate the positions of objects. Since such position location systems involve errors, technologies for performing object position estimation with high-accuracy has been proposed (e.g., refer to Japanese Laid-open Patent Application No. 2005-249789).

SUMMARY

According to an aspect of an embodiment, a movement determination apparatus includes an acquiring unit that acquires a plurality of position information of an object at desired periods, a classifying unit that classifies the plurality of position information acquired by the acquiring unit into a plurality of measurement segments, an estimating unit that estimates existence regions of the object in the plurality of measurement segments, on a basis of the classified plurality of position information, and a determining unit that determines movement of the object position by comparing the existence regions.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of a record layout of a history file;

FIG. 7 illustrates an example of a record layout of an existence-region file;

FIG. 18 illustrates a first example of a display image of determination results;

FIGS. 21A and 21B are flowcharts illustrating a second example of a processing procedure for calculating a quantity of change;

FIG. 33 illustrates an example of a record layout of a group file;

FIG. 44 illustrates a fifth example of a determination system.

DESCRIPTION OF EMBODIMENTS

The above-described errors vary depending on various factors, and therefore, the related art has a problem in that a determination as to whether or not an object moved cannot be made properly.

First Embodiment

Figure 1:
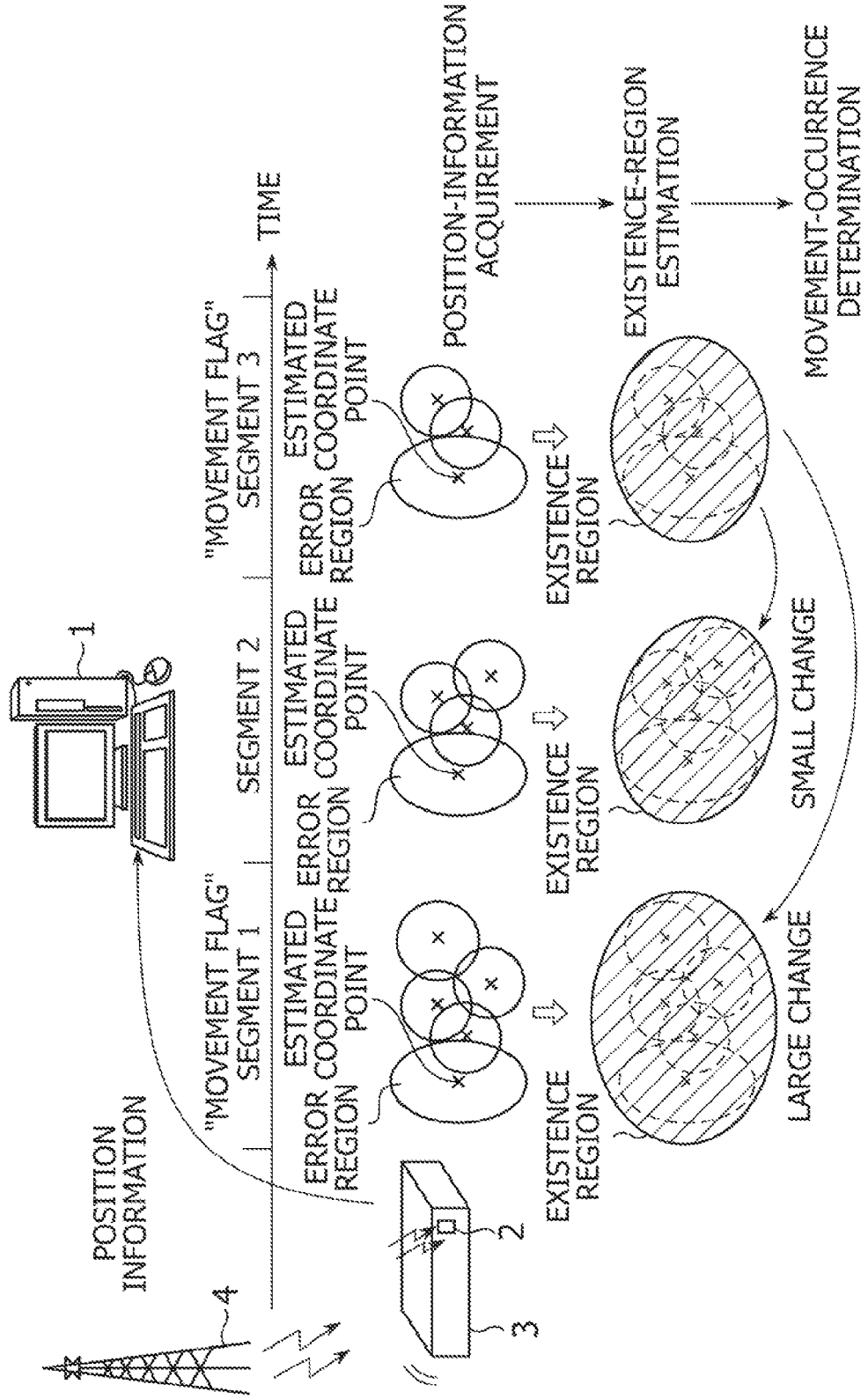
FIG. 1 illustrates a first example of a determination system.

FIG. 1 illustrates a first example of a determination system. The determination system includes a determination apparatus 1, a locating device 2, an object 3, and a base station 4. The object 3 is placed at/in, for example, a factory, an office, a facility, a shop, or the like. Examples of the object 3 include a machine tool, a server computer, a personal computer, a copy machine, an electronic device, a conveyer, a person, an animal, a painting, jewelry, and so on. A description in the present embodiment is given of an example in which the object 3 is a machine tool (hereinafter referred to as a machine tool 3) movably placed in a factory. The locating device 2 is attached to the machine tool 3 to measure (locate) the position of the machine tool 3 at desired periods. The locating device 2 transmits information of the located position to the determination apparatus 1.

The position location may be performed using for example, a GPS (global positioning system) or a position location system using a wireless LAN (local area network), WiMAX (Worldwide Interoperability for Microwave Access), Bluetooth®, or a cellular phone base station. In addition, some of such locating systems may also be used depending on the situation. In the present embodiment, a description will be given of an example of a position location system using the base station 4 for cellular phones. In the position location system using cellular phones, latitude and longitude at which the locating device 2 (the machine tool 3) is estimated to exist (a point indicated by the latitude and longitude may hereinafter be referred to as an "estimated coordinate point") or an error region in which the locating device 2 is likely to exist centering at the estimated coordinate point is determined on the basis of an received signal strength value or an arrival time difference of radio waves transmitted from a plurality of base stations 4 and received by the locating device 2. A reception received signal strength value and an arrival time when the locating device 2 receives radio waves transmitted from the base stations 4 vary due to various factors such as a usage state and the number of timeframes. Because of the variations, the estimated coordinate point or the error region also vary (varies).

The locating device 2 sequentially transmits the estimated coordinate points and the error regions to the determination apparatus 1 as position information of the machine tool 3. The locating device 2 does not have to transmit both of the estimated coordinate points and the error regions to the determination apparatus 1. That is, the locating device 2 may transmit either the estimated coordinate points or the error regions to the determination apparatus 1. The determination apparatus 1 is, for example, a control terminal apparatus installed in a factory or the like and used for management, a PDA (personal digital assistance), a cellular phone, a server computer, or a personal computer. The determination apparatus 1 obtains a plurality of position information sequentially transmitted from the locating device 2 and stores the position information. The determination apparatus 1 classifies the obtained plurality of position information into measurement segments.

The measurement segments are a plurality of units for classifying the obtained plurality of position information. For example, the determination apparatus 1 classifies the position information obtained in a first hour into a first segment and classifies the position information obtained in the next hour into a next segment. The determination apparatus 1 may also classify a certain number of the plurality of position information, such as ten time-sequentially obtained samples, into one segment. For example, the determination apparatus 1 may classify ten pieces of position information obtained from 10:00 to 10:05 into a first segment and classify ten pieces of position information obtained from 10:05 to 10:07 into a next segment. In addition, the determination apparatus 1 may perform the segment classification on the basis of, for example, a signal received from the locating device 2. For example, when power of the locating device 2 or the machine tool 3 is turned on and is then turned off, the determination apparatus 1 may classify, as one segment, a plurality of position information transmitted in a timeslot from when the power is turned on until it is turned off. Conversely, when the power of the locating device 2 or the machine tool 3 is turned off and is then turned on, the determination apparatus 1 may classify, as one segment, the plurality of position information transmitted in a desired timeslot from when the power is turned on. The arrangement is not limited to the above-described example as long as the determination apparatus 1 classifies the obtained plurality of position information into a plurality of segments in accordance with such a predefined policy. The policy for the segment classification is hereinafter referred to as a "segment classification policy".

Estimated coordinate points indicated by x and error regions represented by shapes, for example ellipses, circles or polygons, surrounding the estimated coordinate points, as illustrated in FIG. 1, are classified into corresponding segments as position information. In the example of FIG. 1, five pieces of position information (i.e., estimated coordinate points and error regions) are obtained in the first hour, four pieces of position information are obtained in the next hour, and three pieces of position information are obtained in the last hour. Through control described below, the determination apparatus 1 estimates, for each segment, an existence region in which the locating device 2 is likely to exist, on the basis of the plurality of position information. Since the locating device 2 is integrally attached to the machine tool 3, the machine tool 3 may be read herein as the locating device 2, as appropriate.

In FIG. 1, three existence regions having elliptical shapes indicated by hatching are illustrated for segments 1 to 3. The determination apparatus 1 compares the existence regions in the segments with each other to determine whether or not the locating device 2 moved. A movement flag is set for a segment for which it is determined that locating device 2 moved. In the example of FIG. 1, during movement-occurrence determination with respect to the segment 3, a movement flag is set for the segment 1. The determination apparatus 1 makes a movement-occurrence determination on a segment subsequent to the segment for which the movement flag is set. In the example of FIG. 1, the determination apparatus 1 makes a movement-occurrence determination with respect to the segments 1 to 3. For example, when the existence region in the segment 3 and the existence region in the segment 2 are compared with each other, the quantity of change therebetween is small and thus the determination apparatus 1 determines that no movement occurred. In contrast, when the existence region in the segment 3 and the existence region in the segment 1 are compared with each other, the quantity of change therebetween is large and thus the determination apparatus 1 determines that the locating device 2 moved in the segment 3. Upon determining that the movement occurred in the segment 3, the determination apparatus 1 sets a movement flag for the segment 3. Details of the processing will be described below.

Figure 2:
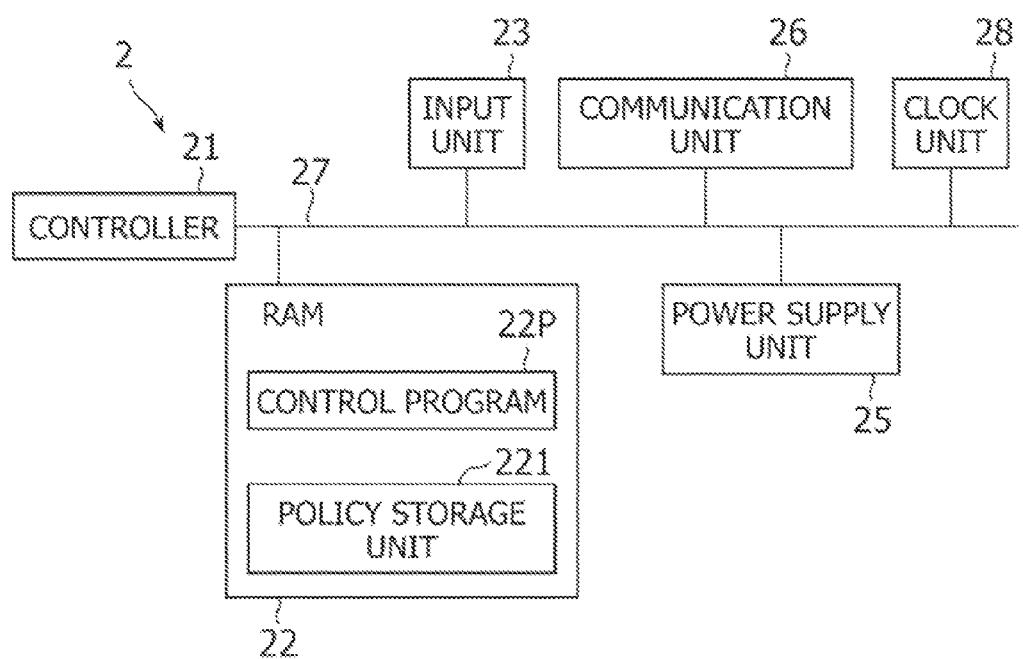
FIG. 2 is a diagram illustrating an example of hardware of a locating device.

FIG. 2 is a diagram illustrating an example of hardware of the locating device 2. The locating device 2 includes a controller 21, a RAM (random access memory) 22, an input unit 23, a power supply unit 25, a communication unit 26, and a clock unit 28. The controller 21 is implemented by, for example, a CPU (central processing unit) and is coupled to hardware units of the locating device 2 through a bus 27. Under the control of the controller 21, a control program 22P stored in the RAM 22 is executed to achieve various functions.

The input unit 23 may be an input device, such as a switch, a touch panel, or an operation button, and outputs received operation information to the controller 21. The power supply unit 25 supplies power, fed from an alternating-current power source or a battery, to the locating device 2. The input unit 23 has a switch for turning on or off power supply. When an on signal is output from the input unit 23, the power supply unit 25 supplies power to the locating device 2. On the other hand, when an off signal is output from the input unit 23, the power supply unit 25 stops power supply to the locating device 2.

The estimated coordinate point is a result of position location performed by the locating device 2 or latitude and longitude at which the locating device 2 is estimated to exist, the latitude and longitude being received from the base station 4. The error region has, for example, a circular shape, an elliptical shape, a polygonal shape, or the like having its center at the estimated coordinate point. Each time position location is performed, the estimated coordinate point or the error region varies depending on the state of radio waves. The base station 4 transmits a radius (or diameter), a lateral-axis length and a longitudinal-axis length, or the like to the locating device 2 as the error region. Although an example in which the locating device 2 receives the estimated coordinate point and the error region has been described in the present embodiment, the configuration is not limited thereto. For example, the locating device 2 may determine the estimated coordinate point at which the locating device 2 is estimated to exist, on the basis of the received signal strength value or the arrival time difference of radio waves received from the base stations 4.

The locating device 2 may further determine the error region in accordance with a communication quality, such as the strength of received radio waves, or the number of base stations 4 (or the number of access points in the case of a wireless LAN). For example, upon determining that the communication quality is high and the number of base stations 4 is also large, the locating device 2 may reduce the radius or the lateral-axis and longitudinal-axis lengths defining the error region and serving as a reference. Conversely, upon determining that the communication quality is low and the number of base stations 4 is also small, the locating device 2 may increase the radius or the lateral-axis and longitudinal-axis lengths defining the error region and serving as a reference. When the communication unit 26 (described below) has a GPS receiver, an altitude may also be used to indicate the estimated coordinate point in addition to the latitude and longitude.

The communication unit 26 is, for example, a communication module that includes an antenna for radio communication and that is used for radio communication. The communication unit 26 receives radio waves from the base stations 4. The communication unit 26 receives, from the base stations 4, the error region representing a range in which the locating device 2 is likely to exist or the estimated coordinate point at which the locating device 2 is estimated to exist. The locating device 2 may determine the estimated coordinate point or the error region by using, for example, a method described below. The communication unit 26 transmits the received or determined estimated coordinate point and error point to the determination apparatus 1. The communication unit 26 also transmits/receives the position information or information of policies or the like to/from the determination apparatus 1 in accordance with a desired protocol. The clock unit 28 outputs date-and-time information to the controller 21. A policy storage unit 221 stores the policies transmitted from the determination apparatus 1 via the communication unit 26. The policies include, for example, a measurement timing policy. The measurement timing policy is information specifying at which time the position location is to be performed and the position information is to be transmitted to the determination apparatus 1. The information specifies, for example, locating the position every 10 minutes and transmitting the position information, locating the position every 5 minutes and transmitting the position information while the power is supplied from the power supply unit 25, or locating the position every 2 minutes within the first 10 minutes in 1 hour and transmitting the position information. The measurement timing policy is to specify the intervals of the position location and is independent from the aforementioned segment classification policy. The communication unit 26 may further include a GPS receiver. In such a case, the GPS receiver may receive signals from GPS satellites and may obtain a coordinate point (coordinate values) including an altitude in a three-dimensional space in addition to the latitude and longitude on the basis of the received signals.

Specific measurement date and time may be stored in the policy storage unit 221 as the measurement timing policy. In addition, the determination apparatus 1 may transmit, to the locating device 2, a measurement instruction for the locating device 2 as the measurement timing policy at a timing stored in a policy storage unit (not illustrated) in the determination apparatus 1. In such a case, in accordance with the received measurement timing policy, the locating device 2 locates the position thereof and transmits the resulting position information to the determination apparatus 1.

Figure 3:
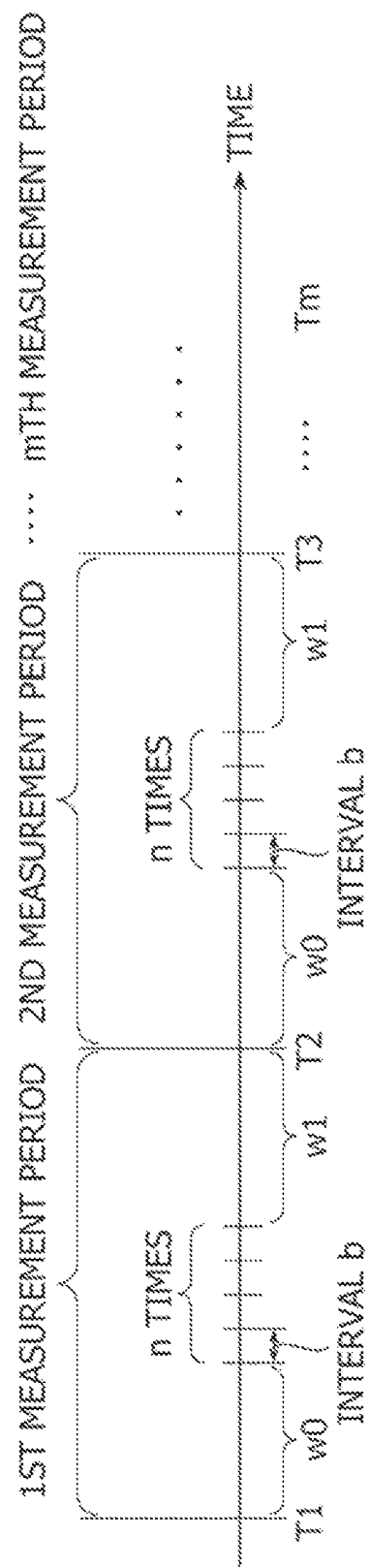
FIG. 3 illustrates an example of measurement timing.

In addition, the measurement timing policy may specify, for example, measurement timing as described below. FIG. 3 illustrates an example of measurement timing. The horizontal axis indicates time. Measurement start time Tm is given by:

$$Tm = T1 + (m-1)(w0 + b \times n + w1) \quad (1)$$

where m is an integer indicating the m-th measurement period, T1 denotes measurement-period start time of the first period, and Tm denotes measurement-period start time of the m-th measurement period. Further, n is an integer indicating the number of measurements in each measurement period, b denotes a measurement interval, w0 denotes a time from the measurement-period start time to the first measurement start time in the measurement period, and w1 denotes a time from the end time of the n-th measurement to the measurement-period end time.

As illustrated in FIG. 3, the measurement in each measurement period may be performed a plurality of times at desired intervals within a desired time in a measurement period. One of w0 and w1 may be 0. For example, it is assumed that T1 is 9:00, m is 2, w0 is 0, w1 is 4 hours, b is 1 minute, and n is 5. In this case, at 9:00 in a first measurement period, the measurement is performed five times at intervals of 1 minute. At 13:00 when 4 hours have passed from the first measurement period, the measurement start time T2 in a second measurement period is reached and the measurement in the second measurement period is executed again. As described above, various types of measurement-timing policy is available. In the present embodiment, for ease of description, a description is given of an example in which the measurement timing policy specifies that the measurement is performed six times every 10 minutes in a measurement period of 1 hour and the segment classification policy specifies that the plurality of position information obtained every 1 hour are classified.

Figure 4:
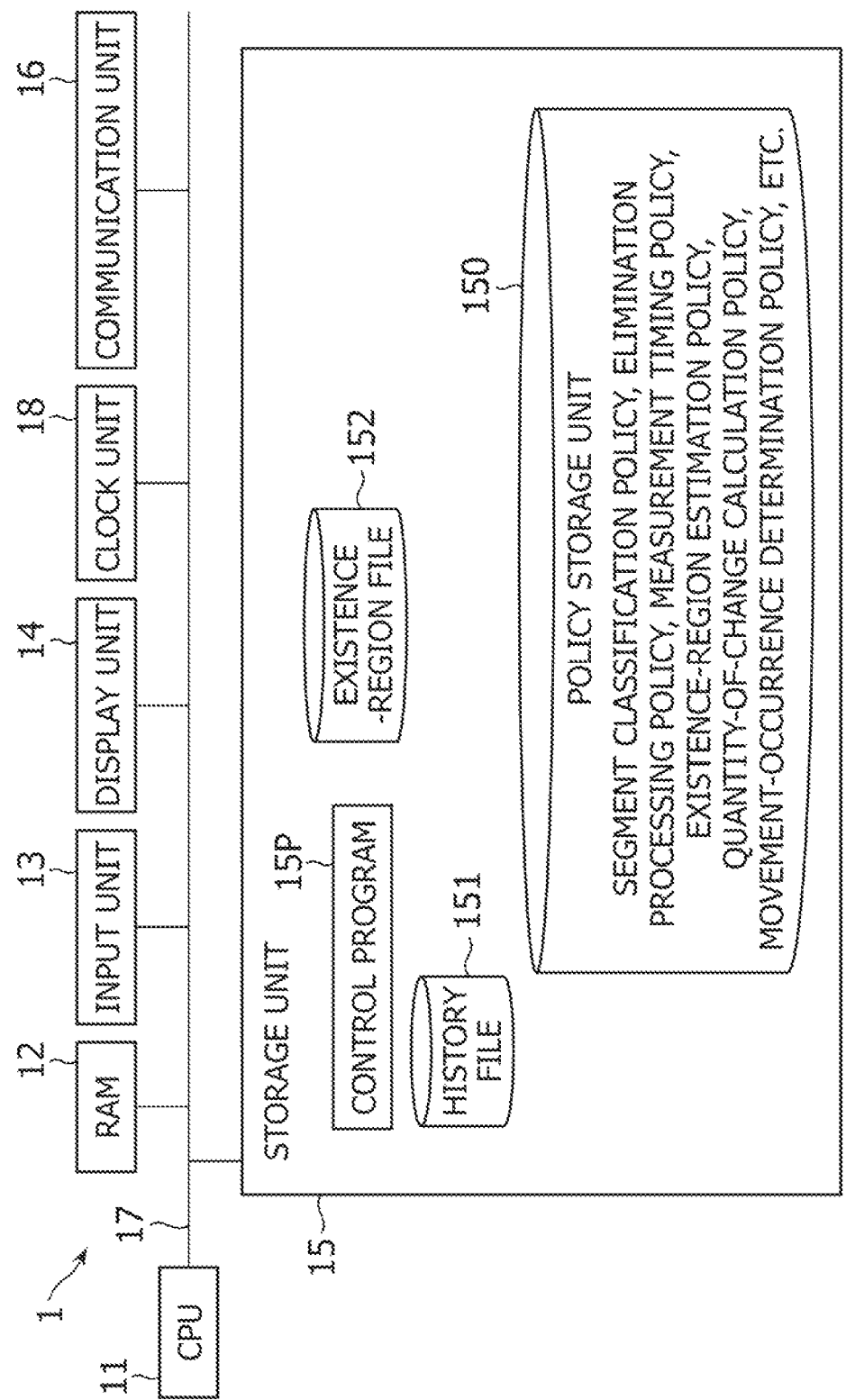
FIG. 4 is a diagram illustrating a first example of hardware of a determination apparatus.

FIG. 4 is a diagram illustrating a first example of hardware of the determination apparatus 1. The determination apparatus 1 includes a CPU 11, a RAM 12, an input unit 13, a display unit 14, a clock unit 18, a communication unit 16, and a storage unit 15. The CPU 11 is coupled to the individual hardware units through a bus 17. The storage unit 15 stores a control program 15P, which is executed under the control of the CPU 11 to achieve various functions. The RAM 12 is, for example, an SRAM (Static RAM), a DRAM (Dynamic RAM), or a flash memory. The RAM 12 temporarily stores various types of data generated when the CPU 11 executes programs.

The input unit 13 may be an input device, such as a keyboard, a mouse, or the like. Operation information input via the input unit 13 is output to the CPU 11. The display unit 14 may be a display device, such as a liquid crystal display or an organic EL (electroluminescence) display. Under the control of the CPU 11, desired information is displayed on the display unit 14. The clock unit 18 outputs date-and-time information to the CPU 11. The communication unit 16 has, for example, an Ethernet card. The communication unit 16 serves as an acquiring unit to acquire the position information transmitted via the communication unit 26 in the locating device 2. The communication unit 16 transmits/receives information to/from another computer (not illustrated) or the like in accordance with an HTTP (HyperText Transfer Protocol) or the like.

The storage unit 15 is, for example, a hard disk or a large-capacity memory and stores, for example, the control program 15P, a history file 151, an existence-region file 152, and a policy storage unit 150. The history file 151, the existence-region file 152, and the policy storage unit 150, and may be stored in another database or computer, so that the determination apparatus 1 reads information therefrom or writes information thereto, as needed. The determination apparatus 1 may also hold records, stored in the history file 151, into a database, memory, or the like other than a file. Under the control of the CPU 11, the control program 15P stored in the storage unit 15 is executed to achieve the functions of, for example, an acquiring unit 101, a classifying unit 102, an estimating unit 103, and a determining unit 104 (which are described below). Processing accomplished by the functions is described below with reference to flowcharts.

The policy storage unit 150 stores, for example, the segment classification policy, an filtering policy, a measurement timing policy, an existence-region estimation policy, a quantity-of-change calculation policy, and a movement-occurrence determination policy. The filtering policy specifies a condition regarding error regions or estimated coordinate points to be removed during estimation of the existence region. The existence-region estimation policy specifies a policy for estimating the existence region on the basis of the estimated coordinate points or the error regions. The quantity-of-change calculation policy specifies a policy for calculating a quantity of change between the existence regions in the segments. The movement-occurrence determination policy is a policy specifying at what value of the calculated quantity of change it is to be determined that a movement occurred. Details of the various policies described above are explained in conjunction with embodiments below.

Each of the policies may have multiple variations, and, for example, the contents thereof, such as the measuring timing, a calculation equation, a threshold, a weight, and the length of the segments, may be changed via the input unit 13, as needed. An operator may make arbitrary changes to the contents of the policy storage unit 150 in accordance with the type of the object 3. When changes are made to the policies stored in the policy storage unit 150, the determination apparatus 1 transmits the measurement timing policy to the locating device 2 via the communication unit 16. The determination apparatus 1 may transmit the filtering policy, together with the measurement timing policy, to the locating device 2. In such a case, the locating device 2 may execute filtering (described below). The locating device 2 receives the policies via the communication unit 16. The locating device 2 stores the received policies in the policy storage unit 221.

Figure 5:
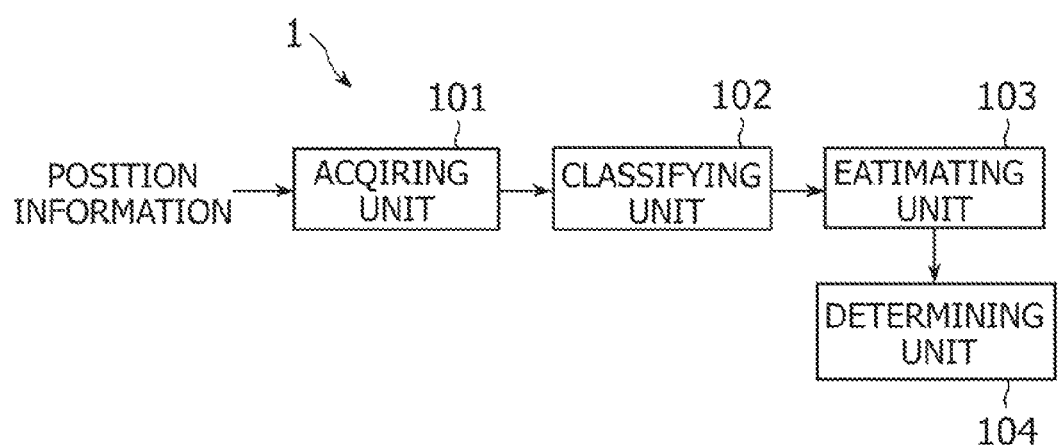
FIG. 5 is a diagram illustrating an example of a functional configuration of a determination apparatus.

FIG. 5 is a diagram illustrating an example of a functional configuration of the determination apparatus 1. Under the control of the CPU 11, the control program 15P stored in the storage unit 15 in the determination apparatus 1 is executed to achieve the functions of, for example, the acquiring unit 101, the classifying unit 102, the estimating unit 103, and the determining unit 104. Rather than execution of the control program 15P, a circuit for realizing the functions of the acquiring unit 101, the classifying unit 102, the estimating unit 103, and the determining unit 104 may also be integrated into the CPU 11.

The acquiring unit 101 acquires the position information transmitted from the locating device 2. The acquiring unit 101 outputs the acquired position information to the classifying unit 102. The classifying unit 102 classifies the plurality of the position information into measurement segments. The classifying unit 102 transmits, to the estimating unit 103, the position information classified into the segments.

The estimating unit 103 estimates the existence region of the locating device 2 for each segment. The estimating unit 103 outputs, to the determining unit 104, the existence region estimated for each segment. The determining unit 104 compares the existence regions in the respective segments with each other to determine whether or not the locating device 2 moved.

FIG. 6 illustrates an example of a record layout of the history file 151. The history file 151 stores history of the position information acquired from the locating device 2. The history file 151 has, for example, locating-device ID fields, acquirement date-and-time fields, estimated-coordinatepoint fields, and error-region fields, segment fields. Unique identification information (hereinafter referred to as a "locating-device ID") for identifying the locating device 2 is included in each locating-device ID field. In the present embodiment, an example in which one locating device 2 is used is described, and locating-device ID "A" is included in the locating-device ID field. Dates and times at which the plurality of position information acquired are time-sequentially included in the acquirement date-and-time fields. While a description is given of an example in which the date and time is output from the clock unit 18 when the communication unit 16 in the determination apparatus 1 obtains the position information, the date and time is not limited thereto. For example, the locating device 2 may obtain position-location date and time from the clock unit 28 and transmit the position-location date and time, together with the position information, to the determination apparatus 1. In such a case, the received position-location date and time is stored in the history file 151.

The estimated coordinate point of the locating device 2 is included in each estimated-coordinate-point field in association with the acquirement date and time. The estimated coordinate point may be indicated by not only the latitude and longitude but also XY coordinate values in an XY coordinate system which are converted from the latitude and longitude. When the latitude and longitude are converted into the XY coordinate values, the conversion may be performed, for example, with a desired latitude and longitude being the coordinate origin, an eastward direction being the X-axis positive direction, and a northward direction being the Y-axis positive direction. In the present embodiment, the specified coordinate point included in the estimated-coordinate-point field is described as being indicated by XY coordinate values. The coordinate values may be values obtained by segmenting the latitudes and longitudes into a mesh according to a desired resolution.

The error region in which the locating device 2 is likely to exist when the corresponding position information is acquired is included in each error-region field in association with the acquirement date and time. The radius of a circle having its center at the estimated coordinate point or the longitudinal-axis and lateral-axis lengths of an ellipse or a polygon having its center at the estimated coordinate point is/are included in each error-region field. For example, when a radius "200 m" is included, the error region is a circular region having a radius of 200 m and having at is center at the estimated coordinate point (x95, y95). When a lateral-axis length "100 m" and a longitudinal-axis length "200 m" are included, the error region is an elliptical region having its center at the estimated coordinate point (x95, y95) and having a lateral-axis length of 100 m and a longitudinal-axis length of 200 m. The number of coordinate points of the radius and the axis lengths, the number being obtained by dividing the length thereof by the length of each coordinate point, may be included in the error-region field.

The error region may be represented by coordinate values of a plurality of coordinate points, other than the radius of a circle or the longitudinal-axis and lateral-axis lengths of an ellipse. For example, when the acquirement date and time is 04/01 09:05:00, coordinate points (x94, y96), (x95, y97), (x98, y88), . . . including the estimated coordinate points (x95, y95) may be included in the error region field.

The segment classification policy or information for identifying a segment divided according to a signal received from the locating device 2 is included in the segment field. FIG. 6 illustrates an example of the segment classification policy and the measurement timing policy specifying that one segment is 1 hour, the measurement start time is 5 minutes every hour, and measurement is performed every 10 minutes. Six pieces of information, i.e., 09:05:00, 09:15:00, 09:25:00, 09:35:00, 09:45:00, and 09:55:00 on April 1, are classified and included as information in the segment of 9-10 o'clock. Subsequent to the information, six pieces of information, i.e., 10:05:00, 10:15:00, 10:25:00, 10:35:00, 10:45:00, and 10:55:00 on April 1, are classified and included as information in the segment of 10-11 o'clock. The determination apparatus 1 classifies the acquirement date and time by referring to the measurement timing policy and the acquirement dates and times pre-stored in the storage unit 15. The determination apparatus 1 stores segment information, such as 9-10 o'clock and 10-11 o'clock in the segment fields in sequence. In the present embodiment, although an example in which the history of the position information for one locating device 2 is stored in the history file 151 is described for ease of description, the history of the position information for another locating device 2 may be stored in the history file 151.

FIG. 7 illustrates an example of a record layout of the existence-region file 152. The existence-region file 152 has, for example, locating-device ID fields, segment fields, existence-region fields, and movement-flag fields. The determination apparatus 1 may also hold records, stored in the existence-region file 152, into a database, memory, or the like other than a file, as in the case of history file 151. On the basis of the estimated coordinate points and error regions in the segments, the determination apparatus 1 determines (estimates) the existence region for each segment. The determination apparatus 1 may estimate the existence region on the basis of only the error regions, as described below. The determination apparatus 1 stores the estimated existence regions in the existence-region file 152 in association with the corresponding segments. The coordinate values of a specific coordinate point in the existence region and the length of the radius or the like may be included in each existence-region field as the existence region. For example, the center point of a shape and a radius "100 m" thereof, the center point corresponding to the specific coordinate point, may be stored in the existence-region field as the existence region. For example, the center point, a longitudinal axis "200 m", a lateral axis "50 m", and a gradient "30°" of an ellipse, the center point corresponding to the specific coordinate point, may also be included in the existence-region field as the existence region. In addition, the coordinate values of a barycenter coordinate point corresponding to the specific coordinate point and the coordinate values of vertexes of a triangle may be included in the existence-region field as the existence region. A group of the values of coordinate points in one existence region in which the locating device 2 is likely to exist in the segment may be included in the existence-region field. Information indicating whether or not the locating device 2 moved may be included in the movement-flag field. In the example of FIG. 7, a movement flag "1" indicates that a movement occurred and indicates that the locating device 2 moved in the segment of 9-10 o'clock and the segment of 11-12 o'clock.

Figure 8:
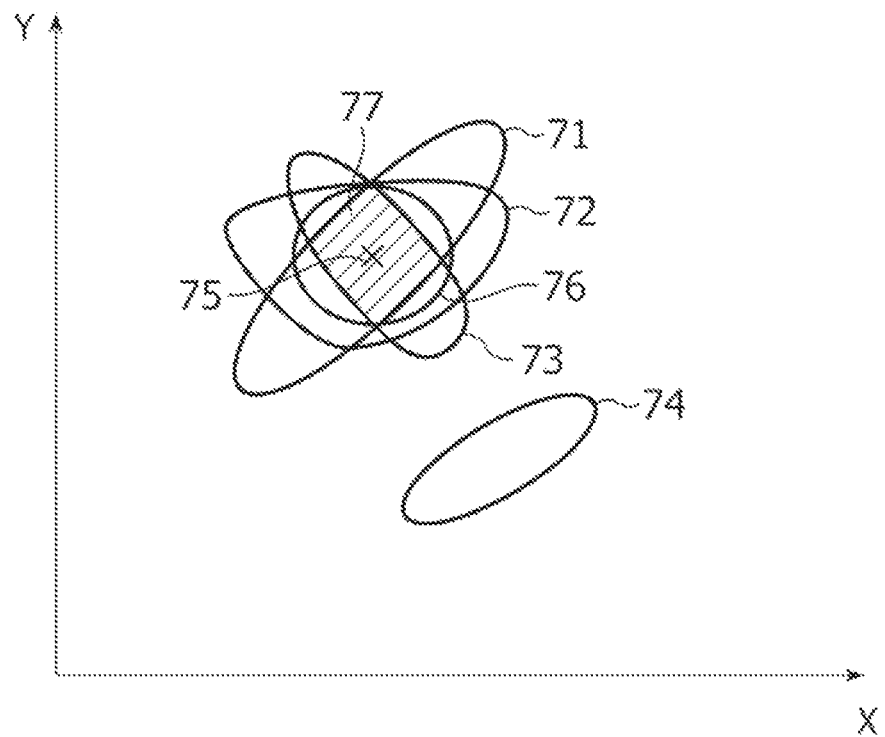
FIG. 8 illustrates an example of an existence region.

Processing for estimating the existence region will be described next. FIG. 8 illustrates an example of the existence region. The horizontal axis indicates an X coordinate value and the vertical axis indicates a Y coordinate value. In FIG. 8, shapes 71 to 74 represent error regions in a specific segment. The error regions 71 to 73 in FIG. 8 overlap each other. The error region 74 does not overlap the other error regions 71 to 73. The determination apparatus 1 reads the existence-region estimation policy from the policy storage unit 150. In the present embodiment, an example of the existence-region estimation policy will be described below. The determination apparatus 1 refers to the error regions in the history file 151 and determines, as an overlapping error region 77, a region in which a largest number of error regions 71 to 73 overlap each other out of regions in which the error regions overlap each other. In the example of FIG. 8, the overlapping error region 77 is indicated by hatching. For example, the determination apparatus 1 stores, in the existence-region file 152, the values of the coordinate points in the overlapping error region 77 as the existence region in association with the corresponding segment.

The determination apparatus 1 may also estimate the existence region in accordance with the number of overlapping error regions. For example, in the case of FIG. 8, since three error regions 71 to 73 overlap each other in the hatched region 77, the determination apparatus 1 determines the number of overlapping error regions is 3. The operator may pre-input the number of overlapping error regions, which serves as a threshold, via the input unit 13, so that the number of overlapping error regions is stored in the storage unit 15. Further, the determination apparatus 1 may estimate, as an existence region, the coordinate values of coordinate points at which the number of overlapping error regions is greater than or equal to the threshold. For example, when the threshold is 2, the determination apparatus 1 determines, as the existence region, a region in which two or more error regions overlap each other. The number of overlapping error regions is counted, for example, in the following manner by using coordinate points. The determination apparatus 1 counts the number of overlapping error regions for each coordinate point. For example, the number of overlaps at the coordinate points in the hatched region 77 is 3.

The determination apparatus 1 may estimate, as the existence region, a region that represented by a shape, for example a circle, an ellipse or a polygon having its center at the specific coordinate point of an overlapping error region and surrounding the overlapping regions. In such a case, the determination apparatus 1 reads the values of the coordinate points of the region represented by a desired shape surrounding the overlapping error region 77. The determination apparatus 1 calculates, for each of the coordinate points in the region represented by the desired shape, the distance between the coordinate point thereof and an arbitrary coordinate point in the overlapping error region 77. The determination apparatus 1 calculates, for each arbitrary coordinate point, a variance of the distance between the coordinate point and the arbitrary coordinate point. The determination apparatus 1 determines, as a center point 75 (a specific coordinate point) of the overlapping error region 77, a coordinate point at which the variance is the smallest. The determination apparatus 1 determines, as a radius, the largest one of the distances between the center point 75 and the coordinate points. The determination apparatus 1 determines, as an existence region 76, the values of the coordinate points belonging to the region defined by the radius determined relative to the center point 75 and stores, in the existence-region file 152, the existence region 76 for each segment.

The method for determining the center point 75, which corresponds to the specific coordinate point, is merely an example, and is not limiting. For example, the determination apparatus 1 reads the estimated coordinate points of the overlapping error regions 71, 72, and 73 from the history file 151. The average coordinate value of the X coordinate values and the average coordinate value of the Y coordinate values may be used as the coordinate values of the center point 75. The determination apparatus 1 stores, in the existence-region file 152, the coordinate points in an ellipse having its center at the center point 75 and including all coordinates in the hatched overlapping error region 77, in association with the corresponding segment. With respect to the existence region, not only the coordinate points but also the center point, the radius, the longitudinal-axis length of the ellipse, and/or the lateral-axis length of the ellipse may also be stored, as in the case of the error region. The determination apparatus 1 may also determine, as the existence region, a circumscribed graphic (such as a circumscribed ellipse, not illustrated) including all of the error regions 71 to 74 including the error region 74 that does not have a portion overlapping the other error regions 71 to 73.

Figure 9:
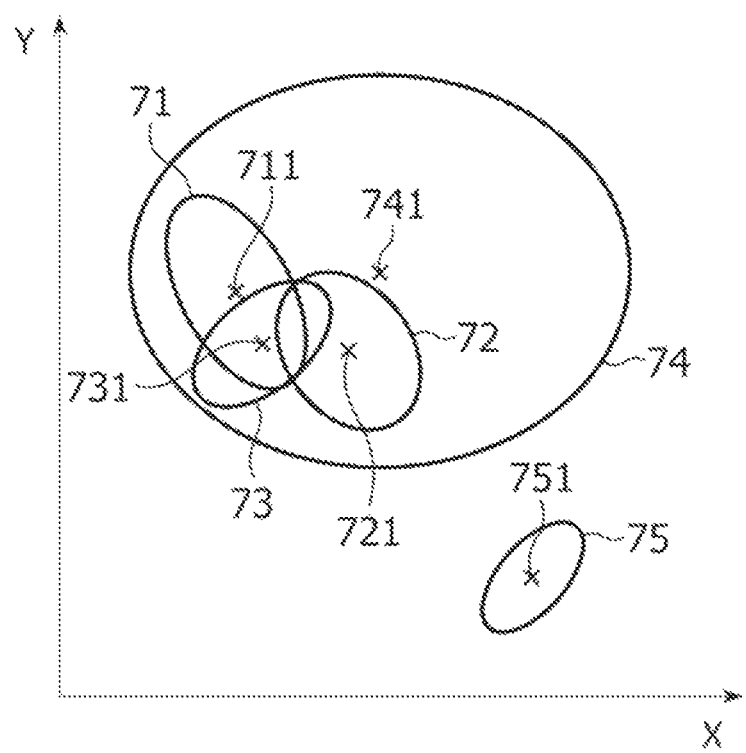
FIG. 9 illustrates an example of filtering.

During the existence-region estimation processing described above, the determination apparatus 1 may execute filtering so that position information that meets a desired condition is excluded from the existence-region determination, in order to improve the accuracy of the existence-region estimation processing. FIG. 9 illustrates an example of the filtering. FIG. 9 illustrates error regions 71 to 75. The determination apparatus 1 may exclude, from regions to be subjected to the existence-region estimation processing, an error region having a larger size than a desired threshold or an error region lying at a position farther than other error regions. The determination apparatus 1 reads the error regions and a threshold from the history file 151 and the storage unit 15. When the number of coordinate points in an error region is greater than or equal to the threshold or when the radius defining an error region, the longitudinal axis of the ellipse, or the like is greater than or equal to the threshold, the determination apparatus 1 filters the error region. In the example of FIG. 9, the error region 74 having a large area and the error region 75 lying at a distant position are filtered.

The determination apparatus 1 reads the estimated coordinate points in the segment from the history file 151. The determination apparatus 1 reads the filtering policy stored in the policy storage unit 150. In accordance with the filtering policy, the determination apparatus 1 determines average coordinate values on the basis of the X coordinate values and the Y coordinate values of the estimated coordinate points (a point indicated by the average coordinate values may hereinafter be referred to as an "average coordinate point"). When the distance (the number of coordinate points) between the estimated coordinate point and the average coordinate point is greater than or equal to a desired threshold, the determination apparatus 1 filters the corresponding estimated coordinate point and the error region. In the example of FIG. 9, an estimated coordinate point 711 of the error region 71, an estimated coordinate point 721 of the error region 72, an estimated coordinate point 731 of the error region 73, an estimated coordinate point 741 of the error region 74, and an estimated coordinate point 751 of the error region 75 exist. In this case, since the estimated coordinate point 751 of the error region 75 exists at a distant position, the error region 75 is excluded from the existence-region estimation processing. When no estimated coordinate point exists in the history file 151, the determination apparatus 1 may use, as the estimated coordinate point, a point at which the variance of the distances from the coordinate points in the region represented by the desired shape surrounding the error region is the smallest. Although an example in which the error regions are used has been described above, only the estimated coordinate points, without use of the error regions, may be used to estimate the existence region.

Figure 10:
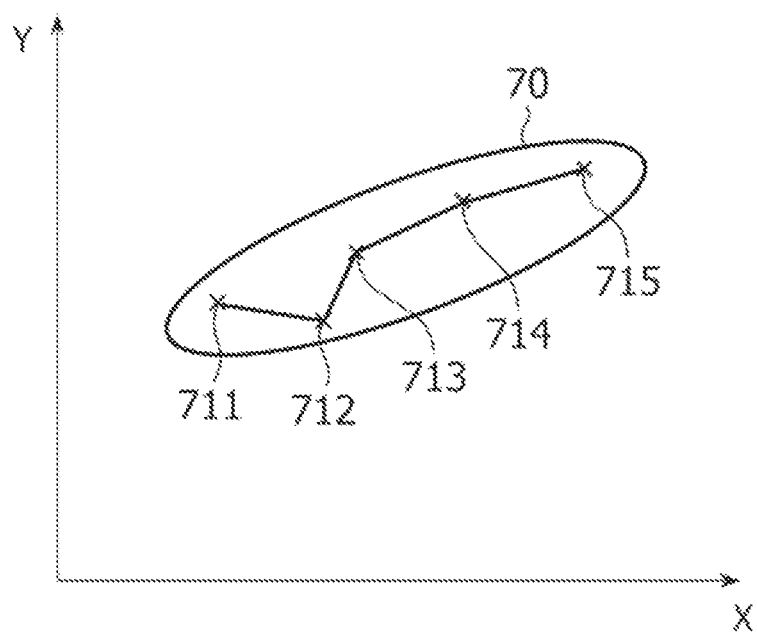
FIG. 10 illustrates an example of a method for determining an existence region on the basis of estimated coordinate points.

FIG. 10 illustrates an example of a method for determining an existence region on the basis of estimated coordinate points. FIG. 10 illustrates estimated coordinate points 711, 712, 713, 714, and 715 in a specific segment. The determination apparatus 1 may determine, as an existence region 70, coordinate points in a circular or ellipse including the estimated coordinate points 711 to 715.

In addition, the determination apparatus 1 may determine, as the existence region 70, a group of coordinate points that exist within a distance, pre-stored in the storage unit 15, from a group of line segments coupling all of the estimated coordinate points 711 to 715. Additionally, the determination apparatus 1 may determine an approximate curve on the basis of a plurality of estimated coordinate points and determine, as the existence region 70, a circular region that uses the approximate curve as its radius. The determination apparatus 1 may determine, as the existence region 70, an elliptical region having, as its longitudinal axis, the radius of the approximate curve and having, as its lateral axis, a length obtained by multiplying the length of the longitudinal axis by a pre-stored coefficient. Although a method in which the existence region that the determination apparatus 1 determines on the basis of the error regions and the estimated coordinate points has a circular or elliptical shape has been described above, the existence region determined may have a polygonal shape.

Quantity-of-change calculation processing and movement-occurrence determination processing will be described next. The determination apparatus 1 reads, from the existence-region file 152, estimated existence regions in the respective segments. The determination apparatus 1 compares the existence regions in the segments with each other to calculate a quantity of change. When the calculated quantity of change exceeds a desired threshold, the determination apparatus 1 determines that a movement occurred. A method in which the determination apparatus 1 calculates a quantity of change on the basis of a region in which the existence region in one segment and the existence region in another segment overlap each other and makes a movement-occurrence determination on the basis of the calculated quantity of change will be described in the present embodiment by way of example.

Figure 11:
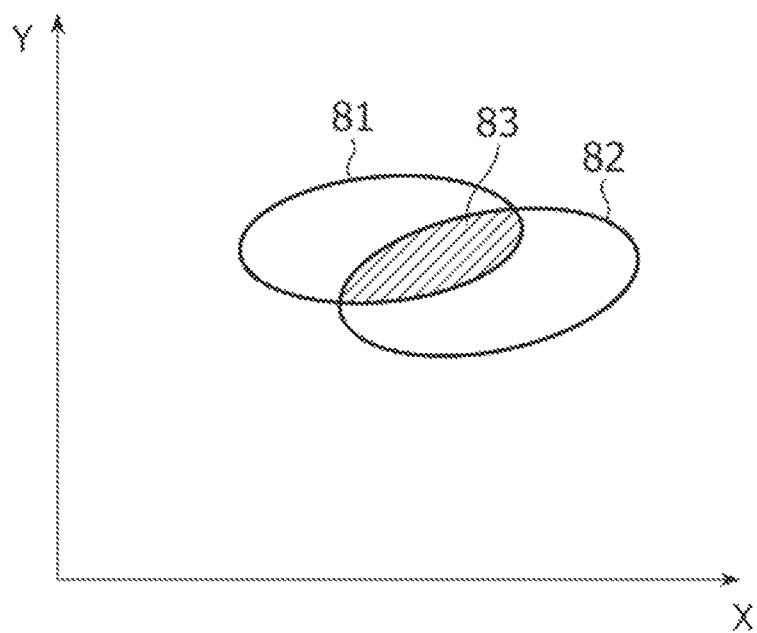
FIG. 11 illustrates an example of existence regions.

FIG. 11 illustrates an example of existence regions. For example, FIG. 11 illustrates an existence region 81 in a first segment and an existence region 82 in a second segment, the existence regions being estimated by the determination apparatus 1. A description is given assuming that the existence region 82 is subsequent existence region in time series to the existence region 81. In FIG. 11, the existence region 81 and the existence region 82 overlap each other in an overlapping region 83 indicated by hatching. Before calculating a quantity of change, the determination apparatus 1 reads the quantity-of-change calculation policy from the policy storage unit 150. An example of the quantity-of-change calculation policy in the present embodiment is described below. The determination apparatus 1 determines the area of the existence region 81, the area of the existence region 82, and the area of the overlapping region 83.

The determination apparatus 1 may count the number of coordinate points, instead of calculating the areas. An example using the number of coordinate points is described below. The determination apparatus 1 may calculate a quantity of change by dividing the sum of the number of coordinate points in the existence region 81, the number of coordinate points in the existence region 82, and the number of coordinate points in the overlapping region 83 by the number of coordinate points in the overlapping region 83. The determination apparatus 1 also reads the movement-occurrence determination policy from the policy storage unit 150. In the present embodiment, a policy using a first threshold will be described by way of example. When the quantity of change calculated as described above exceeds a first threshold (e.g., 3) stored in the storage unit 15, the determination apparatus 1 may determine that a movement occurred.

The determination apparatus 1 may also calculate a quantity of change by dividing the sum of the number of coordinate points in the existence region 81 and the number of coordinate points in the existence region 82 by the number of coordinate points in the overlapping region 83. Upon determining that a movement occurred, the determination apparatus 1 stores a movement flag "1" (see FIG. 7) in the existence-region file 152 in association with the existence region 82 in the subsequent segment (the second segment). Upon determining that no movement occurred, the determination apparatus 1 further performs movement determination processing on a prior segment in time series. When "1" is set for the movement flag for the read segment, the determination apparatus 1 regards the movement determination processing on the segment as the last movement determination processing. When it is determined that no movement occurred in the segment, the determination apparatus 1 determines that no movement occurred. When "1" is not set for the movement flag for any segment, the determination apparatus 1 performs movement determination processing between the segment in question and all other segments. For example, the determination apparatus 1 performs processing for determining whether or not a movement occurred between the segment of 11-12 o'clock and the segment of 10-11 o'clock. Upon determining that no movement occurred, the determination apparatus 1 further performs processing for determining whether or not a movement occurred between the segment of 11-12 o'clock and the segment of 9-10 o'clock. Upon determining that a movement occurred between the segment of 11-12 o'clock and the segment of 9-10 o'clock, the determination apparatus 1 sets "1" for the movement flag for the segment of 11-12 o'clock.

The above-described processing will now be described with reference to flowcharts.

Figure 12:
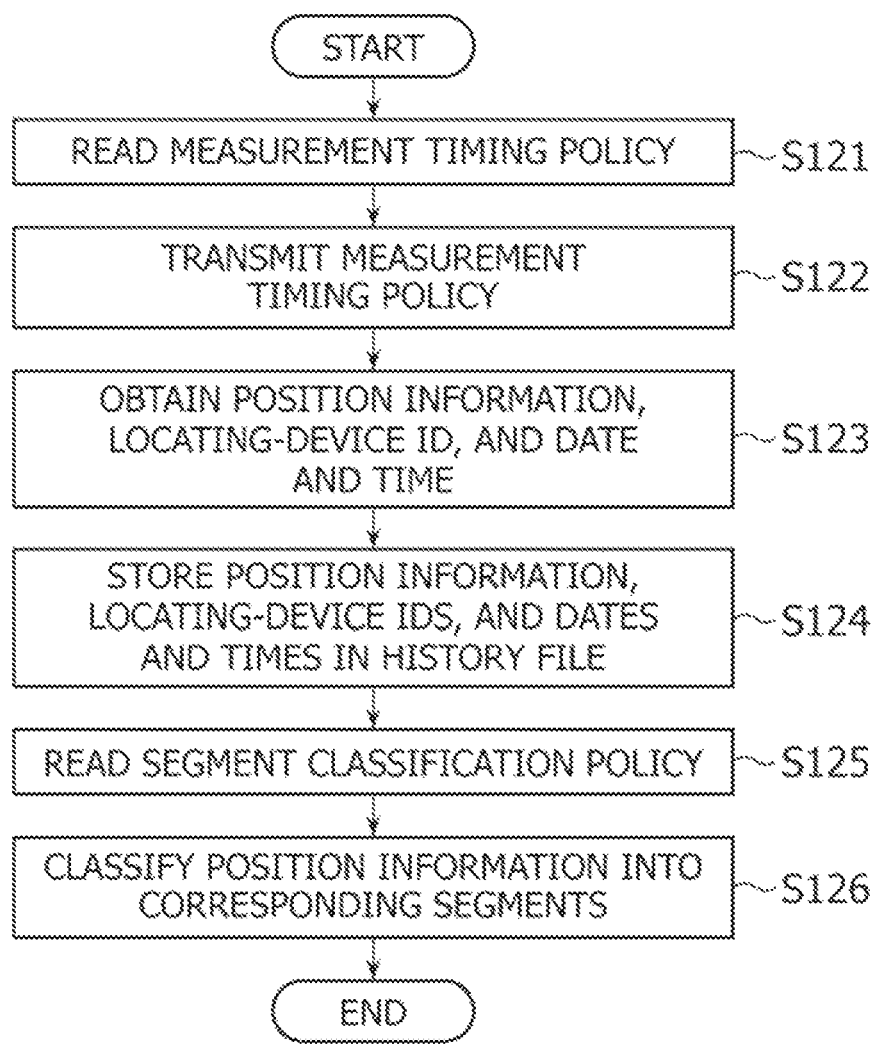
FIG. 12 is a flowchart illustrating a first example of a procedure from position-information acquisition to segment classification.

FIG. 12 is a flowchart illustrating a first example of a procedure from the position-information acquirement to the segment classification. In operation S121, the acquiring unit 101 reads the measurement timing policy pre-stored in the policy storage unit 150. In operation S122, the acquiring unit 101 transmits the read measurement timing policy to the locating device 2. The locating device 2 receives the measurement timing policy via the communication unit 26 and stores the measurement timing policy in the policy storage unit 221.

In accordance with the stored measurement timing policy, the locating device 2 receives position information including an estimated coordinate point and an error region via the communication unit 26, obtains date and time from the clock unit 28, and transmits the position information and the date and time to the acquiring unit 101 via the communication unit 26. As the date and time, date and time transmitted from the base station 4 during position location may be used.

In operation S123, the communication unit 16 in the acquiring unit 101 obtains the transmitted position information, locating-device ID, and date and time. In operation S124, the acquiring unit 101 time-sequentially stores, in the history file 151, the position information, locating-device IDs, and dates and times received via the communication unit 16. In operation S125, the classifying unit 102 reads the segment classification policy from the storage unit 15. In operation S126, on the basis of the segment classification policy, the classifying unit 102 classifies the position information, stored in the history file 151, into the corresponding segments. The classifying unit 102 stores the classified segments in association with the acquirement dates and times and the position information.

Figure 13A:
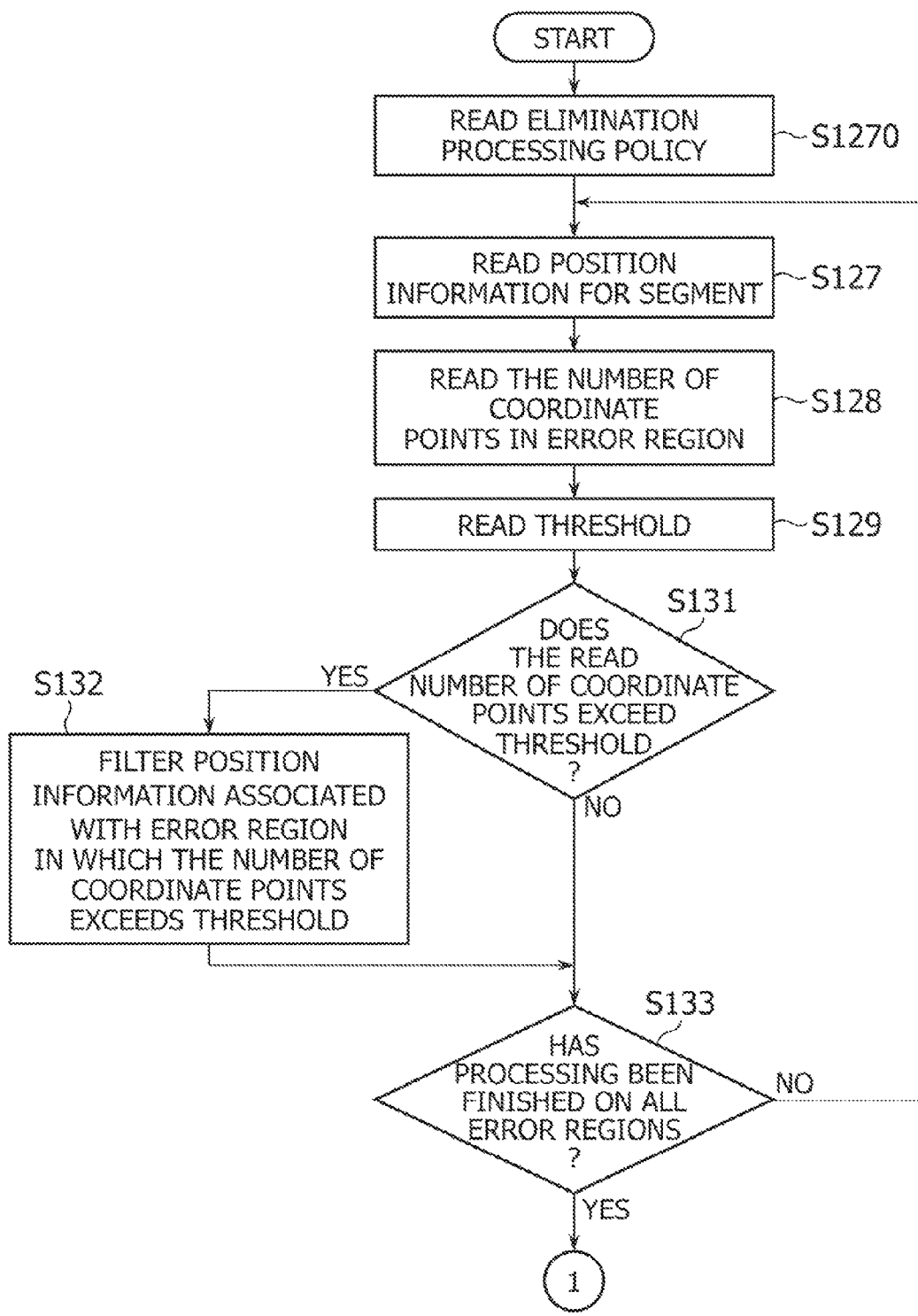
FIGS. 13A and 13B are flowcharts illustrating an example of a processing procedure for filtering position information.
Figure 13B:
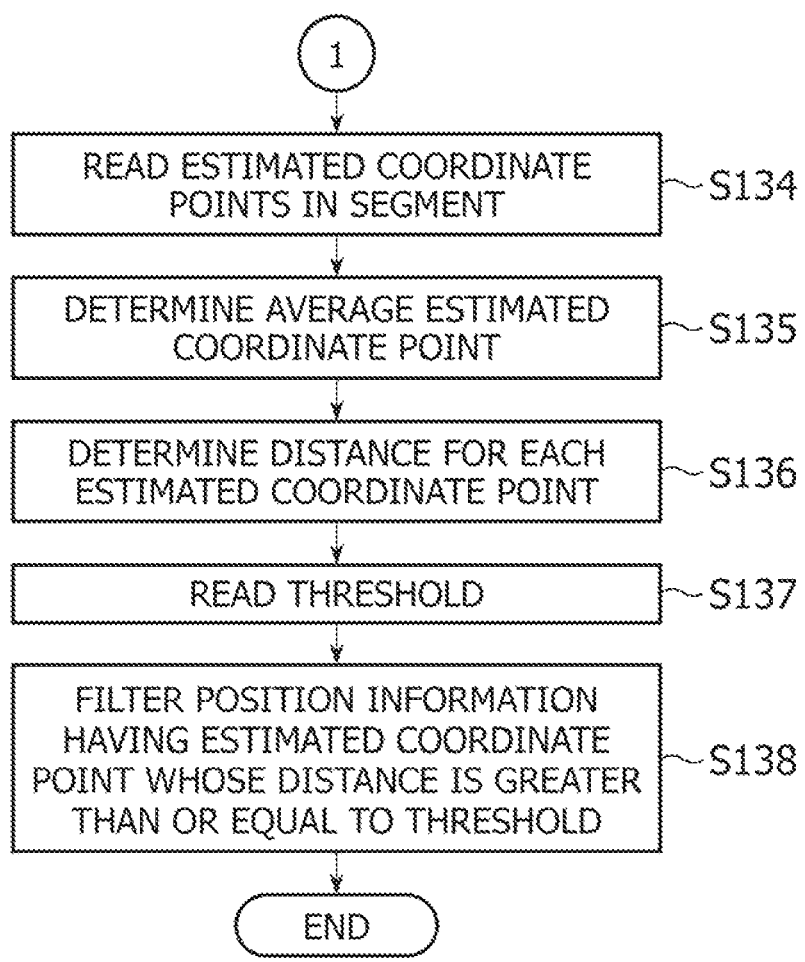

FIGS. 13A and 13B are flowcharts illustrating an example of a procedure for position-information filtering. In operation S1270, the estimating unit 103 reads the filtering policy from the policy storage unit 150. In operation S127, the estimating unit 103 reads the position information for one segment. In operation S128, on the basis of the read position information, the estimating unit 103 reads the number of coordinate points in an error region. In operation S129, the estimating unit 103 reads, from the storage unit 15, a threshold (the number of coordinate points) used for the filtering. In operation S131, the estimating unit 103 determines whether or not the read number of coordinate points in the error region exceeds the threshold. When the estimating unit 103 determines that the number of coordinate points exceeds the threshold (YES in operation S131), the process proceeds to operation S132 in which the estimating unit 103 filters (deletes), from the history file 151, the position information associated with the error region in which the number of coordinate points exceeds the threshold. When the estimating unit 103 finishes the processing in operation S132 or determines that the number of coordinate points does not exceed the threshold (NO in operation S131), the process proceeds to operation S133. In operation S133, the estimating unit 103 determines whether or not the above-described processing has been finished on all error regions in the segment.

When the estimating unit 103 determines that the processing has not been finished (NO in operation S133), the process returns to operation S127 in which the estimating unit 103 repeatedly performs processing with respect to other position information. When the estimating unit 103 determines that the processing has been finished on all error regions (YES in operation S133), the process proceeds to operation S134. In operation S134, the estimating unit 103 refers to the history file 151 to read estimated coordinate points in the segment. In operation S135, on the basis of the read estimated coordinate points, the estimating unit 103 determines an average estimated coordinate point in the segment. In operation S136, the estimating unit 103 determines, for each estimated coordinate point, the distance between the estimated coordinate point and the average estimated coordinate point.

In operation S137, the estimating unit 103 reads a threshold (i.e., a distance) stored in the storage unit 15. In operation S138, the estimating unit 103 filters, from the history file 151, the position information having the estimated coordinate point whose distance determined in operation S136 is greater than or equal to the threshold. The estimating unit 103 does not have to perform the filtering. The estimating unit 103 may also perform either the filtering based on the error region in operation S131 or the filtering based on the estimated coordinate position in operation S138. The estimating unit 103 may also execute the filtering based on the estimated coordinate positions, before or after executing the filtering based on the error regions.

Figure 14:
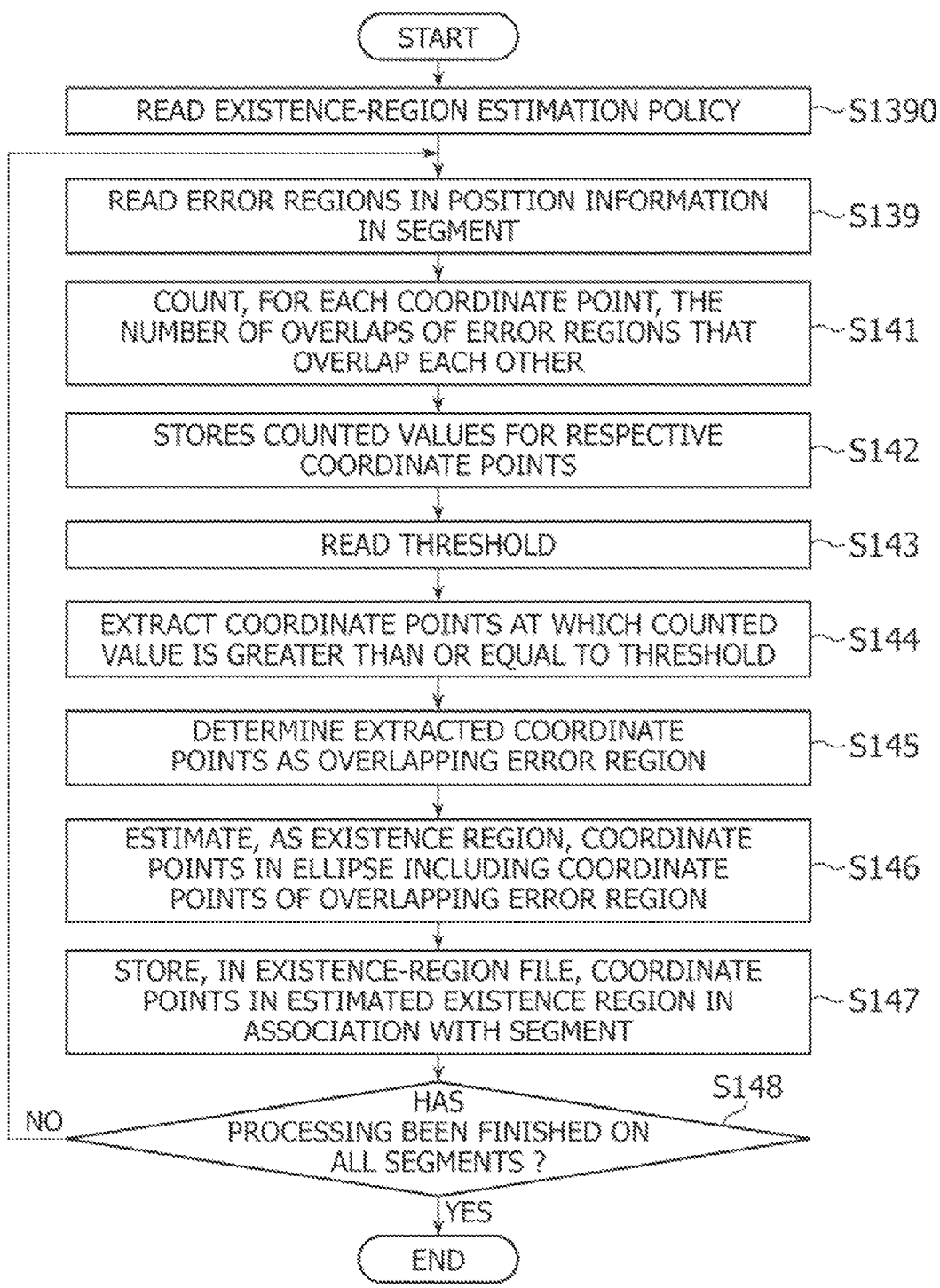
FIG. 14 is a flowchart illustrating a first example of a procedure processing for estimating an existence region.

FIG. 14 is a flowchart illustrating a first example of a procedure for the existence-region estimation processing. In operation S1390, the estimating unit 103 reads the existence-region estimation policy from the policy storage unit 150. In operation S139, the estimating unit 103 reads, from the history file 151, the error regions in the position information in a segment. In operation S141, the estimating unit 103 counts, for each coordinate point, the number of overlaps of error regions that overlap each other in the error regions. In operation S142, the estimating unit 103 stores, in the storage unit 15, the counted values for the respective coordinate points.

In operation S143, the estimating unit 103 reads a threshold from the storage unit 15. In operation S144, the estimating unit 103 extracts coordinate points at which the counted value is greater than or equal to the threshold. In operation S145, the estimating unit 103 determines the extracted coordinate points as an overlapping error region. In operation S146, the estimating unit 103 estimates, as an existence region, coordinate points in a shape, for example an ellipse, a circle or a polygon, including the coordinate points of the overlapping error region. In this processing, the estimating unit 103 estimates, as an existence region, a smallest shape including all of the coordinate points at which a large number of overlapping regions exist. The ellipse is determined by, for example, in the following manner. Assuming that a line segment coupling two points having a largest distance therebetween out of the coordinate points extracted in operation S144 is a longitudinal axis and the perpendicular bisector of the longitudinal axis corresponds to a lateral-axis direction, the estimating unit 103 determines an ellipse that includes all of the coordinate points while gradually extending the lateral axis. The shape is determined by, for example, in the following manner. The estimating unit 103 may determine a shape whose diameter corresponds to a line segment that couples two points having a largest distance therebetween in the coordinate points extracted in operation S144.

In operation S147, the estimating unit 103 stores, in the existence-region file 152, the coordinate points in the estimated existence region in association with the segment. The contents stored in the existence-region file 152 as the existence region may be the center point, lateral axis, longitudinal axis, gradient (longitudinal-axis gradient), or the like of the ellipse estimated in operation S146 or may be the overlapping error region itself determined in operation S145. In operation S148, the estimating unit 103 determines whether or not the processing has been finished on all segments.

When the estimating unit 103 determines that the processing has not been finished on all segments (NO in operation S148), the process returns to operation S139. As a result of repeatedly performing the above-described processing, estimation results of the existence regions in the respective segments are accumulated in the existence-region file 152. When the estimating unit 103 determines that the processing has been finished on all of the segments (YES in operation S148), it ends the series of processing.

Figure 15:
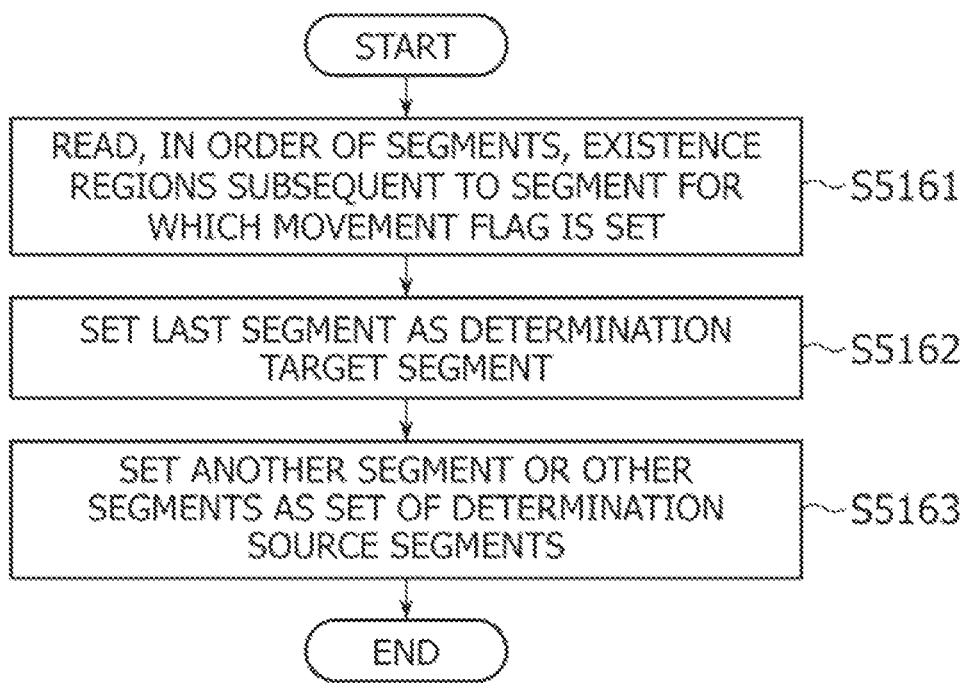
FIG. 15 is a flowchart illustrating an example of a processing procedure for determining a determination target segment and a determination source segment and reading an existence region.

FIG. 15 is a flowchart illustrating an example of a processing procedure for determining a determination target segment and a determination source segment and reading existence regions. In operation S5161, in order to determine a determination target segment and a set of determination source segments, the determining unit 104 refers to the existence-region file 152 to read, in order of the segments, existence regions subsequent to a segment for which the movement flag is set. When a movement flag has not been set, the determining unit 104 reads existence regions in all segments.

In operation S5162, the determining unit 104 sets the last segment in time series as the determination target segment. In operation S5163, the determining unit 104 sets another segment or other segments (i.e., one or a plurality of segments temporally prior to the set determination target segment) as a set of determination source segments.

Figure 16:
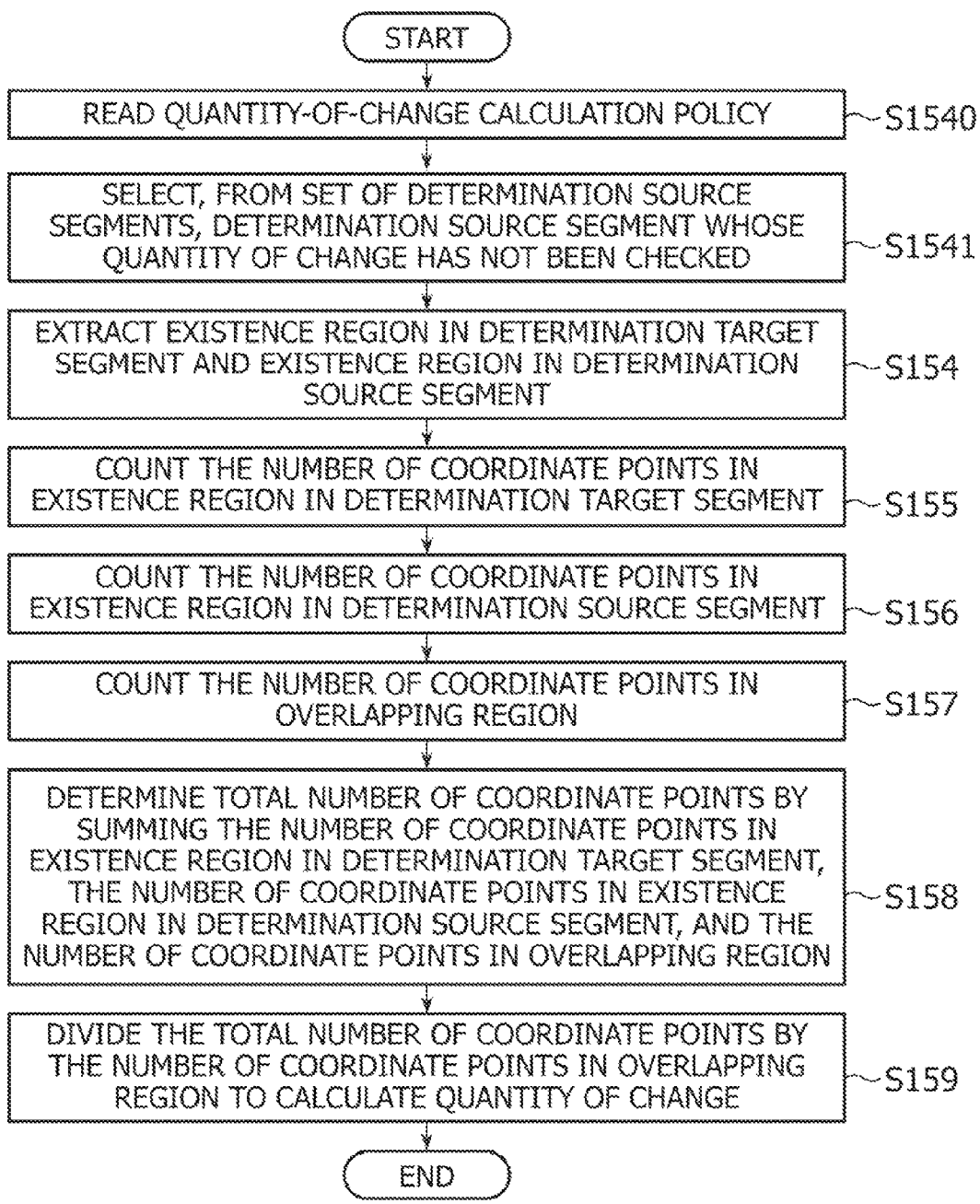
FIG. 16 is a flowchart illustrating a first example of a processing procedure for calculating a quantity of change.

FIG. 16 is a flowchart illustrating a first example of a processing procedure for calculating a quantity of change. In operation S1540, the determining unit 104 reads the quantity-of-change calculation policy from the policy storage unit 150. In operation S1541, the determining unit 104 selects, from the set of determination source segments, a determination source segment whose quantity of change has not been checked. In operation S154, the determining unit 104 extracts the existence region in the determination target segment and the existence region in the determination source segment. In operation S155, the determining unit 104 counts the number of coordinate points in the existence region in the determination target segment. In operation S156, the determining unit 104 counts the number of coordinate points in the existence region in the determination source segment. In operation S157, on the basis of the coordinate points in the existence region in the determination target segment and the coordinate points in the existence region in the determination source segment, the determining unit 104 counts the number of coordinate points in an overlapping region thereof.

In operation S158, the determining unit 104 determines a total number of coordinate points by summing the number of coordinate points in the existence region in the determination target segment, the number of coordinate points in the existence region in the determination source segment, and the number of coordinate points in the overlapping region. In operation S159, the determining unit 104 divides the total number of coordinate points by the number of coordinate points in the overlapping region to calculate a quantity of change.

Figure 17:
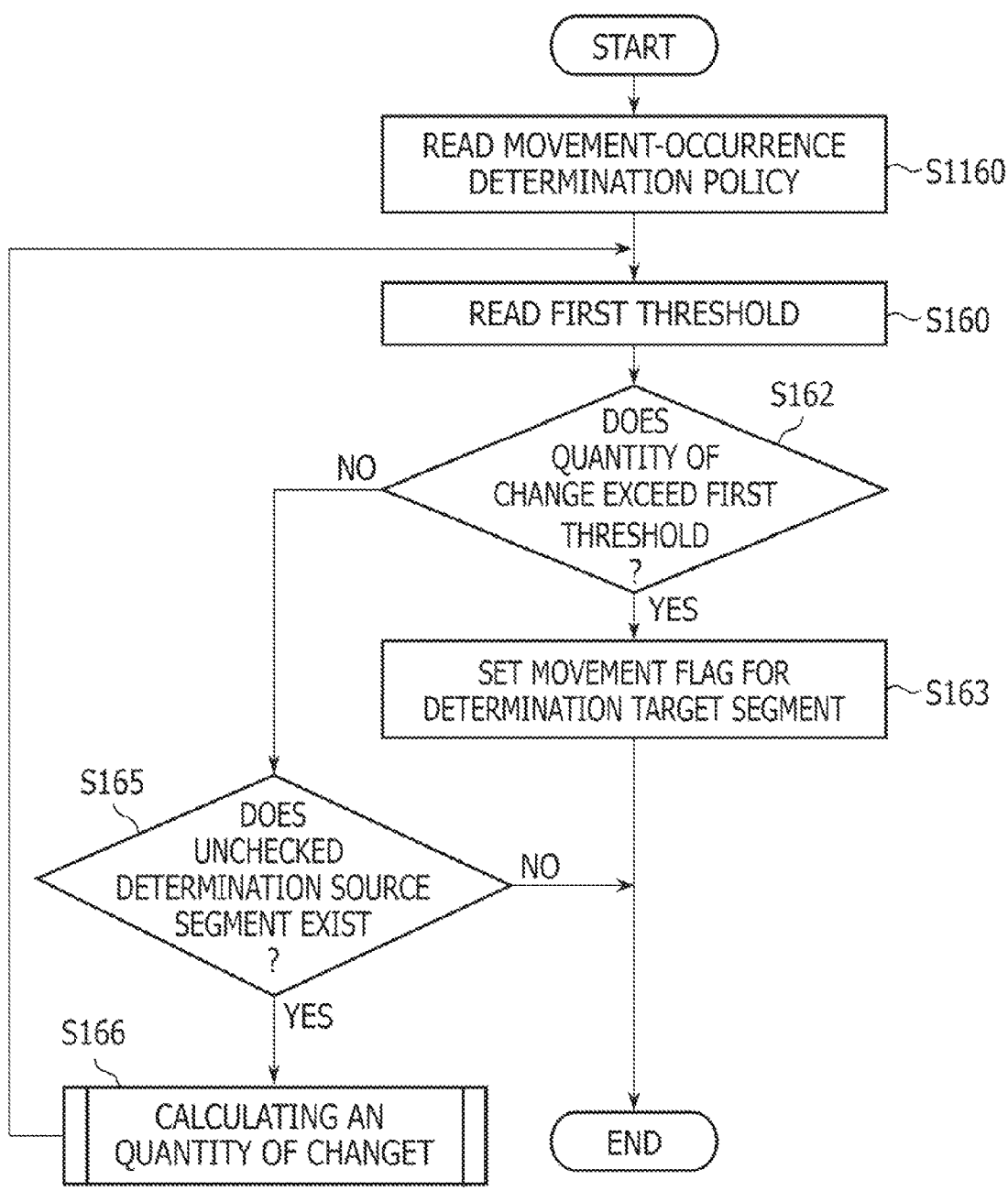
FIG. 17 is a flowchart illustrating a first example of a processing procedure for determining occurrence of a movement.

FIG. 17 is a flowchart illustrating a first example of a processing procedure for determining occurrence a movement. In operation S1160, the determining unit 104 reads the movement-occurrence determination policy from the policy storage unit 150. In operation S160, the determining unit 104 reads a first threshold from the storage unit 15. In operation S162, the determining unit 104 determines whether or not the calculated quantity of change exceeds the first threshold. When the determining unit 104 determines that the calculated quantity of change exceeds the first threshold (YES in operation S162), the process proceeds to operation S163 in which the determining unit 104 sets, in the existence-region file 152, a movement flag for the determination target segment. When it is determined that the quantity of change does not exceed the first threshold (NO in operation S162), the process proceeds to operation S165 in which the determining unit 104 determines whether or not any unchecked determination source segment exists. When the determining unit 104 determines that no unchecked determination source segment exists (NO in operation S165), the processing ends. On the other hand, upon determining that any unchecked determination source segment exists (YES in operation S165), the determining unit 104 sets a prior segment in time series as a determination source segment. The process then proceeds to operation S166 in which the determining unit 104 calculates a quantity of change. After calculating a quantity of change ends, the process returns to operation S160 and the determining unit 104 performs the processing. In the example of FIG. 7, the determination source segment is changed from 10-11 o'clock to 9-10 o'clock. Movement determination processing as described above is then executed to determine occurrence of a movement between 11-12 o'clock, which is the determination target segment, and 9-10 o'clock.

When the determining unit 104 sets the movement flag, it outputs, to the display unit 14, the corresponding segment and identification information for identifying the moved locating device 2. The determining unit 104 may transmit the segment and the locating-device ID to an external computer (not illustrated) via the communication unit 16. FIG. 18 illustrates a first example of a display image of determination results. The determining unit 104 displays, for example, on the display unit 14, a locating-device ID box 141, a movement-occurrence determination box 1419, a determination-target-segment box 142, a determination-source-segment box 143, and a movement-change graph 140.

The determining unit 104 displays, in the locating-device ID box 141, the locating-device ID of the locating device 2 to be determined. The locating-device ID is transmitted in conjunction with transmission of the position information from the locating device 2. In the example of FIG. 18, "001" is displayed as the locating-device ID. A determination result "moved" is displayed in the movement-occurrence determination box 1419. When the determining unit 104 sets the movement flag in the processing in operation S163, it displays "moved" in the movement-occurrence determination box 1419. The determining unit 104 reads, from the existence-region file 152, a determination target segment for which it was determined that a movement occurred and for which the movement flag was set in the processing in operation S163. The determining unit 104 then displays the read determination target segment in the determination-target-segment box 142 and displays the corresponding determination source segment in the determination-source-segment box 143. In the example of FIG. 18, "11-12 o'clock" is displayed in the determination-target-segment box 142 and "9-10 o'clock" is displayed in the determination-source-segment box 143.

The determining unit 104 displays, on the movement-change graph 140, an existence region 140a in the determination target segment and an existence region 140b in the determination source segment. The determining unit 104 may display, in different colors, the existence region 140a in the determination target segment and the existence region 140b in the determination source segment. In the example of FIG. 18, the existence region 140a, indicated by hatching, is displayed as the existence region in the determination target segment of 11-12 o'clock. The existence region 140b is displayed as the existence region in the determination source segment of 9-10 o'clock. The determining unit 104 may also numerically display, on the display unit 14, the quantity of change calculated in operation S159. The determining unit 104 may also change the coloring of the existence region 140a in accordance with the value of the quantity of change.

The determining unit 104 may also describe, in, for example, HTML (HyperText Markup Language) format, a document for generating the above-described display screen. When the determination apparatus 1 receives, from an external computer, a request for obtaining the document, the determination apparatus 1 reads the document from the storage unit 15 and transmits the document to the external computer via the communication unit 16. The external computer has a browser or other mechanism that displays the screen illustrated in FIG. 18. As described above, the determination apparatus 1 estimate the existence regions on the basis of the error regions in the segments and compares the estimated existence regions in the segments with each other, thereby making it possible to make a movement occurrence determination with high accuracy even when an error is involved in the position location. Although a description in the present embodiment has been mainly given of the method for determining occurrence of a movement in a two dimensional space, the determination apparatus 1 may also be applied to a determination on a movement in a three dimensional space including altitude information.

Second Embodiment

Figure 19A:
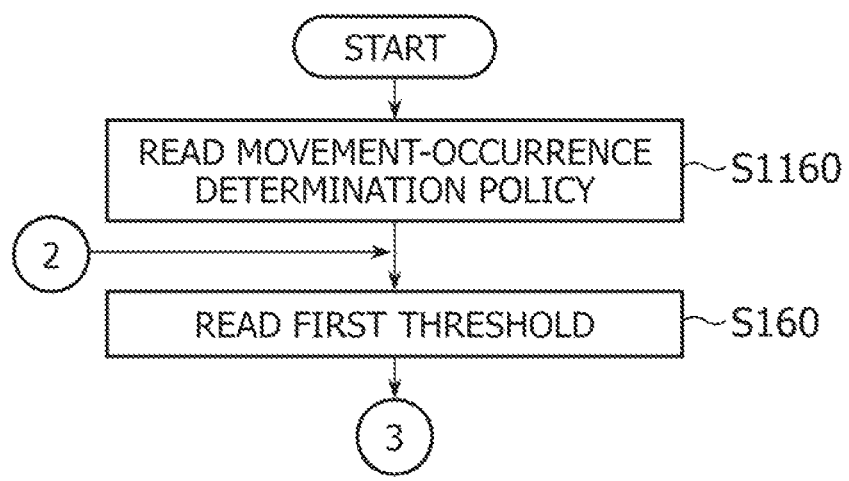
FIGS. 19A and 19B are flowcharts illustrating a second example of a processing procedure for determining occurrence of a movement.
Figure 19B:
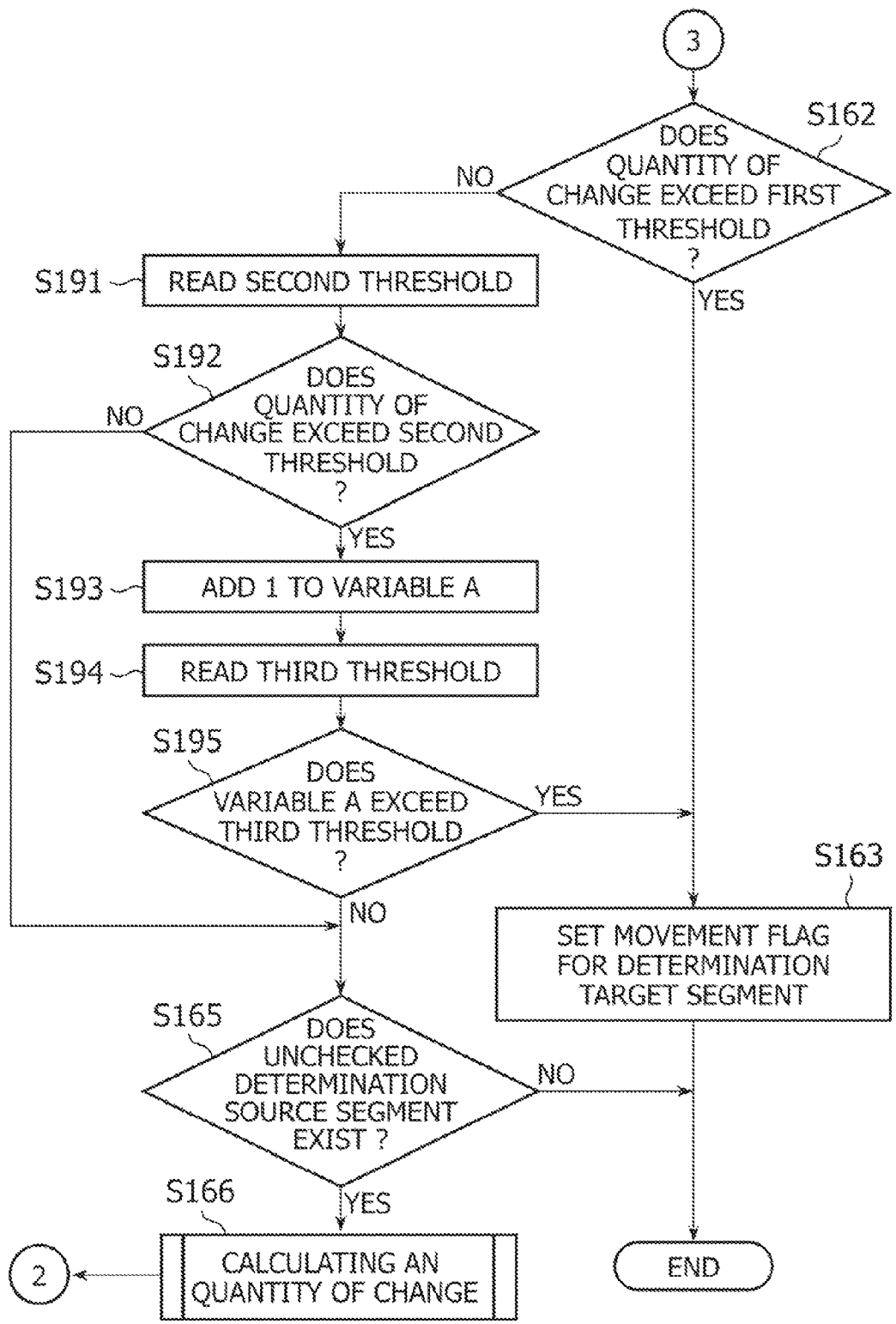

A second embodiment is directed to an embodiment for more accurately determining occurrence of a movement. FIGS. 19A and 19B are flowcharts illustrating a second example a processing procedure for determining occurrence of a movement according to the second embodiment. In the present embodiment, the movement-occurrence determination processing procedure is different from the movement-occurrence determination processing procedure (illustrated in FIG. 17) in the first embodiment described above, and other processing is substantially the same as the processing in the first embodiment. Thus, the processing that is substantially the same as the processing in the first embodiment will not be described hereinafter. In operation S1160, the determining unit 104 reads the movement-occurrence determination policy from the policy storage unit 150. In operation S160, the determining unit 104 reads a first threshold. In operation S162, the determining unit 104 determines whether or not the quantity of change exceeds the first threshold. Upon determining that the quantity of change does not exceed the first threshold (NO in operation S162), the determining unit 104 reads a second threshold from the storage unit 15 in operation S191. The second threshold has a value that is different from the first threshold. A description in the present embodiment is given assuming that, for example, the second threshold (e.g., 1.5) is smaller than the first threshold (e.g., 3).

In operation S192, the determining unit 104 determines whether or not the quantity of change calculated in operation S159 exceeds the second threshold. When it is determined that the quantity of change exceeds the second threshold (YES in operation S192), the process proceeds to operation S193 in which the determining unit 104 adds 1 to a variable A having an initial value of 0. In operation S194, the determining unit 104 reads a third threshold stored in the storage unit 15. The third threshold is a value to be compared with the number of times the quantity of change is determined to exceed the second threshold. For example, "3" is stored for the third threshold. That is, when the number of times the quantity of change that does not exceed the first threshold is determined to exceed the second threshold exceeds the third threshold, the determining unit 104 determines that the locating device 2 moved.

In operation S195, the determining unit 104 determines whether or not the variable A exceeds the third threshold. When it s determined that the variable A does not exceed the third threshold (NO in operation S195), the process proceeds to operation S165 in which the determining unit 104 determines whether or not any unchecked determination source segment exists. When the determining unit 104 determines that no unchecked determination source segment exists (NO in operation S165), the processing ends. On the other hand, when the determining unit 104 determines that any unchecked determination source segment exists (YES in operation S165), the process proceeds to operation S166 in which the determining unit 104 calculates a quantity of change. After calculating a quantity of change ends, the process returns to operation S160 in FIG. 19A and then the determining unit 104 repeatedly performs the processing with respect to another determination source segment. When the determining unit 104 determines that the quantity of change does not exceed the second threshold (NO in operation S192), the process skips the processing in operations S193 to S195 to omit the addition processing for the variable A and proceeds to operation S165.

In this manner, the process returns to the prior segment in order so as to perform comparison with the existence region in the determination target segment. Upon determining that the variable A exceeds the third threshold (YES in operation S195), the determining unit 104 determines that a movement occurred and sets a movement flag for the determination target segment in operation S163. Upon determining that the quantity of change exceeds the first threshold (YES in operation S162), the determining unit 104 sets a movement flag for the determination target segment in operation S163. During display of the determination-result image illustrated in FIG. 18, the determining unit 104 may display information that makes it possible to identify whether the first threshold was used or the second and the third threshold were used. When the determining unit 104 sets, in operation S163, a movement flag for the determination target segment in which the quantity of change exceeds the first threshold, the determining unit 104 displays, on the display unit 14, information indicating that the occurred movement is due to a large change. When the determining unit 104 sets a movement flag in operation S163, it displays, on the display unit 14, information indicating that the change is due to motion in a plurality of segments. The determining unit 104 displays those plurality of information so as to be distinguishable, by using, for example, red and blue colors or characters. The determining unit 104 may also output different sounds via an audio output unit (not illustrated) so that the information may be distinguishable acoustically. An example of the audio output unit is a speaker. With this arrangement, the determination apparatus 1 may detect motion in a plurality of segments and may determine a movement of the locating device 2 with high accuracy, even when a movement determination may not be made for each segment.

Since other configurations and processing of the second embodiment described above are substantially the same as those of the first embodiment, corresponding elements and operations are denoted by the same reference numerals and detailed descriptions thereof are not given hereinafter.

Third Embodiment

A third embodiment is directed to an embodiment for determining occurrence of a movement by using a specific coordinate point in an estimated existence region. The specific coordinate point is one coordinate point obtained from a group of coordinate points in an existence region. For example, when the existence region has a circular or elliptical shape, the specific coordinate point may be the center coordinate point thereof, and when the existence region has a polygonal shape, the specific coordinate point may be the coordinate point at the barycenter thereof. The specific coordinate point may be a point indicated by the average coordinates values of the X coordinate values and the Y coordinate values of the coordinate points on the edge of an existence region. In addition, the determination apparatus 1 may use, as the specific coordinate point, the average coordinate values of graphical feature points (e.g., an acute vertex or obtuse vertex) of an existence region or the average coordinate value of the coordinate points in the existence region.

Figure 20:
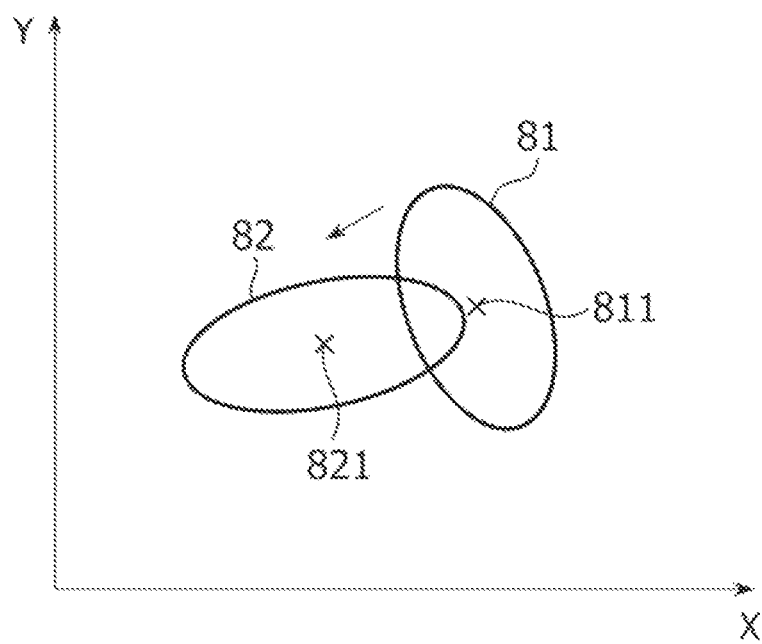
FIG. 20 illustrates an example of specific coordinate points.

FIG. 20 illustrates an example of specific coordinate points. A specific coordinate point 811 exists in an estimated existence region 81 in one segment and a specific coordinate point 821 exists in an existence region 82 estimated in a subsequent segment. The specific coordinate points 811 and 821 in FIG. 20 are center points of the existence regions 81 and 82, respectively. The determining unit 104 determines the distance between the specific coordinate point 811 in the existence region 81 and the specific coordinate point 821 in the existence region 82. When the determined distance is greater than a threshold stored in the storage unit 15, the determining unit 104 determines that a movement occurred.

In addition, the determining unit 104 may calculate a quantity of change on the basis of both of the overlapping region described in the first and second embodiments and the distance between the specific coordinate points. A description below will be given of an example in which a quantity of change is calculated considering both of the overlapping region and the distance between the specific coordinate points.

Figure 21A:
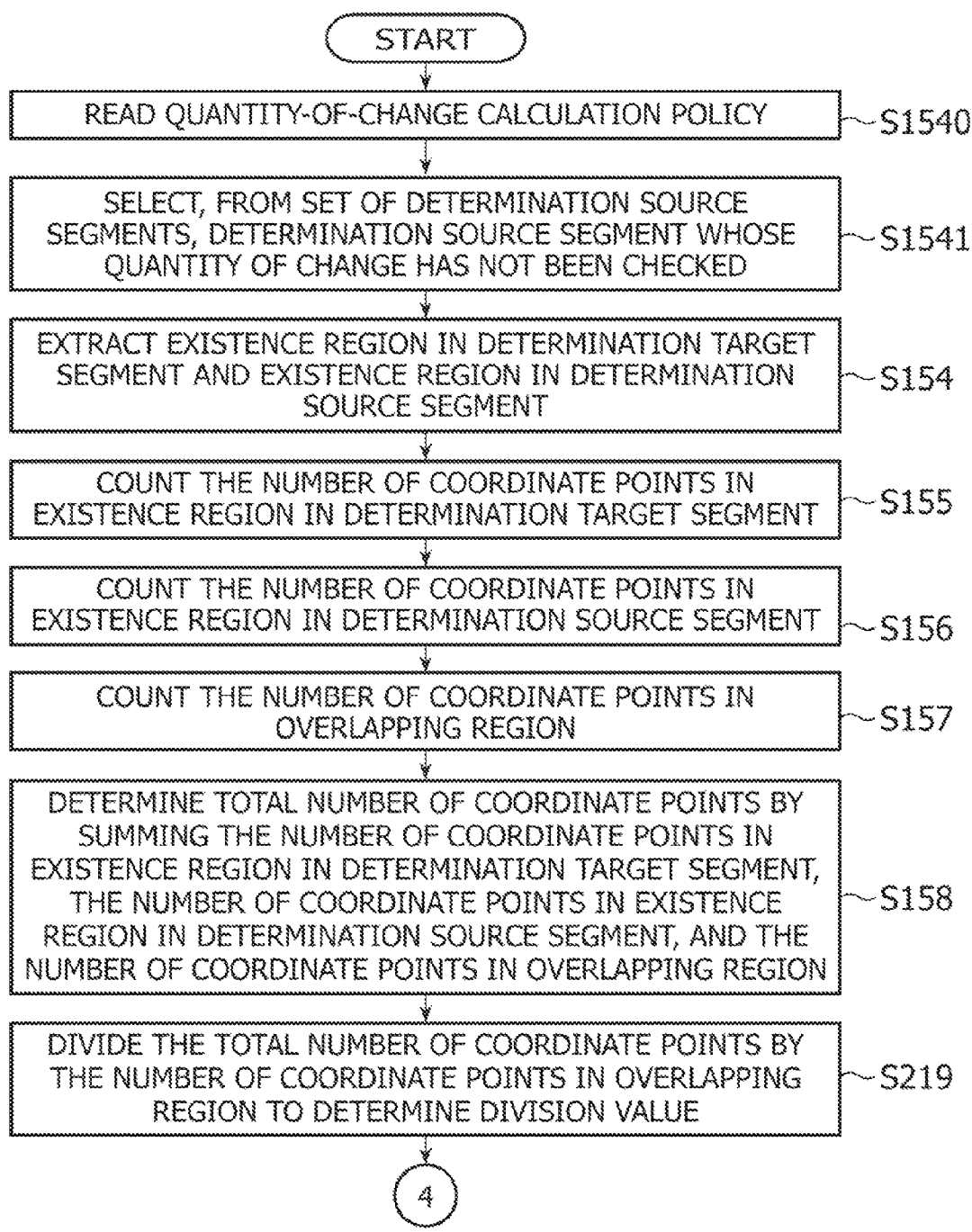

FIGS. 21A and 21B are flowcharts illustrating a second example of a processing procedure for calculating a quantity of change. After operation S5163 in FIG. 15, the determining unit 104 performs processing below. In operation S1540 in FIG. 21A, the determining unit 104 reads the quantity-of-change calculation policy from the policy storage unit 150. In operation S1541, the determining unit 104 selects, from the set of determination source segments, a determination source segment for which a quantity of change has not been checked.

In operation S154, the determining unit 104 extracts the existence region in the determination target segment and the existence region in the determination source segment. In operation S155, the determining unit 104 counts the number of coordinate points in the existence region in the determination target segment. In operation S156, the determining unit 104 counts the number of coordinate points in the existence region in the determination source segment. In operation S157, on the basis of the coordinate points in the existence region in the determination target segment and the coordinate points in the existence region in the determination source segment, the determining unit 104 counts the number of coordinate points in an overlapping region thereof. In operation S158, the determining unit 104 determines a total number of coordinate points by summing the number of coordinate points in the existence region in the determination target segment, the number of coordinate points in the existence region in the determination source segment, and the number of coordinate points in the overlapping region.

In operation S219, the determining unit 104 divides the total number of coordinate points by the number of coordinate points in the overlapping region to determine a division value. In operation S221, the determining unit 104 obtains the specific coordinate point in the determination target segment. For example, when the coordinate point at the center or barycenter of an elliptical region, polygonal region, circular region, or the like is stored in the existence-region file 152, the determining unit 104 reads the stored coordinate point as the specific coordinate point. When the coordinate point at the center or the barycenter is not stored, the determining unit 104 reads the coordinate points on the edge of the existence region, the coordinate points being stored in the existence-region file 152, and determines the average coordinate point of the read coordinate points as the specific coordinate point. In operation S222, the determining unit 104 refers to the existence-region file 152 to obtain the specific coordinate point in the determination source segment.

In operation S223, the determining unit 104 determines a distance between the specific coordinate point obtained in operation S221 and the specific coordinate point obtained in operation S222. In operation S224, the determining unit 104 reads a first weight and a second weight from the storage unit 15. The first weight and the second weight are coefficients used for calculating a quantity of change. The first weight is an influence that influences the division value for the overlapping region. The second weight is a coefficient that influences the distance between the specific coordinate points. The operator may input the first weight and the second weight, as appropriate, via the input unit 13, depending on the design. The determining unit 104 stores the input first weight and second weight in the storage unit 15.

In operation S225, the determining unit 104 multiplies the first weight by the division value determined in operation S219 to determine a first multiplication value. In operation S226, the determining unit 104 multiplies the second weight by the distance determined in operation S223 to determine a second multiplication value. In operation S227, the determining unit 104 adds the first multiplication value determined in operation S225 to the second multiplication value determined in operation S226 to calculate a quantity of change.

In the present embodiment, although the determining unit 104 first determines the division value and then determines the distance, the order is not limited thereto. The determining unit 104 does not have to use the first weight and the second weight. The determining unit 104 may use one of first weight and the second weight. The processing described above makes it possible to execute movement determination also considering the specific coordinate points of the existence regions and also makes it possible to improve the accuracy of the movement determination.

Since other configurations and processing of the third embodiment described above are substantially the same as those of the first and second embodiments, corresponding elements and operations are denoted by the same reference numerals and detailed descriptions thereof are not given hereinafter.

Fourth Embodiment

A fourth embodiment is directed to an embodiment for determining occurrence of a movement on the basis of the distance between the specific coordinate points and a change in the shape of the existence region. The determining unit 104 determines a distance between the specific coordinate points in the existence regions, as described above in the third embodiment. In addition, the determining unit 104 reads, from the existence-region file 152, the coordinate points on edge of the existence regions. The determining unit 104 determines an angle made by a line segment defined by a target coordinate point, an adjacent coordinate point located in a clockwise direction and a line segment made by the target coordinate point and another adjacent coordinate point in a counterclockwise direction on the edge of the existence region. The determination apparatus 1 pre-stores a threshold in the storage unit 15, and the determining unit 104 extracts a coordinate point (hereinafter referred to as an "acute-angle coordinate point") whose determined angle is smaller than the threshold (e.g., 30°). The determining unit 104 performs similar processing on all of the coordinate points on the edge and counts the number of acute-angle coordinate points.

Figure 22:
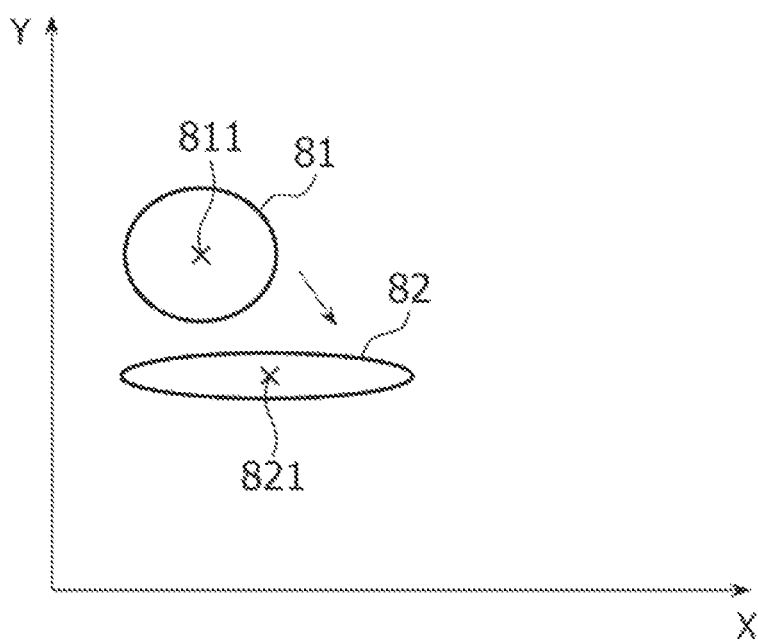
FIG. 22 illustrates a first example of a change in an existence region.

FIG. 22 illustrates first example of a change in an existence region. FIG. 22 illustrates an existence region 81 in a first segment and an existence region 82 in a second segment. Reference numeral 811 indicates a specific coordinate point in the existence region 81 and reference numeral 821 indicates a specific coordinate point in the existence region 82. The existence region 81 has a circular shape, whereas the existence region 82 has an elongated elliptical shape so that the coordinate points in the vicinity of each of two opposite ends of the longitudinal axis form an acute angle. The determining unit 104 counts the number of acute-angle coordinate points in the existence region 82. On the other hand, since the existence region 81 has a circular shape, it has no acute-angle coordinate points. The determining unit 104 compares the number of acute-angle coordinate points counted in the second segment with the number of acute-angle coordinate points counted in the first segment to thereby calculate a quantity of change.

The determining unit 104 calculates a quantity of change on the basis of two types of elements, i.e., the distance between the specific coordinate points in the existence regions and the number of acute-angle coordinate points.

Although quantity-of-change calculation processing considering the two types of elements, i.e., the distance between the specific coordinate points in the existence regions and the number of acute-angle coordinate points, will be described below, the determining unit 104 may calculate the quantity of change by using only the number of acute-angel coordinate points. When the existence region has an elliptical shape and the gradient of the ellipse is stored in the existence-region file 152, as described in the first embodiment, the determining unit 104 may compare changes in the gradient of the ellipse to determine whether or not a movement occurred. The determining unit 104 reads, from the existence-region file 152, the gradients of the ellipses of two existence regions to be compared. Upon determining that the gradient of the ellipse is greater than a first threshold (e.g., 40°), the determining unit 104 determines that a movement occurred.

Figure 23A:
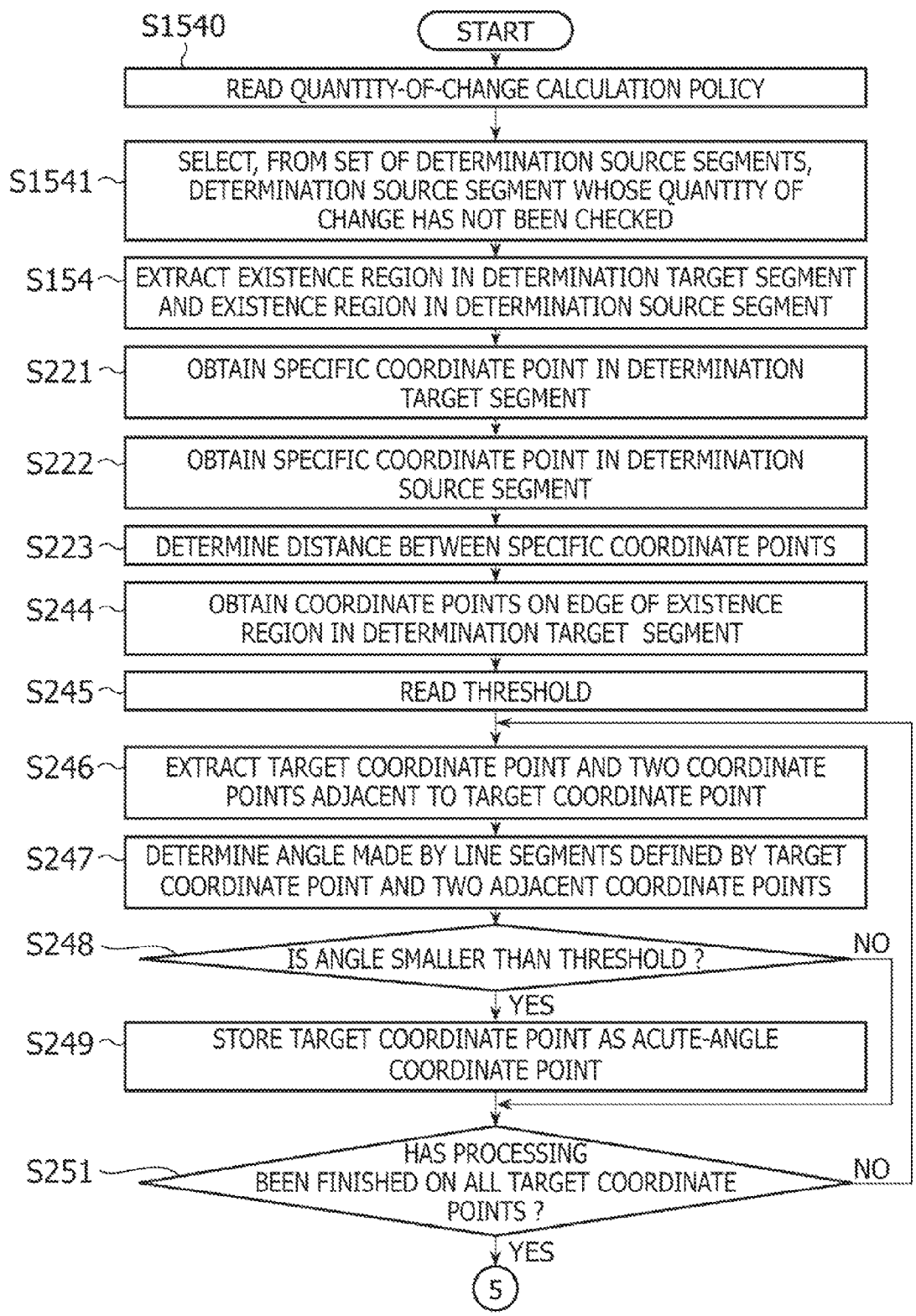
FIGS. 23A and 23B are flowcharts illustrating a third example of a processing procedure for calculating a quantity of change.
Figure 23B:
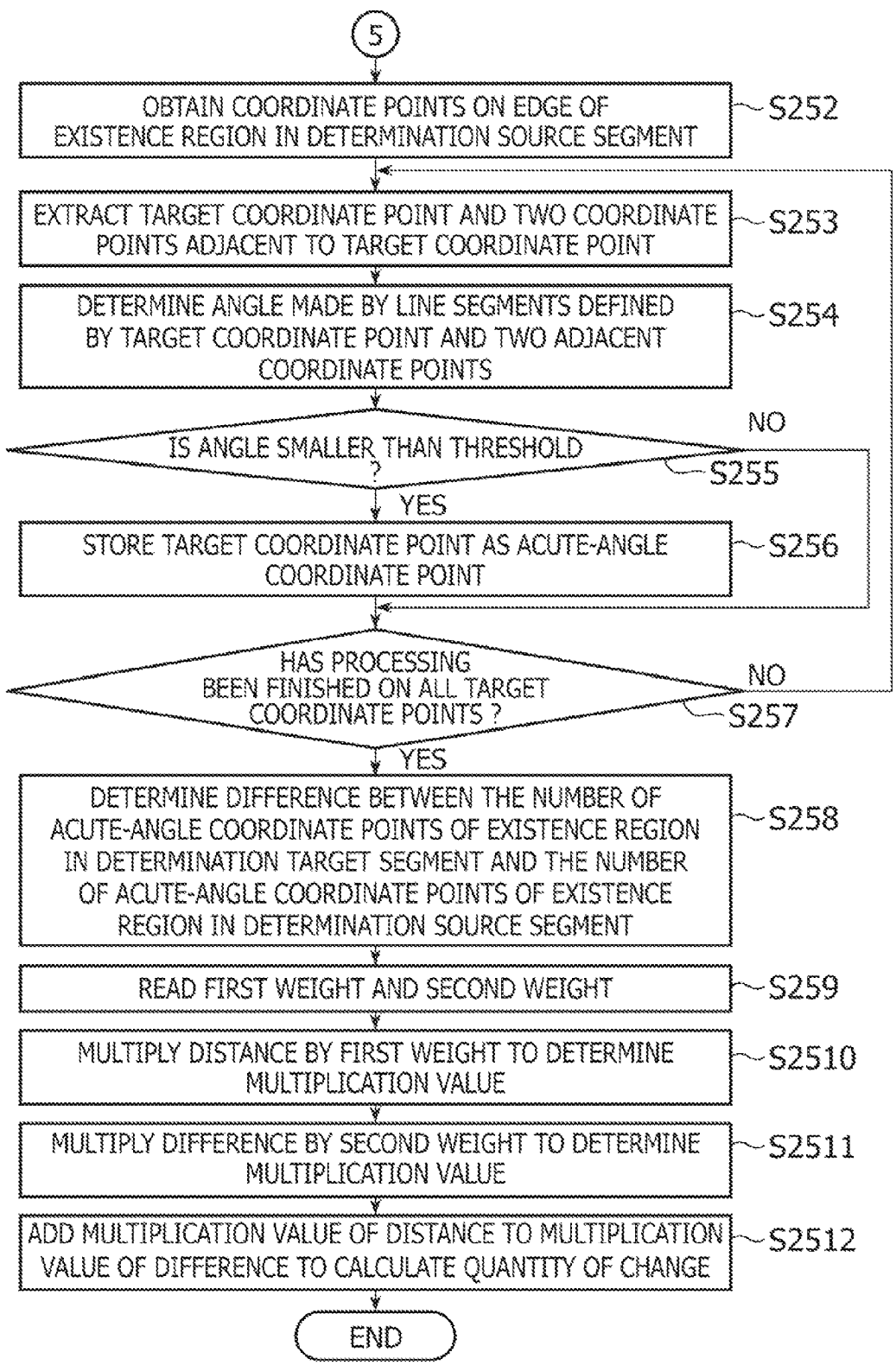

FIGS. 23A and 23B are flowcharts illustrating a third example of a processing procedure for calculating a quantity of change. In operation S1540, the determining unit 104 reads the quantity-of-change calculation policy from the policy storage unit 150. In operation S1541, the determination apparatus 1 selects, from the set of determination source segments, a determination source segment for which a quantity of change has not been checked. In operation S154, the determining unit 104 extracts the existence region in the determination target segment and the existence region in the determination source segment. In operation S221, the determining unit 104 obtains the specific coordinate point in the determination target segment. In operation S222, the determining unit 104 obtains the specific coordinate point in the determination source segment. In operation S223, the determining unit 104 determines a distance between the specific coordinate point obtained in operation S221 and the specific coordinate point obtained in operation S222. In operation S244, the determining unit 104 obtains the coordinate points on the edge of the existence region in the determination target segment. In operation S245, the determining unit 104 reads a threshold from the storage unit 15.

In operation S246, the determination apparatus 1 extracts a target coordinate point of interest and two coordinate points that are adjacent to the target coordinate point. In operation S247, the determining unit 104 determines an angle made by two line segments defined by the target coordinate point and the two adjacent coordinate points. In operation S248, the determining unit 104 determines whether or not the determined angle is smaller than the threshold read in operation S245. Upon determining that the determined angle is smaller than the threshold (YES in operation S248), the determining unit 104 stores the target coordinate point in the storage unit 15 as an acute-angle coordinate point in operation S249.

Upon determining that the determined angle is not smaller than the threshold (NO in operation S248), the determining unit 104 skips the processing in operation S249. In operation S251, the determining unit 104 determines whether or not the processing has been finished on all target coordinate points. Upon determining that the processing is not finished on all of the target coordinate points (NO in operation S251), the determining unit 104 sets another one of the target coordinate points as a new target coordinate point and the process proceeds to operation S246. On the other hand, when the determining unit 104 determines that the processing is finished on all of the target coordinate points (YES in operation S251), the process proceeds to operation S252.

In operation S252, the determining unit 104 obtains the coordinate points on the edge of the existence region in the determination source segment. In operation S253, the determining unit 104 extracts a target coordinate point of interest and two coordinate points that are adjacent to the target coordinate point. In operation S254, the determining unit 104 determines an angle made by line segments defined by the target coordinate point and the two adjacent coordinate points. In operation S255, the determining unit 104 determines whether or not the determined angle is smaller than the threshold. Upon determining that the determined angle is smaller than the threshold (YES in operation S255), the determining unit 104 stores the target coordinate point in the storage unit 15 as an acute-angle coordinate point in operation S256.

Upon determining that the determined angle is not smaller than the threshold (NO in operation S255), the determining unit 104 skips the processing in operation S256. In operation S257, the determining unit 104 determines whether or not the processing has been finished on all target coordinate points on the edge. Upon determining that the processing is not finished on all of the target coordinate points (NO in operation S257), the determining unit 104 sets another one of the target coordinate points as a new target coordinate point of interest and the process proceeds to operation S253. On the other hand, when the determining unit 104 determines that the processing is finished on all of the target coordinate points (YES in operation S257), the process proceeds to operation S258.

In operation S258, the determining unit 104 determines a difference between the number of acute-angle coordinate points of the existence region in the determination target segment, the acute-angle coordinate points being stored in operation S249, and the number of acute-angle coordinate points of the existence region in the determination source segment, the acute-angle coordinate points being stored in operation S256. The difference may be a positive value obtained by returning the absolute value. Although a description in the present embodiment has been given of an example in which the determining unit 104 determines a difference between the number of acute-angle coordinate points in one existence region in the determination target segment and the number of acute-angle coordinate points in another existence region, the arrangement is not limited thereto. For example, the determining unit 104 divides the number of acute-angle coordinate points of the existence region in the determination target segment by the number of coordinate points on the edge of the existence region in the determination target segment, to determine a division value. The determining unit 104 divides the number of acute-angle coordinate points of the existence region in the determination source segment by the number of coordinate points on the edge of the existence region in the determination source segment, to determine a division value. The determining unit 104 may determine a difference between the division value resulting from the existence region in the determination target segment and the division value resulting from the existence region in the determination source segment.

In operation S259, the determining unit 104 reads a first weight and a second weight from the storage unit 15. In operation S2510, the determining unit 104 multiplies the distance, determined in operation S223, by the first weight to determine a multiplication value. In operation S2511, the determining unit 104 multiplies the difference, determined in operation S258, by the second weight to determine a multiplication value. In operation S2512, the determining unit 104 adds the multiplication value of the distance to the multiplication value of the difference to calculate a quantity of change. The determining unit 104 does not have to use the first weight and the second weight. The determining unit 104 may use one of the first weight and the second weight. The operator inputs the first weight and the second weight via the input unit 13, as appropriate, depending on which of a change in the distance between the specific coordinate points and a change in the shape of the existence region an emphasis is to be placed. The determining unit 104 stores the input first weight and second weight in the storage unit 15. With this arrangement, it is possible to make a movement-occurrence determination also considering a change in the shape of the existence region.

Since other configurations and processing of the fourth embodiment described above are substantially the same as those of the first to third embodiments, corresponding elements and operations are denoted by the same reference numerals and detailed descriptions thereof are not given hereinafter.

Fifth Embodiment

Figure 24:
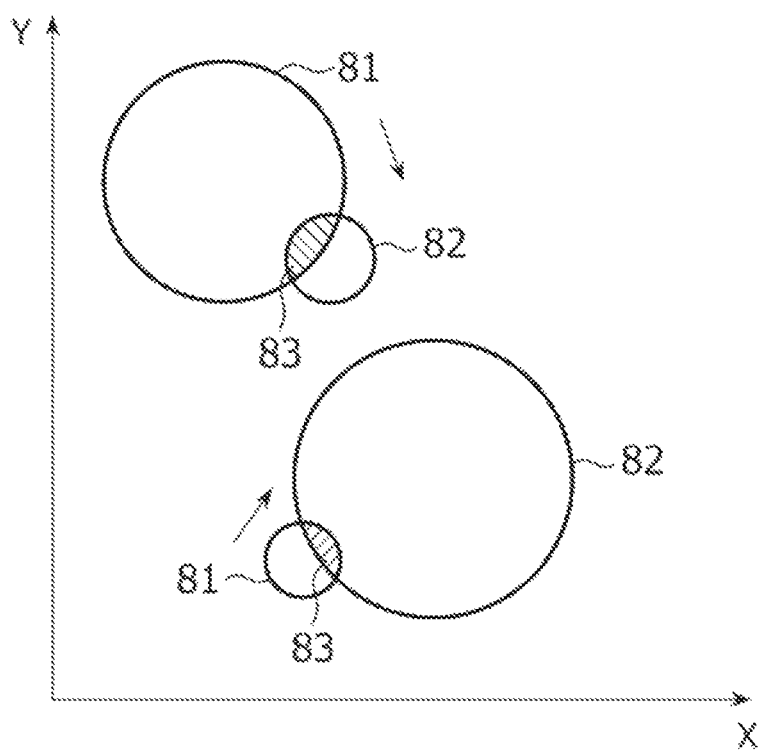
FIG. 24 illustrates a second example of a change in an existence region.

A fifth embodiment is directed to an embodiment for calculating a quantity of change on the basis of an overlapping region of existence regions. FIG. 24 illustrates second example of a change in an existence region. FIG. 24 illustrates an example in which an existence region 81 in a first segment changes to an existence region 82 in a second segment that is subsequent to the first segment in time series. A hatched region 83 represents an overlapping region of the existence regions 81 and 82. The determining unit 104 divides an addition value, obtained by adding the area (or the number of coordinate points) of the existence region 81 in the first segment to the area (or the number of coordinate points) of the overlapping region 83, by an addition value, obtained by adding the area (or the number of coordinate points) of the existence region 82 in the second segment to the area (the number of coordinate points) of the overlapping region 83, to thereby obtain a division value. The determining unit 104 reads an upper-limit value and a lower-limit value as a first threshold stored in the storage unit 15. Appropriate values may be input via the input unit 13 as the upper-limit value and the lower-limit value. For example, the upper-limit value and the lower-limit value may be 3 and ⅓, respectively.

When the division value is greater than the upper-limit value "3" or is smaller than the lower-limit value "⅓", the determining unit 104 determines that a movement occurred. A description below will be given of an example in which a quantity of change is calculated considering both of the division value determined in the present embodiment and the division value determined in the third embodiment.

Figure 25A:
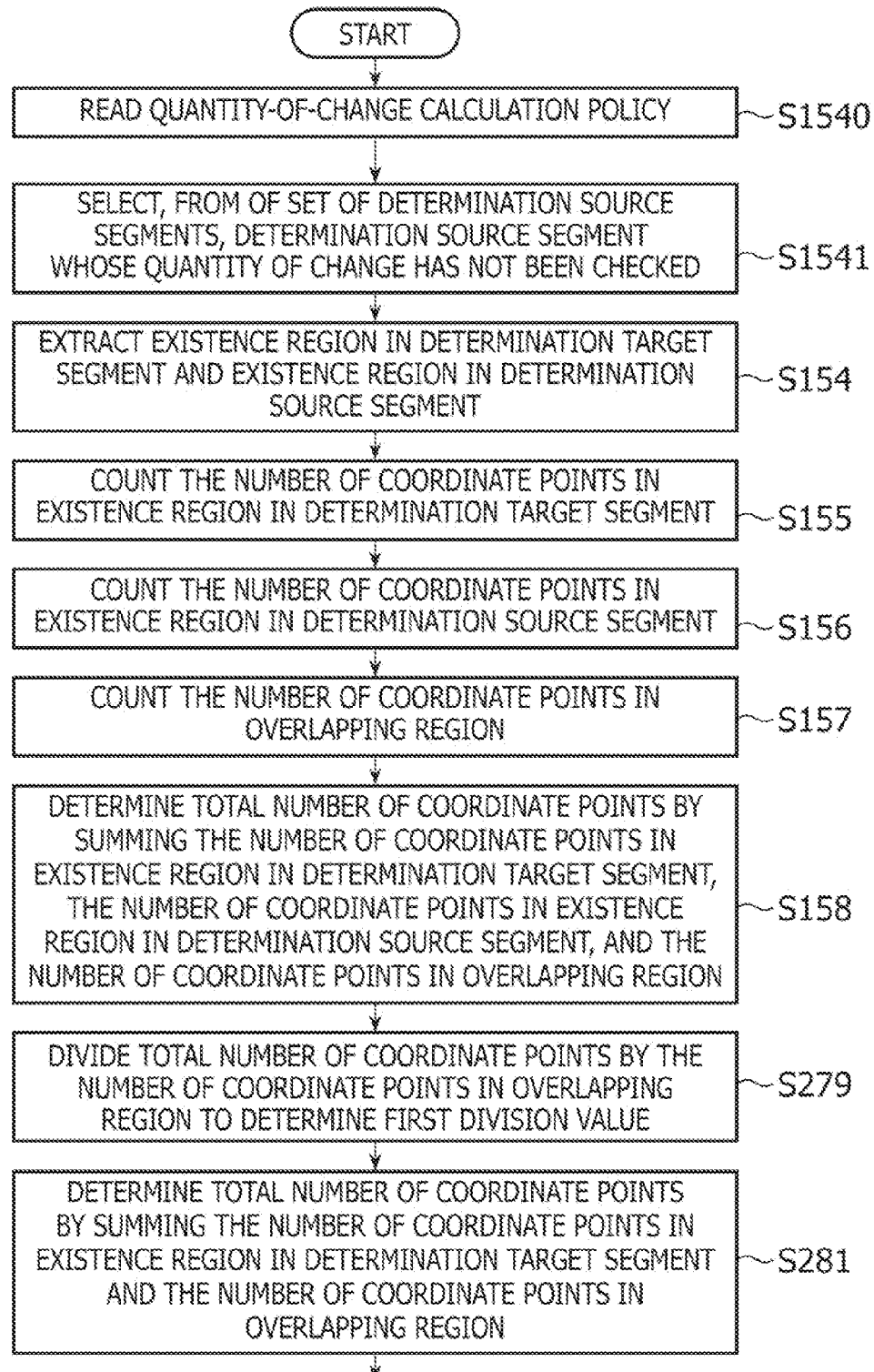
FIGS. 25A and 25B are flowcharts illustrating a fourth example of a processing procedure for calculating a quantity of change.
Figure 25B:
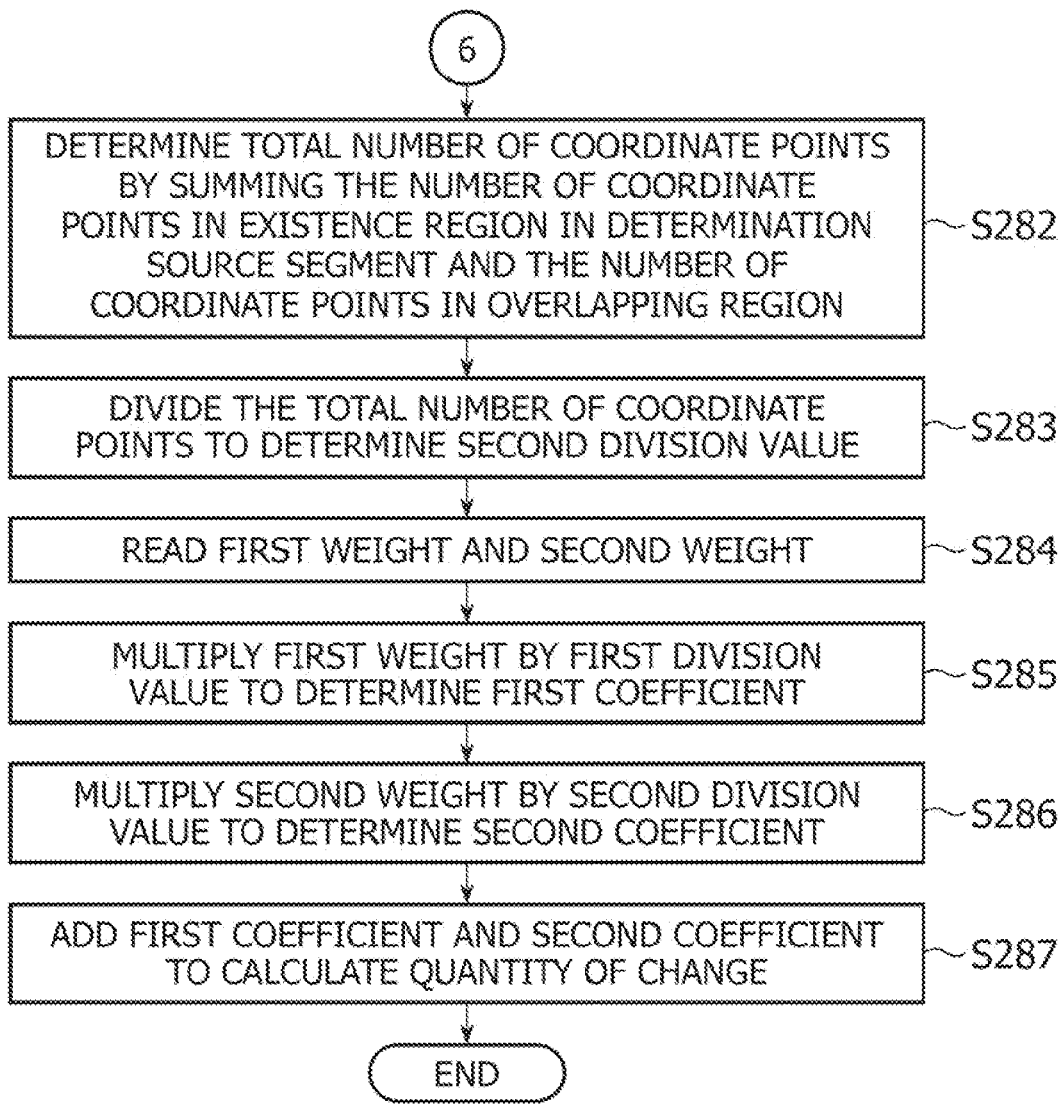

FIGS. 25A and 25B are flowcharts illustrating a fourth example of a processing procedure for calculating a quantity of change. After operation S5163 in FIG. 15, the determining unit 104 performs processing below. In operation S1540 in FIG. 25A, the determining unit 104 reads the quantity-of-change calculation policy from the policy storage unit 150. In operation S1541, the determination apparatus 1 selects, from the set of determination source segments, a determination source segment for which a quantity of change has not been checked.

In operation S154, the determining unit 104 extracts the existence region in the determination target segment and the existence region in the determination source segment. In operation S155, the determining unit 104 counts the number of coordinate points in the existence region in the determination target segment. In operation S156, the determining unit 104 counts the number of coordinate points in the existence region in the determination source segment. In operation S157, on the basis of the coordinate points in the existence region in the determination target segment and the coordinate points in the existence region in the determination source segment, the determining unit 104 counts the number of coordinate points in an overlapping region thereof. In operation S158, the determining unit 104 determines a total number of coordinate points by summing the number of coordinate points in the existence region in the determination target segment, the number of coordinate points in the existence region in the determination source segment, and the number of coordinate points in the overlapping region.

In operation S279, the determining unit 104 divides the total number of coordinate points by the number of coordinate points in the overlapping region to determine a first division value. In operation 5281, the determining unit 104 determines a total number of coordinate points by summing the number of coordinate points in the existence region in the determination target segment and the number of coordinate points in the overlapping region. In operation S282, the determining unit 104 determines a total number of coordinate points by summing the number of coordinate points in the existence region in the determination source segment and the number of coordinate points in the overlapping region. In operation S283, the determining unit 104 divides the total number of coordinate points determined in operation S281 by the total number of coordinate points determined in operation S282, to determine a second division value.

In operation S284, the determining unit 104 reads a first weight and a second weight stored in the storage unit 15. In operation S285, the determining unit 104 multiplies the first weight by the first division value to determine a first coefficient. In operation S286, the determining unit 104 multiplies the second weight by the second division value to determine a second coefficient. The first weight is, for example, 0.7 or the like and the second weight is, for example, 0.3 or the like. The operator inputs appropriate values via the input unit 13. In operation S287, the determining unit 104 adds the first coefficient and the second coefficient to calculate a quantity of change.

Figure 26:
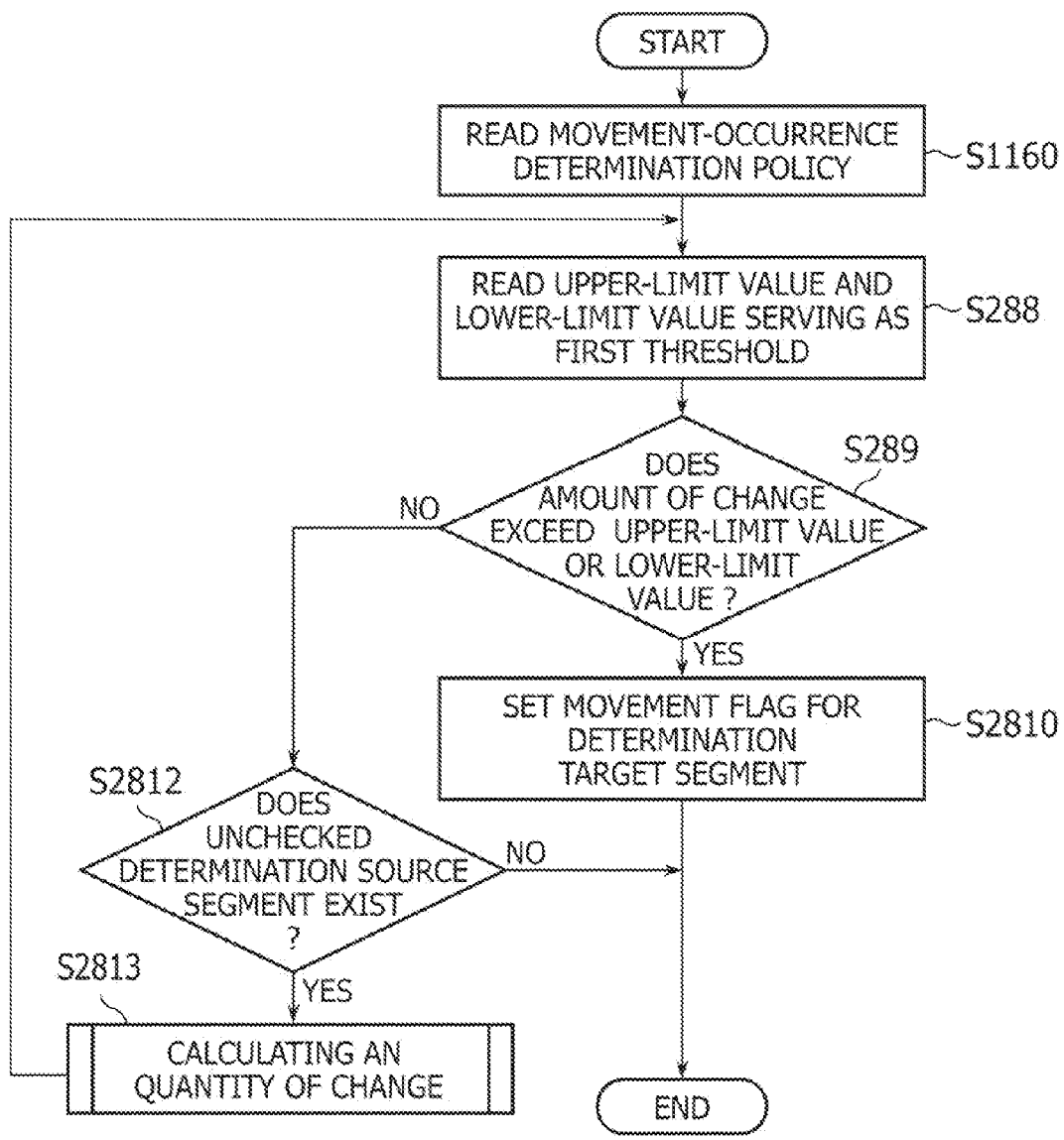
FIG. 26 is a flowchart illustrating a third example of a processing procedure for determining occurrence of a movement.

FIG. 26 is a flowchart illustrating an example of a processing procedure for determining occurrence of a movement. In operation S1160, the determining unit 104 reads the movement-occurrence determination policy from the policy storage unit 150. In operation S288, the determining unit 104 reads an upper-limit value and a lower-limit value, which serve as a first threshold, from the storage unit 15. In operation S289, the determining unit 104 determines whether or not the quantity of change calculated in operation S287 exceeds the upper-limit value or the lower-limit value. When the determining unit 104 determines that the calculated quantity of change exceeds the upper-limit value or the lower-limit value (YES in operation S289), the process proceeds to operation S2810 in which the determining unit 104 sets, in the existence-region file 152, a movement flag for the determination target segment. For example, when the upper-limit value is 3 and the quantity of change is 8, the determining unit 104 sets a movement flag. When the lower-limit value is ⅓ and the quantity of change is ¼, the determining unit 104 also sets a movement flag.

When the determining unit 104 determines that the quantity of change does not exceed the upper-limit value or the lower-limit value (NO in operation S289), the process proceeds to operation S2812 in which the determining unit 104 determines whether or not any unchecked determination source segment exists. When the determining unit 104 determines that no unchecked determination source segment exists (NO in operation S2812), the processing ends. When the determining unit 104 determines that any unchecked determination source segment exists (YES in operation S2812), the process proceeds to operation S2813 in which the determining unit 104 calculates a quantity of change. After calculating a quantity of change ends, the process proceeds to operation S288 and the determining unit 104 further performs comparison with a prior determination source segment in time series. After the processing in operation S2810, the determining unit 104 ends the series of processing. The above-described processing makes it possible to perform quantity-of-change calculation comprehensively considering both of the size of the area of the overlapping region and the difference between the areas of the existence regions and also makes it possible to execute a more accurate movement determination.

Since other configurations and processing of the fifth embodiment described above are substantially the same as those of the first to fourth embodiments, corresponding elements and operations are denoted by the same reference numerals and detailed descriptions thereof are not given hereinafter. Although examples in which a movement-occurrence determination is made based on the two indices have been described above in the third to fifth embodiments, a movement-occurrence determination using similar weighted calculation may also be made in a case in which the determination is performed based on three or more indices.

Sixth Embodiment

Figure 27:
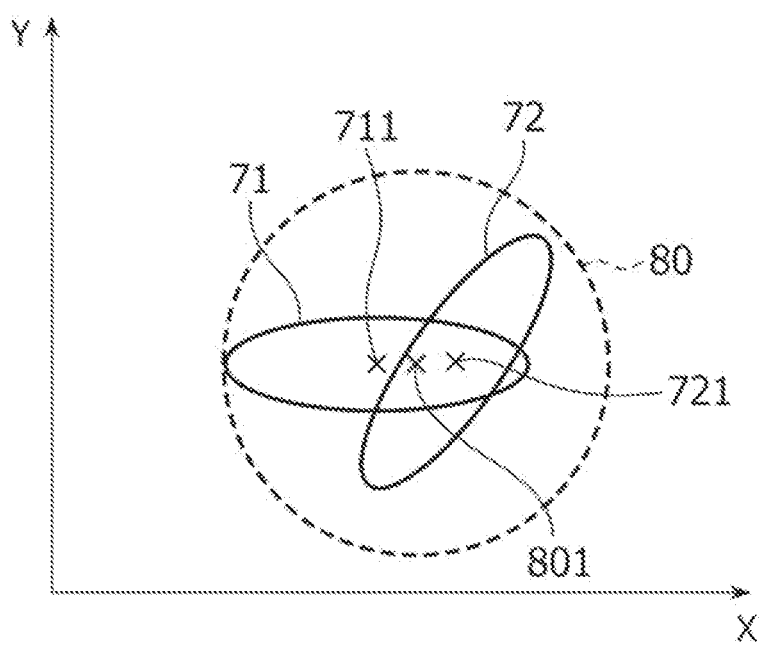
FIG. 27 illustrates a first example of error regions and an existence region.

A sixth embodiment is directed to processing for estimating an existence region. FIG. 27 illustrates an example of error regions and an existence region. Reference numerals 71 and 72 represent error regions in a desired segment. Reference numeral 711 represents an estimated coordinate point in the error region 71 and reference numeral 721 represents an estimated coordinate point in the error region 72. The estimating unit 103 reads, from the history file 151, coordinated points in the error regions in the segment. The estimating unit 103 may store, as the existence region in the existence-region file 152, a region surrounded by a desired shape obtained when a plurality of error regions are regarded as a single error region. The estimating unit 103 may execute the filtering performed in operation S131 or S138, in order to enhance the accuracy of estimating the existence region.

The estimating unit 103 may also estimate, as the existence region, a shape such like circle, ellipse or polygon, surrounding a plurality of error regions in the segment. For example, as illustrated in FIG. 27, the estimating unit 103 determines a specific coordinate point 801 on the basis of the average value of the coordinate values of the estimated coordinate points 711 and 721. The estimating unit 103 determines, as an existence region 80, a shape having its center at the estimated coordinate point 801 and surrounding the error regions 71 and 72. A description below is given of an example in which an ellipse surrounding a plurality of error regions in a segment is estimated as an existence region.

Figure 28A:
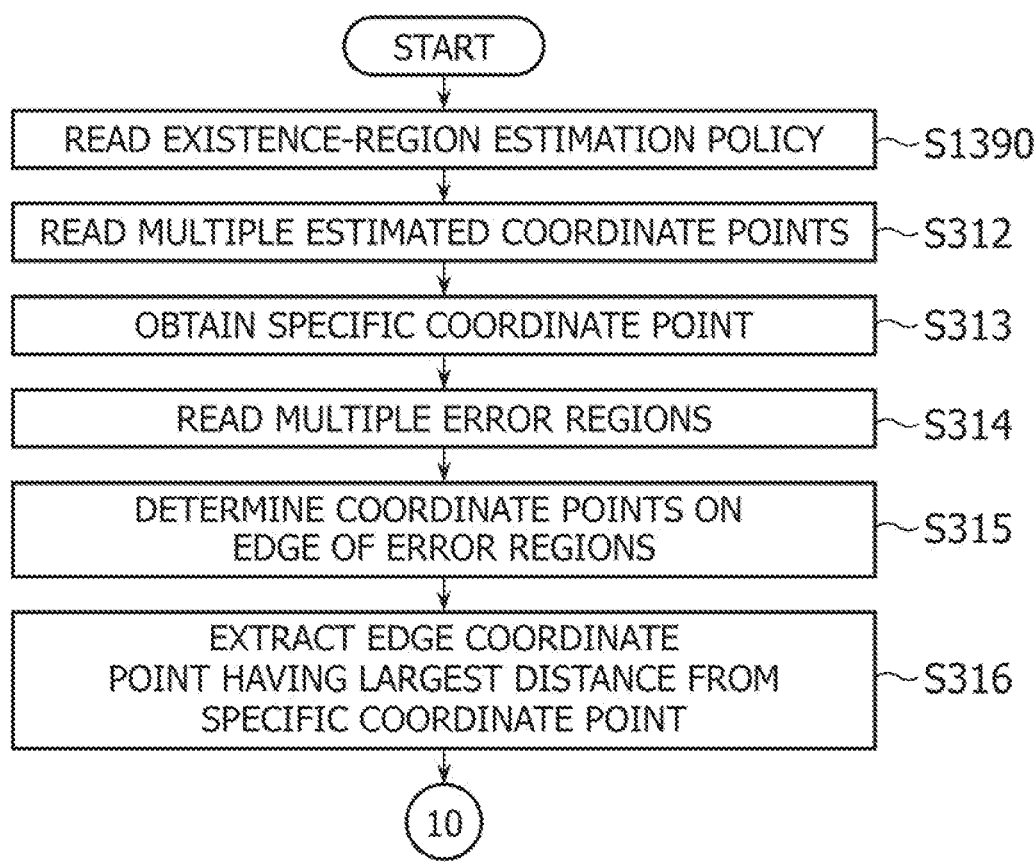
FIGS. 28A and 28B are flowcharts illustrating a second example of a processing procedure for estimating an existence region.
Figure 28B:
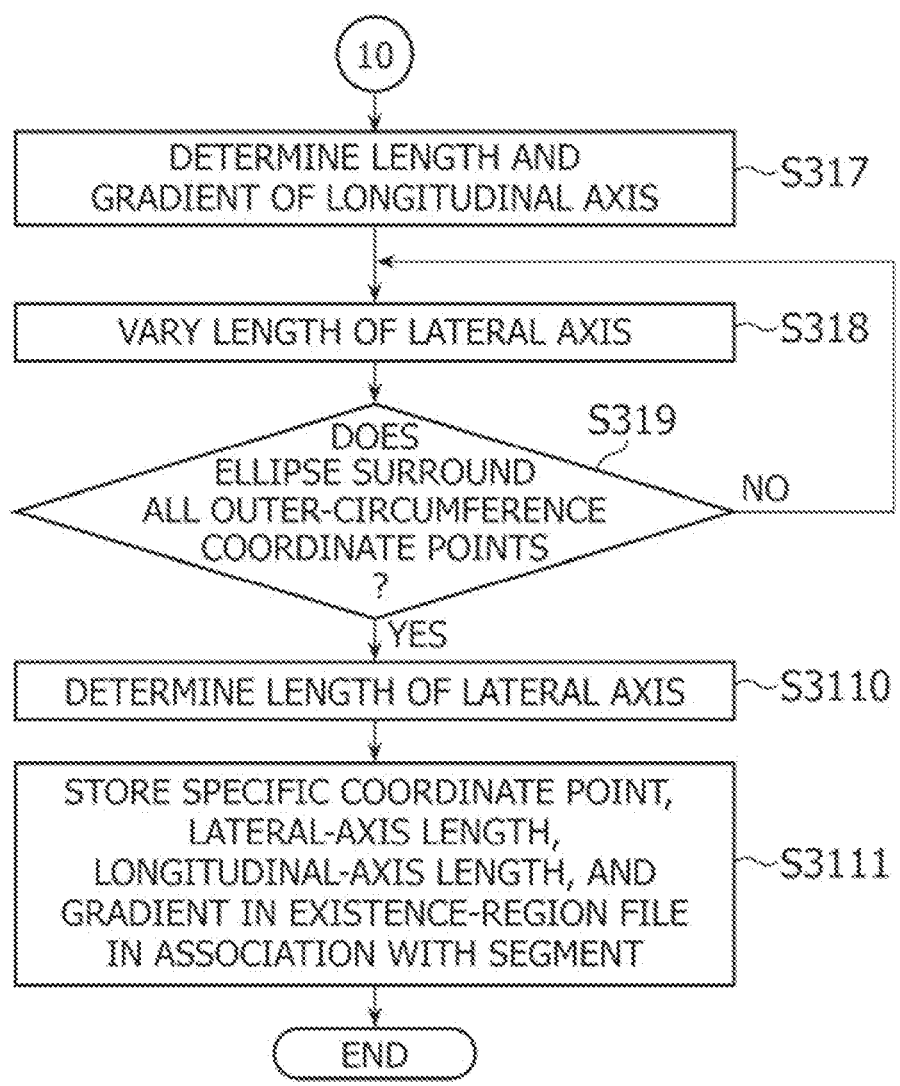

FIGS. 28A and 28B are flowcharts illustrating a second example of a processing procedure for estimating an existence region. In operation S1390, the estimating unit 103 reads the existence-region estimation policy from the policy storage unit 150. In operation S312, the estimating unit 103 reads, from the history file 151, a plurality of estimated coordinate points from the records of estimated coordinate points and error regions. In operation S313, the estimating unit 103 obtains a specific coordinate point. For example, the estimating unit 103 may determine the average coordinate point of the plurality of estimated coordinate points and use the determined average coordinate point as the specific coordinate point.

In operation S314, the estimating unit 103 reads, from the history file 151, a plurality of error regions from the records of the estimated coordinate points and the error regions. In operation S315, the estimating unit 103 determines coordinate points on the edges of the read error regions. For example, the estimating unit 103 may determine the coordinate points of the edges by mapping the error regions onto coordinate points and performing edge detection. In operation S316, the estimating unit 103 extracts an edge coordinate point having a largest distance from the specific coordinate point determined in operation S313.

In operation S317, the estimating unit 103 determines a length and a gradient of an ellipse longitudinal axis on the basis of the specific coordinate point and the extracted edge coordinate point. In operation S318, the estimating unit 103 varies the length of the ellipse lateral axis. In operation S319, the estimating unit 103 determines whether or not an ellipse defined by the ellipse longitudinal axis and lateral axis surrounds all of the edge coordinate points determined in operation S315.

When the estimating unit 103 may not determine that the ellipse surrounds all of the edge coordinate points (NO in operation S319), the process returns to operation S318. Thus, the estimating unit 103 varies the length of the lateral axis, as appropriate, until the ellipse reaches a size that surrounds all of the edge coordinate points. The lateral axis corresponds to the perpendicular bisector of the longitudinal axis.

When the estimating unit 103 determines that the ellipse surrounds all of the edge coordinate points (YES in operation S319), the process proceeds to operation S3110 in which the estimating unit 103 determines the length varied in operation S318 as the length of the lateral axis of the ellipse. In operation S3111, the estimating unit 103 stores the specific coordinate point, the lateral-axis length, the longitudinal-axis length, and the gradient, determined in the above-described processing, in the existence-region file 152 in association with the segment. When the estimating unit 103 uses the region surrounded by the edge coordinate points as the existence region, the coordinate points in the region surrounded by the edge coordinate points determined in operation S315 may be stored in the existence-region file 152 in association with the segment. When the estimating unit 103 uses a shape, for example a circle, an ellipse or a polygon surrounding the edge coordinate points as the existence region, a circle having its center at the specific coordinate point determined in operation S313 and using the longitudinal-axis length determined in operation S317 as the radius may be stored in the existence-region file 152. With this arrangement, even when the error regions have various shapes, the estimating unit 103 may estimate the existence region with high accuracy.

Since other configurations and processing of the sixth embodiment described above are substantially the same as those of the first to fifth embodiments, corresponding elements and operations are denoted by the same reference numerals and detailed descriptions thereof are not given hereinafter.

Seventh Embodiment

Figure 29:
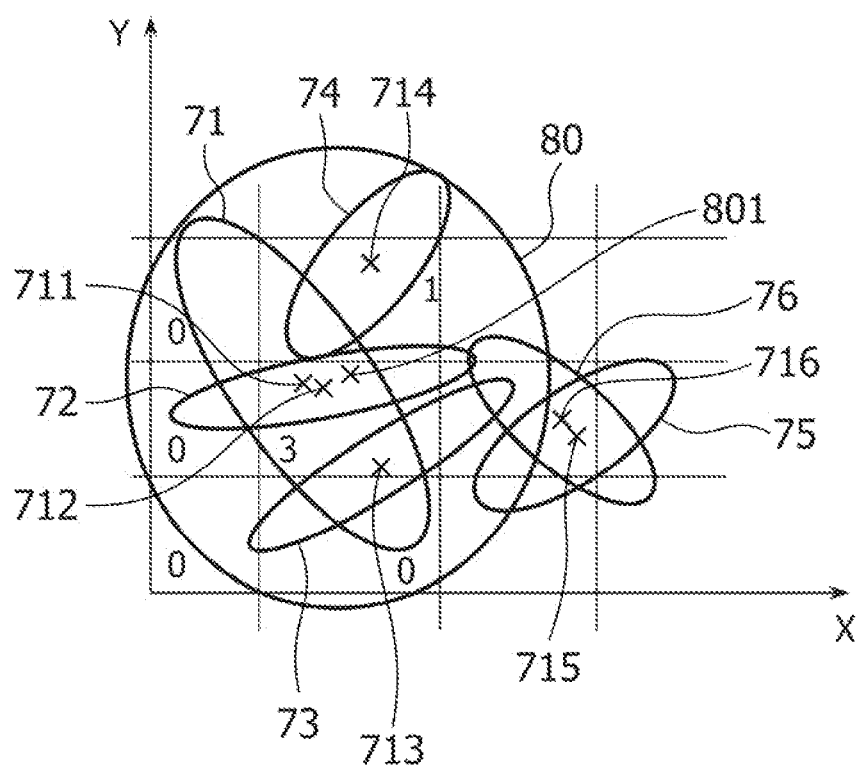
FIG. 29 illustrates a second example of error regions and an existence region.

A seventh embodiment is directed to an embodiment for estimating an existence region on the basis of the degree of concentration of estimated coordinate points. FIG. 29 illustrates a second example of error regions and an existence region. In the example of FIG. 29, six error regions 71 to 76 are illustrated. Reference numerals 711, 712, 713, 714, 715, and 716 represent estimated coordinate points in the error regions 71, 72, 73, 74, 75, and 76 respectively. The estimating unit 103 sets areas and extracts one area in which a largest number of estimated coordinate points exist in the set areas. The shape of the areas may be, for example, a circular or polygonal shape (e.g., a triangular, rectangular, pentagonal, or hexagonal shape). FIG. 29 illustrates, as an example of the area, a rectangular area having 200 coordinate points in the X-axis direction and 150 coordinate points in the Y-axis direction.

In this example, the estimating unit 103 extracts an area in which three estimated coordinate points 711, 712, and 713 of the error regions 71, 72, and 73 exist as illustrated in FIG. 29. An area in which the estimated coordinate points 715 and 716 exist has only two estimated coordinate points therein and is thus excluded from the area to be extracted. An area in which the estimated coordinate point 714 exists has only one estimated coordinate point therein and is thus excluded from the area to be extracted.

The estimating unit 103 extracts the error regions having the estimated coordinate points in the extracted area. The estimating unit 103 estimates an existence region on the basis of the extracted error regions or the estimated coordinate points. The estimating unit 103 may estimate the existence region by using any of the above-described methods according to the first to sixth embodiments. For example, in FIG. 29, the estimating unit 103 determines, as a specific coordinate point 801, an average coordinate point of the extracted estimated coordinate points and determines, as the existence region, a shape having its center at the specific coordinate point 801 and surrounding the extracted error regions. In the present embodiment, a description is given of an example in which a shape having its center point at the specific coordinate point in the extracted estimated coordinate regions and surrounding the extracted error regions is estimated as the existence region.

Figure 30A:
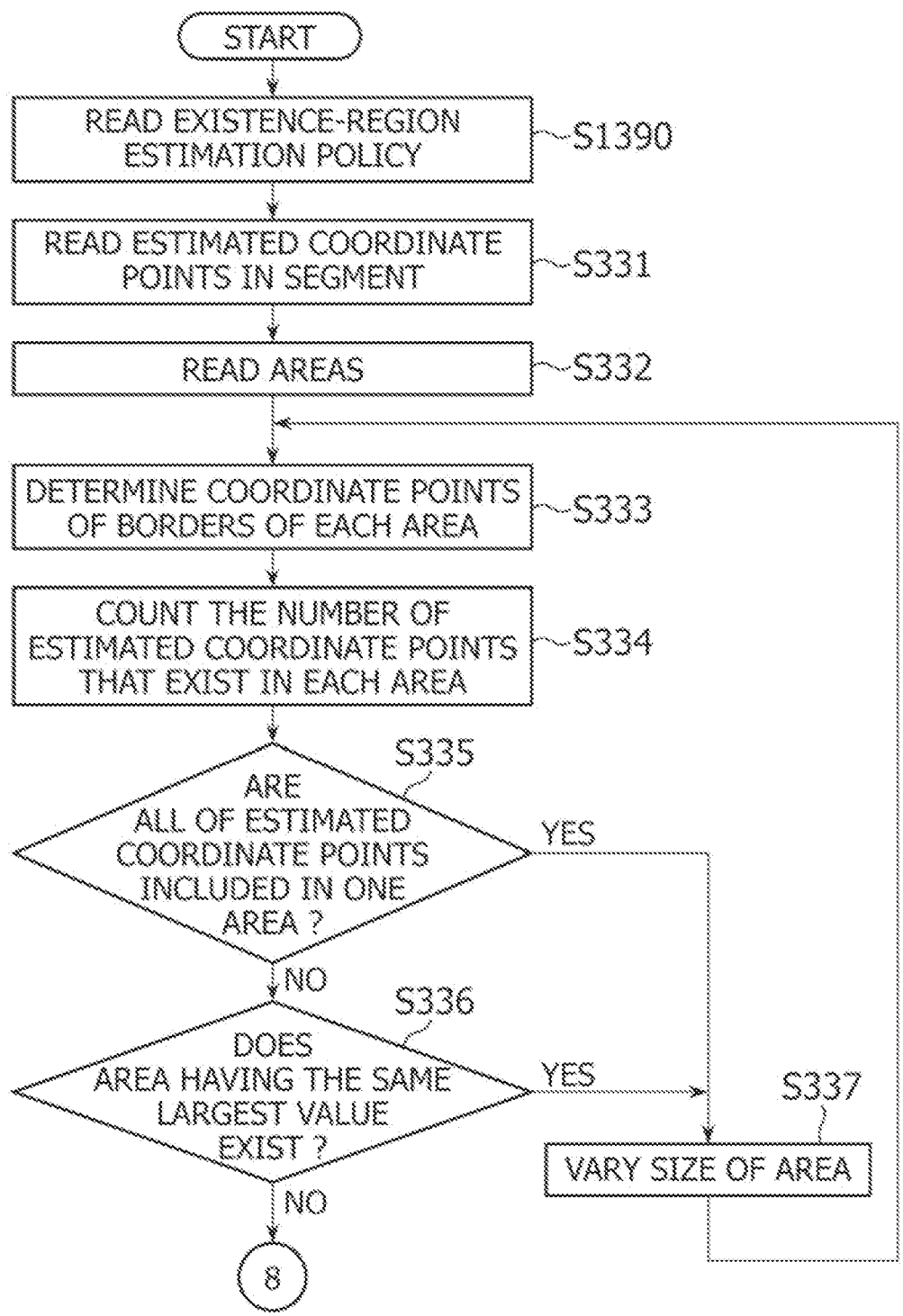
FIGS. 30A and 30B are flowcharts illustrating a third example of a processing procedure for estimating an existence region.
Figure 30B:
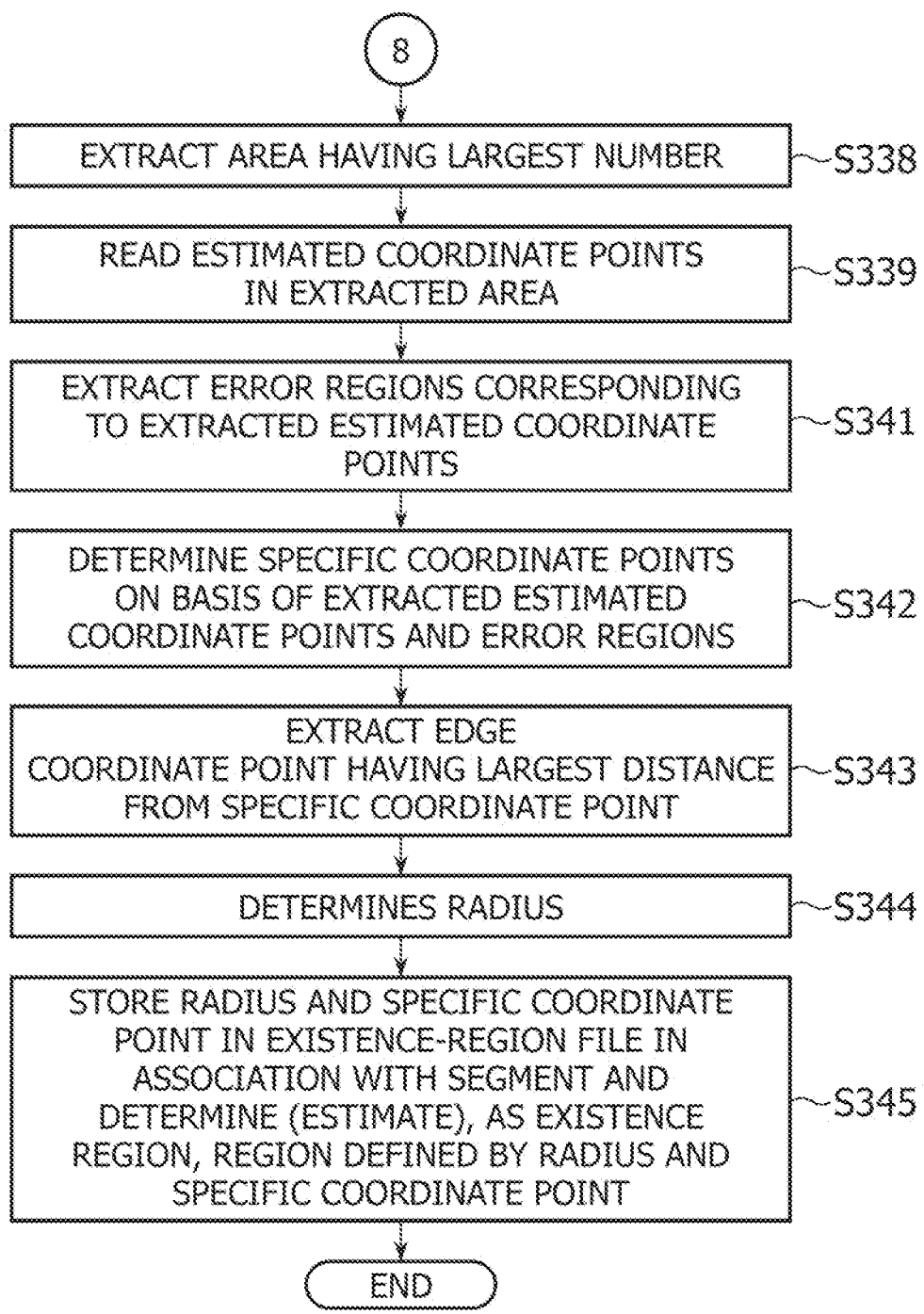

FIGS. 30A and 30B are flowcharts illustrating a third example of a processing procedure for estimating an existence region. In operation S1390, the estimating unit 103 reads the existence-region estimation policy from the policy storage unit 150. In operation S331, the estimating unit 103 refers to the history file 151 to read estimated coordinate points in a segment. In operation S332, the estimating unit 103 reads an area pre-stored in the storage unit 15. The area may be an appropriate area input by the operator via the input unit 13. When the area has a rectangular shape, for example, the number of horizontal-axis coordinate points and the number of vertical-axis coordinate points are input. In operation S333, the estimating unit 103 determines coordinate points of borders of each area. For example, the estimating unit 103 sets one area at the coordinate origin and arranges a plurality of areas in the X-axis and Y-axis directions with reference to the set area. The estimating unit 103 further determines coordinate points at the borders of the areas on the basis of the input number of horizontal-axis coordinate points and the input number of vertical-axis coordinate points. In operation S334, the estimating unit 103 counts the number of estimated coordinate points that exist in each of the areas.

In operation S335, the estimating unit 103 determines whether or not all of the estimated coordinate points are included in one of the areas. Upon determining that all of the estimated coordinate points are included in one of the areas (YES in operation S335), the estimating unit 103 varies the size of the areas in operation S337. For example, the estimating unit 103 reduces the input number of horizontal-axis coordinate points and the input number of vertical-axis coordinate points. Alternatively, the estimating unit 103 may reduce either the number of horizontal-axis coordinate points or the number of vertical-axis coordinate points. After operation S337, the estimating unit 103 returns the process to operation S333. When the estimating unit 103 may not determine that all of the estimated coordinate points are included in one of the areas (NO in operation S335), the process proceeds to operation S336.

In operation S336, the estimating unit 103 determines whether or not an area in which estimated coordinate points the number of which is the same as a largest value of the number of estimated coordinate points counted in operation S334 exists. Upon determining that an area having the same number of estimated coordinate points as the largest value exists (YES in operation S336), the estimating unit 103 varies the size of the area in operation S337. In this case, the estimating unit 103 may increase or reduce either the number of horizontal-axis coordinate points or the number of vertical-axis coordinate points or both of the number of horizontal-axis coordinate points and the number of veridical-axis coordinate points, as needed. After operation S337, the estimating unit 103 returns the process to operation S333.

When the estimating unit 103 determines that an area having the same largest value does not exist (NO in operation S336), it extracts the area having the largest number of estimated coordinate points in operation S338. In operation S339, the estimating unit 103 reads the estimated coordinate points in the extracted area. In operation S341, the estimating unit 103 refers to the history file 151 to extract error regions corresponding to the extracted estimated coordinate points. In operation S342, the estimating unit 103 determines a specific coordinate point on the basis of the extracted estimated coordinate points and the error regions. The estimating unit 103 may determine the average value of the coordinate values of the coordinate points at the border and use the average value to indicate the specific coordinate point. In operation S343, the estimating unit 103 refers to the edge coordinate points of the error regions, extracted in operation S341, to extract an edge coordinate point having a largest distance from the specific coordinate point.

In operation S344, the estimating unit 103 determines a radius on the basis of the extracted edge coordinate point and the specific coordinate point. As a result of the above-described processing, a shape including the extracted error regions is estimated as an existence region. In operation S345, the estimating unit 103 stores the determined radius and the specific coordinate point in the existence-region file 152 in association with the corresponding segment and determines (estimates), as an existence region, a region defined by the radius and the specific coordinate point. In the present embodiment, the estimating unit 103 may also execute the filtering on the estimated coordinate points and the error regions, as described above in the sixth embodiment. The above-described processing makes it possible to perform existence-region estimation that places an emphasis on an area in which a larger number of error regions are concentrated.

Since other configurations and processing of the seventh embodiment described above are substantially the same as those of the first to sixth embodiments, corresponding elements and operations are denoted by the same reference numerals and detailed descriptions thereof are not given hereinafter.

Eighth Embodiment

Figure 31:
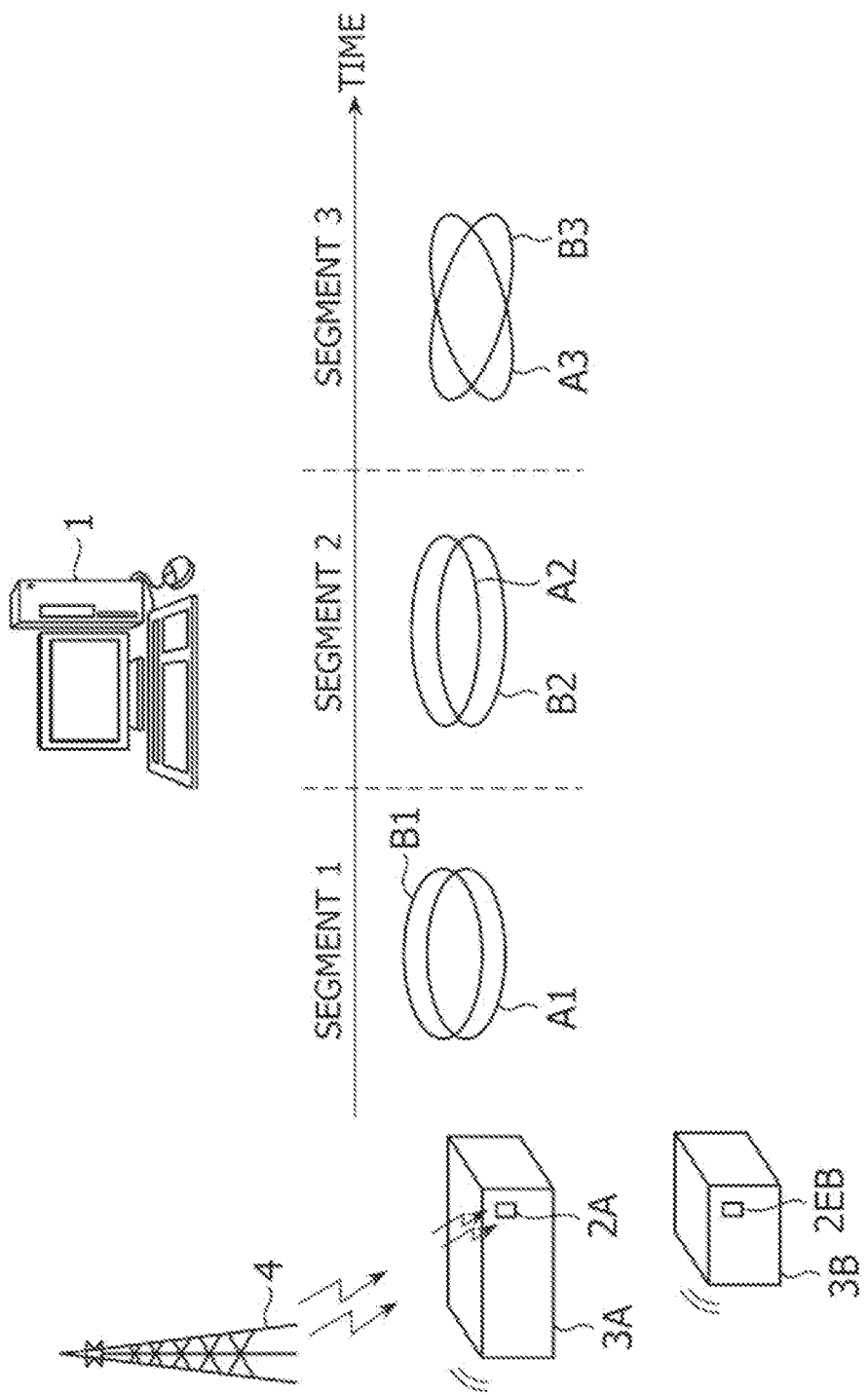
FIG. 31 illustrates a second example of a determination system.

An eighth embodiment is directed to an embodiment using a nearby locating device 2. FIG. 31 illustrates a second example of a determination system according to the eighth embodiment. A locating device 2A is attached to a machine tool 3A and a locating device 2B is attached to a machine tool 3B. Although an example using two machine tools 3A and 3B (which may hereinafter be represented by 3) and two locating devices 2A and 2B (which may hereinafter be represented by 2) is described below for ease of description in the present embodiment, the numbers are not limited thereto. The number of machine tools 3 and the number of locating devices 2 may be any plural number, for example, 3 or more.

The acquiring unit 101 (illustrated in FIG. 5) of the determination apparatus 1 transmits the measurement timing policies having substantially the same condition to the locating device 2A and 2B. In accordance with the measurement timing policies, the locating devices 2A and 2B obtain respective plurality of position information and transmit the plurality of position information to the determination apparatus 1. The classifying unit 102 classifies the plurality of position information into corresponding segments and the estimating unit 103 estimates existence regions in each of the segments. FIG. 31 illustrates existence regions in segments 1 to 3. In the segments 1 to 3, it is estimated that the existence regions of the locating device 2A are regions A1, A2, and A3. In the segments 1 to 3, it is estimated that the existence regions of the locating device 2B are regions B1, B2, and B3. In the present embodiment, the determining unit 104 calculates a quantity of change between the existence region of the locating device 2A and the existence region of the locating device 2B. When the quantity of change is small, it may be regarded that the locating device 2A and the locating device 2B exist in proximity to each other (or in a desired range).

In this case, the determining unit 104 uses the existence region of the nearby locating device 2B to make a movement-occurrence determination on the locating device 2A.

Figure 32:
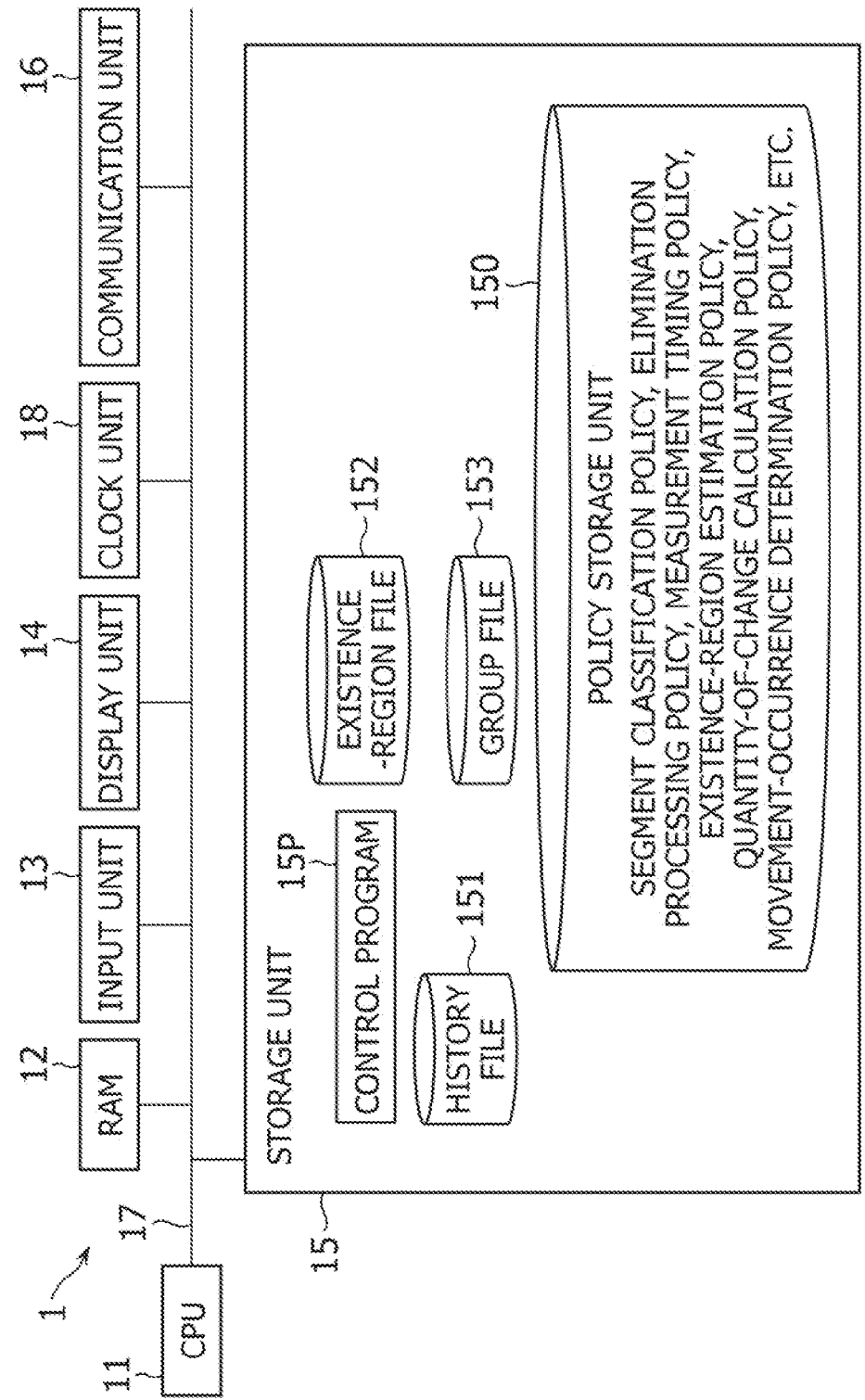
FIG. 32 is a diagram illustrating a second example of hardware of a determination apparatus.

FIG. 32 is a diagram illustrating a second example of hardware of the determination apparatus 1 according to the eighth embodiment. A group file 153 is further stored in the storage unit 15. FIG. 33 illustrates an example of a record layout of the group file 153. The group file 153 includes, for example, group-ID fields, locating-device-ID fields and determination-segment fields. A unique ID for identifying a group of locating devices determined to exist in proximity to each other is included in each group-ID field. Locating-device IDs for identifying the locating device 2 determined to exist in proximity to each other are included in each locating-device ID field in association with the corresponding group ID.

A segment used for determining whether or not the locating devices 2 exist in proximity to each other is included in each determination-segment field in association with the corresponding group ID. For example, the information of the group with group ID "01" indicates that it was confirmed that a locating device 2A with locating-device ID "A" and a locating device 2B with locating-device ID "B" existed in proximity to each other in the determination segment "2009/04/01/10:00-10:10".

The determining unit 104 makes a determination at an appropriate time as to whether or not the locating devices 2 exist in proximity to each other, sets a group ID for the group of the locating devices 2 that exist in proximity to each other, and stores the locating-device IDs and the determination segment in the group file 153 in association with the group ID. The locating device IDs are transmitted from the locating devices 2 to the acquiring unit 101 in conjunction with the estimated coordinate points and the error regions. As a measurement timing policy for determining whether or not the locating devices 2 exist in proximity to each other, the determination apparatus 1 generally issues an instruction for causing position location at shorter intervals than the intervals specified by the measurement timing policy used in the first to seventh embodiments. The determining unit 104 may also determine whether or not the locating devices 2 exist in proximity to each other, on the basis of the position information obtained in any of the first to seventh embodiments.

Figure 34:
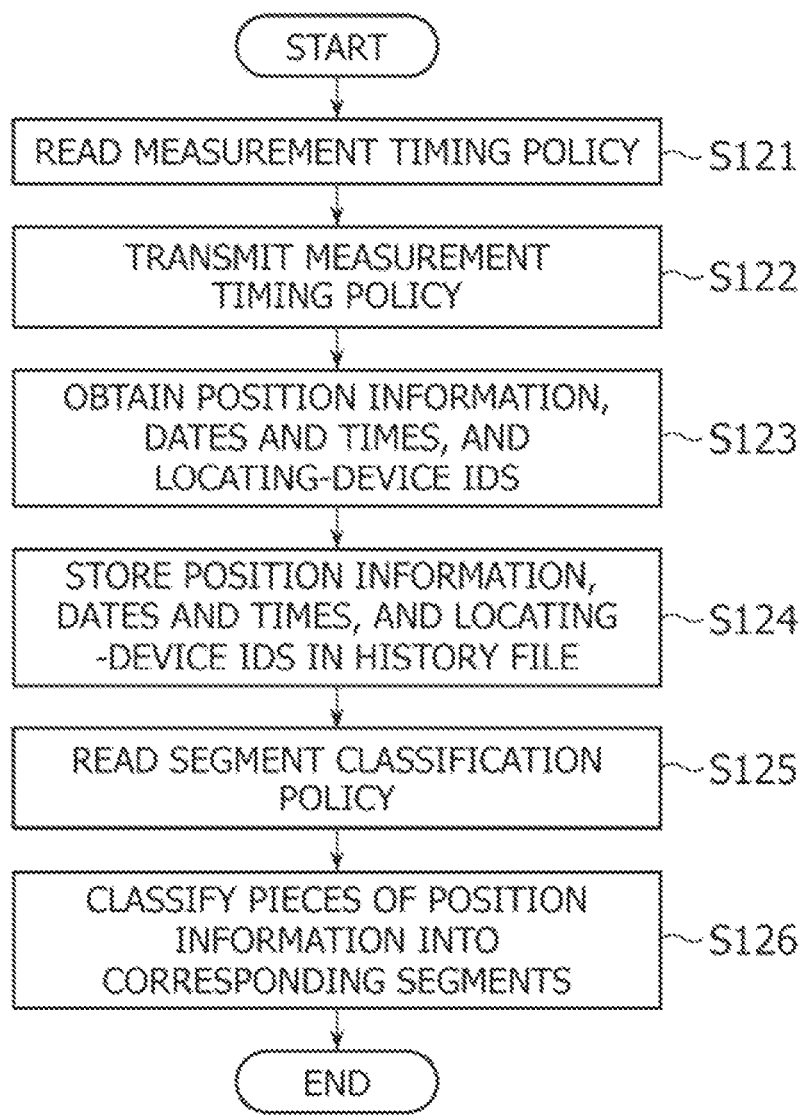
FIG. 34 is a flowchart illustrating a second example of a processing procedure from position-information acquirement to segment classification.

FIG. 34 is a flowchart illustrating a second example of a procedure from the position-information acquirement to the segment classification. In operation S121, the acquiring unit 101 reads the measurement timing policy from the policy storage unit 150 in the storage unit 15. In operation S122, the acquiring unit 101 transmits the read measurement timing policy to a plurality of locating devices 2 to instruct them to perform position location on the same condition. In accordance with the measurement timing policy, each locating device 2 performs position location and transmits the resulting position information, the position-location date and time, and the locating-device ID to the determination apparatus 1. Each locating device 2 may transmit one or both of the estimated coordinate points and the error regions as the poison information.

In operation S123, the determination apparatus 1 obtains the position information, the dates and times, and the locating-device IDs transmitted from the locating devices 2. In operation S124, the acquiring unit 101 stores, in the history file 151, the obtained position information, the dates and times, and the locating-device IDs. As a result of the above-described processing, the position-location data of the locating devices 2 are accumulated. In operation S125, the d classifying unit 102 reads the segment classification policy from the policy storage unit 150. In operation S126, the classifying unit 102 refers to a segment specified by the segment classification policy and classifies the plurality of position information into corresponding segments.

Figure 35:
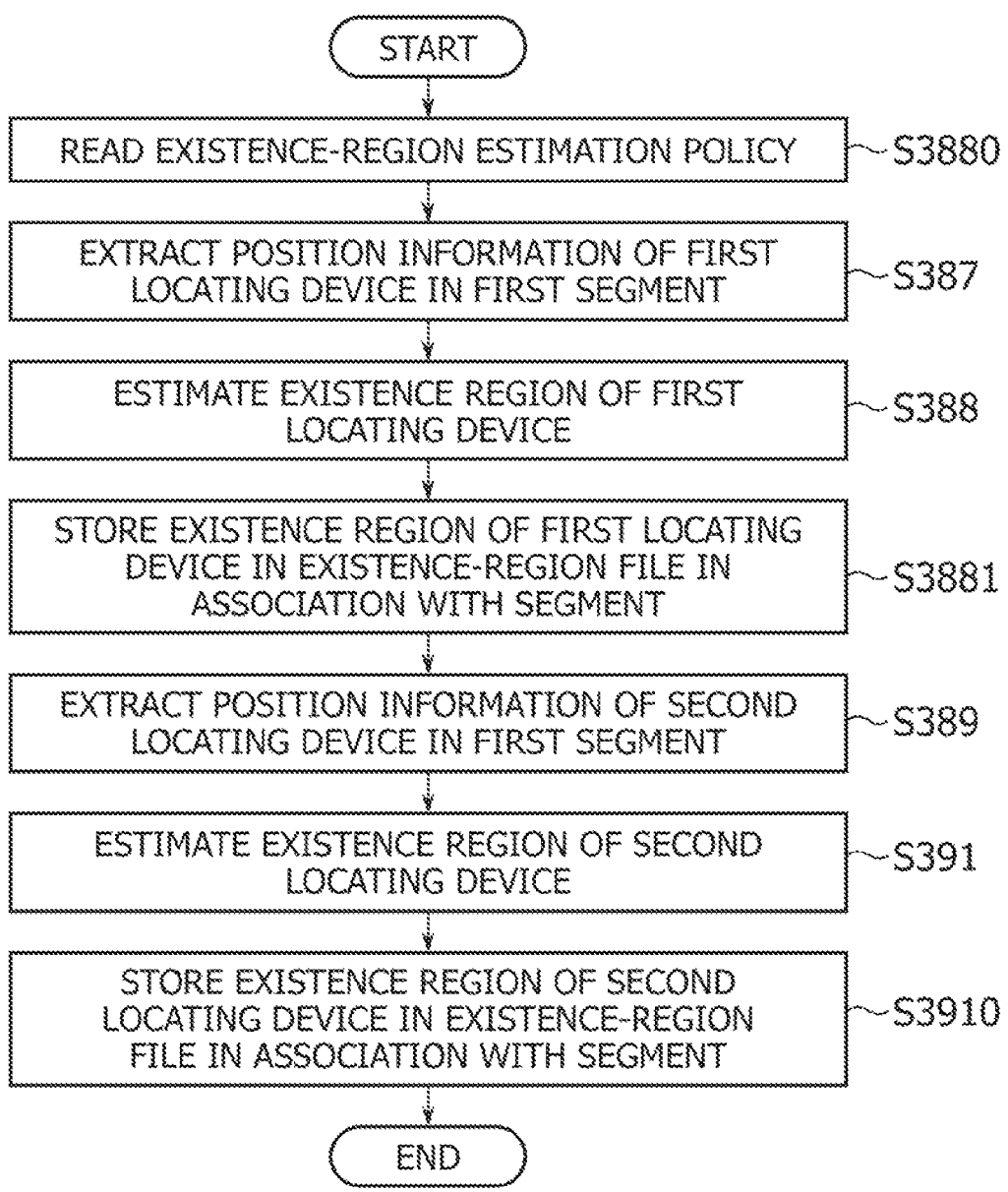
FIG. 35 is a flowchart illustrating a fourth example of a processing procedure for estimating an existence region.

FIG. 35 is a flowchart illustrating a fourth example of a processing procedure for estimating an existence region. In operation S3880, the estimating unit 103 reads the existence-region estimation policy from the policy storage unit 150. In operation S387, the estimating unit 103 extracts estimated coordinate points and error regions of a first locating device 2 in a first segment.

In operation S388, the estimating unit 103 estimates the existence region of the first locating device 2 by using the above-described method in the other embodiments. In operation S3881, the estimating unit 103 stores the existence region of the first locating device 2 in the existence-region file 152 in association with the first segment. In operation S389, the estimating unit 103 extracts position information (estimated coordinate points and error regions) of a second locating device 2 in a first segment. The first segment in operation S387 and the first segment in operation S389 may be the same segment, but are not limited thereto. The estimating unit 103 may extract another segment. In the present embodiment, a description is given assuming that the first segment is a most recent segment. In operation S391, the estimating unit 103 estimates the existence region of the second locating device 2. In operation S3910, the estimating unit 103 stores the existence region of the second locating device 2 in the existence-region file 152 in association with the segment. Processing in FIGS. 34 and 35 is substantially the same as the processing illustrated in the other embodiments described above.

Figure 36:
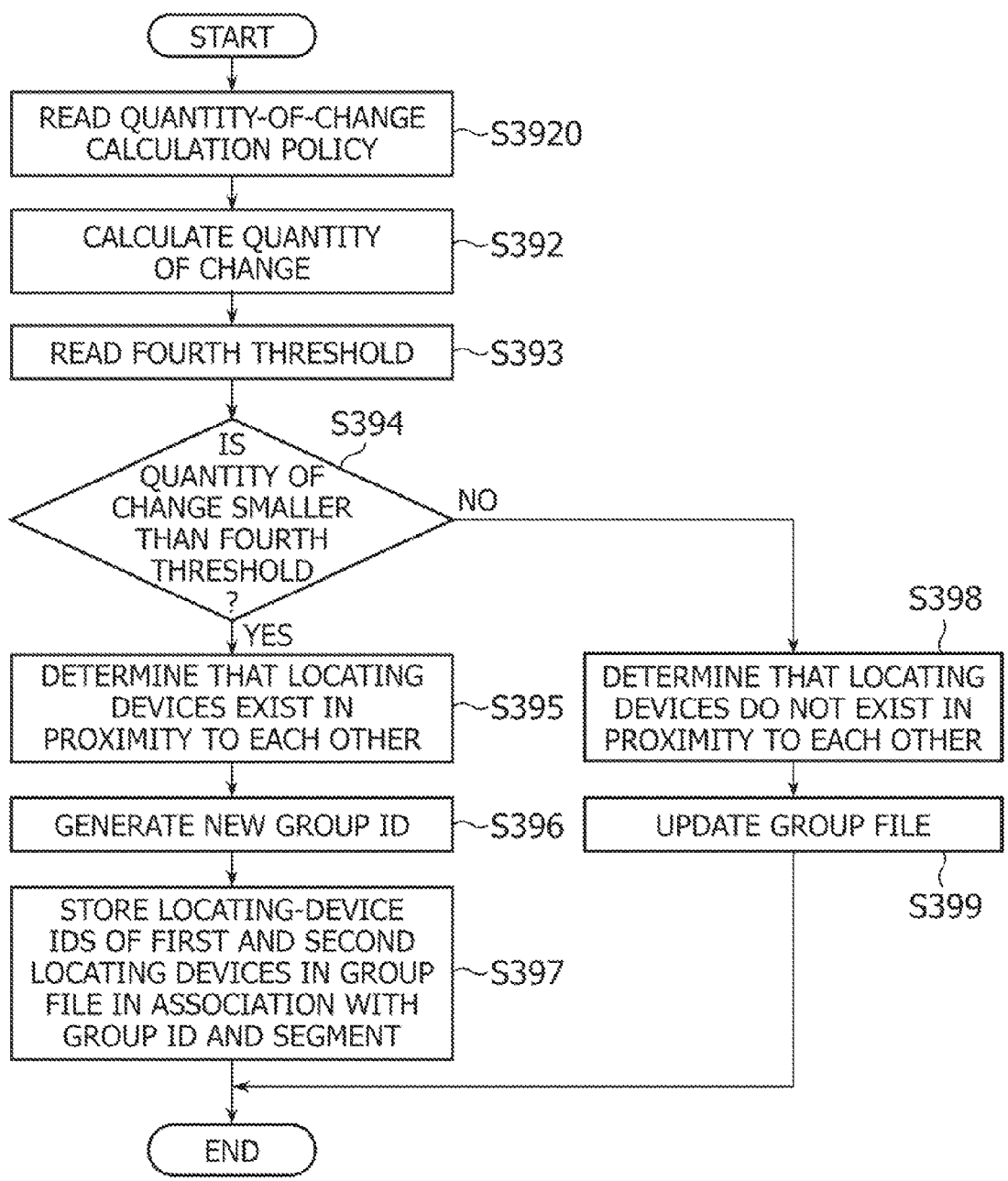
FIG. 36 is a flowchart illustrating an example of a processing procedure for determining whether or not the locating devices exist in proximity to each other.

FIG. 36 is a flowchart illustrating an example of a processing procedure for determining whether or not the locating devices exist in proximity to each other. In operation S3920, the determining unit 104 reads the quantity-of-change calculation policy from the policy storage unit 150. In operation S392, on the basis of the existence region estimated in operation S388 and the existence region estimated in operation S391, the determining unit 104 calculates a quantity of change by using the method described in the other embodiments. In operation S393, the determining unit 104 reads a fourth threshold from the storage unit 15. The fourth threshold may be an appropriate value input via the input unit 13, similarly to the first to third thresholds described in the above embodiments. The determining unit 104 stores the value, input via the input unit 13, as the fourth threshold for determining whether or not the locating devices 2 exist in proximity to each other.

In operation S394, the determining unit 104 determines whether or not the quantity of change calculated in operation S392 is smaller than the fourth threshold. When the determining unit 104 determines that the quantity of change is smaller than the fourth threshold (YES in operation S394), the process proceeds to operation S395 in which the determining unit 104 determines that the locating devices 2 exist in proximity to each other. In operation S396, the determining unit 104 generates a new group ID. The determining unit 104 reads the first segment used in operation S387. In operation S397, the determining unit 104 stores the locating-device IDs of the first and second locating devices 2 in the group file 153 in association with the generated group ID and the read first segment. When the quantity of change is not smaller than the fourth threshold (NO in operation S394), the process proceeds to operation S398 in which the determining unit 104 determines that the locating devices 2 do not exist in proximity to each other.

The determining unit 104 refers to the group file 153 to determine whether or not the first locating device 2 and the second locating device 2 which are determined not to exist in proximity to each other are associated with the same group ID. When the first locating device 2 and the second locating device 2 are not associated with the same group ID, the determining unit 104 ends the processing. When the first locating device 2 and the second locating device 2 are associated with the same group ID, the process proceeds to operation S399 in which the determining unit 104 performs processing, such as deleting records associated with the group ID, to update the group file 153. The determining unit 104 performs the above-described processing at an appropriate timing to update the group file 153.

Since other configurations and processing of the eighth embodiment described above are substantially the same as those of the first to seventh embodiments, corresponding elements and operations are denoted by the same reference numerals and detailed descriptions thereof are not given hereinafter.

Ninth Embodiment

A ninth embodiment is directed to an embodiment in which a plurality of existence regions of another locating device 2 are used. In the ninth embodiment, a description will be given of an example in which, in FIG. 31, the last existence region A3 of the locating device 2A serving as a determination target is used as a determination target segment and the existence regions B3, B2, and B1 of the locating devices 2B serving as a determination source are compared with each other.

Figure 37:
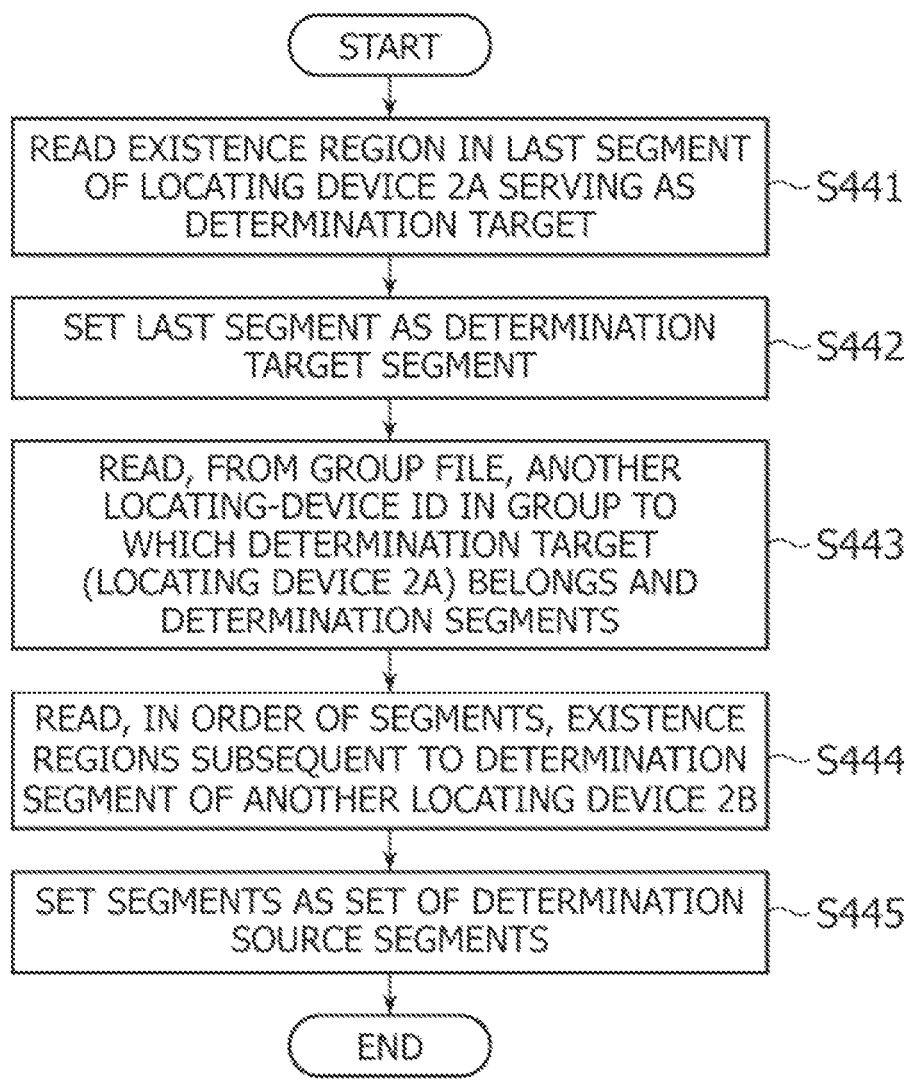
FIG. 37 is a flowchart illustrating an example of a processing procedure for reading the existence region in a determination target segment and the existence regions in a set of determination source segments.

FIG. 37 is a flowchart illustrating an example of a processing procedure for reading the existence region in a determination target segment and the existence regions in a set of determination source segments. In operation S441, the determining unit 104 reads the existence region in the last segment of the locating device 2A serving as a determination target. In operation S442, the determining unit 104 sets the last segment as a determination target segment. In operation S443, the determining unit 104 reads, from the group file 153, another locating-device ID in a group to which the determination target (i.e., the locating device 2A) belongs and the corresponding determination segments. In operation S444, the determining unit 104 reads, in order of the segments, the existence regions subsequent to the determination segment of another locating device 2B. In operation S445, the determining unit 104 sets the segments as a set of determination source segments.

Figure 38:
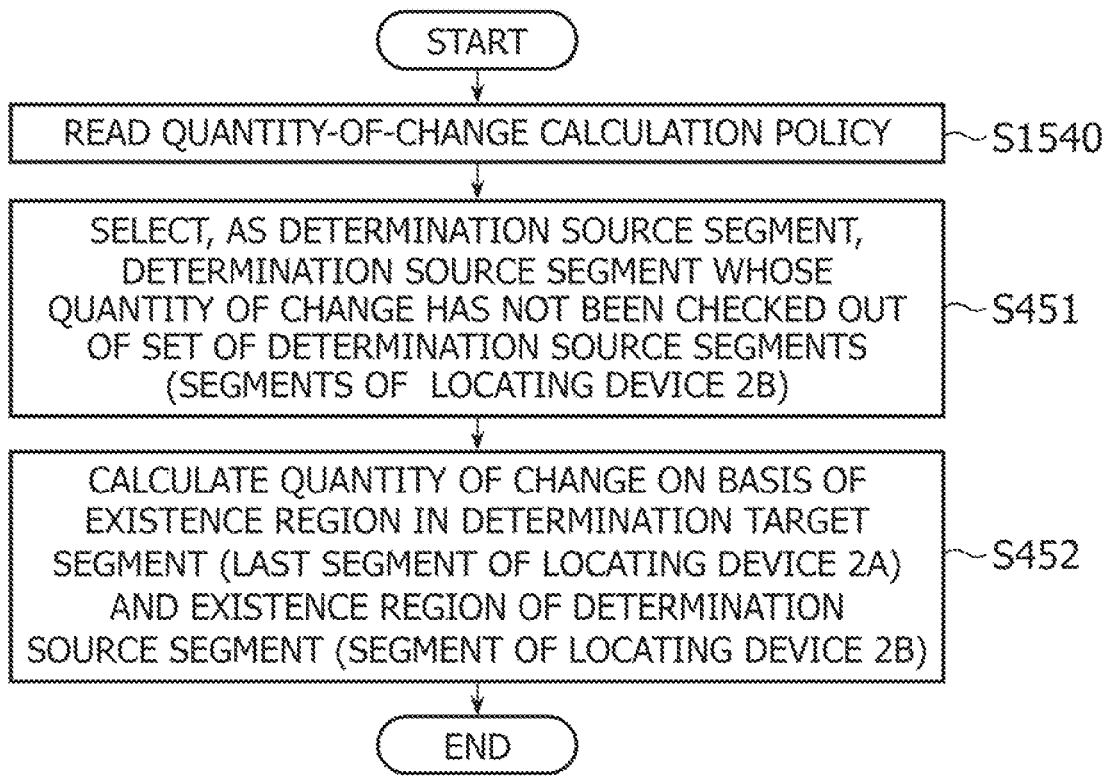
FIG. 38 is a flowchart illustrating a fifth example of a processing procedure for calculating a quantity of change.

FIG. 38 is a flowchart illustrating a fifth example of a processing procedure for calculating a quantity of change. In operation S1540, the determining unit 104 reads the quantity-of-change calculation policy from the policy storage unit 150. In operation S451, the determining unit 104 selects, as the determination source segment, a determination source segment whose quantity of change has not been checked out of the set of determination source segments (the segments of the locating device 2B). In operation S452, the determining unit 104 calculates a quantity of change on the basis of the existence region in the determination target segment (i.e., the last segment of the locating device 2A) and the existence region of the determination source segment (i.e., the segment of the locating device 2B).

Figure 39:
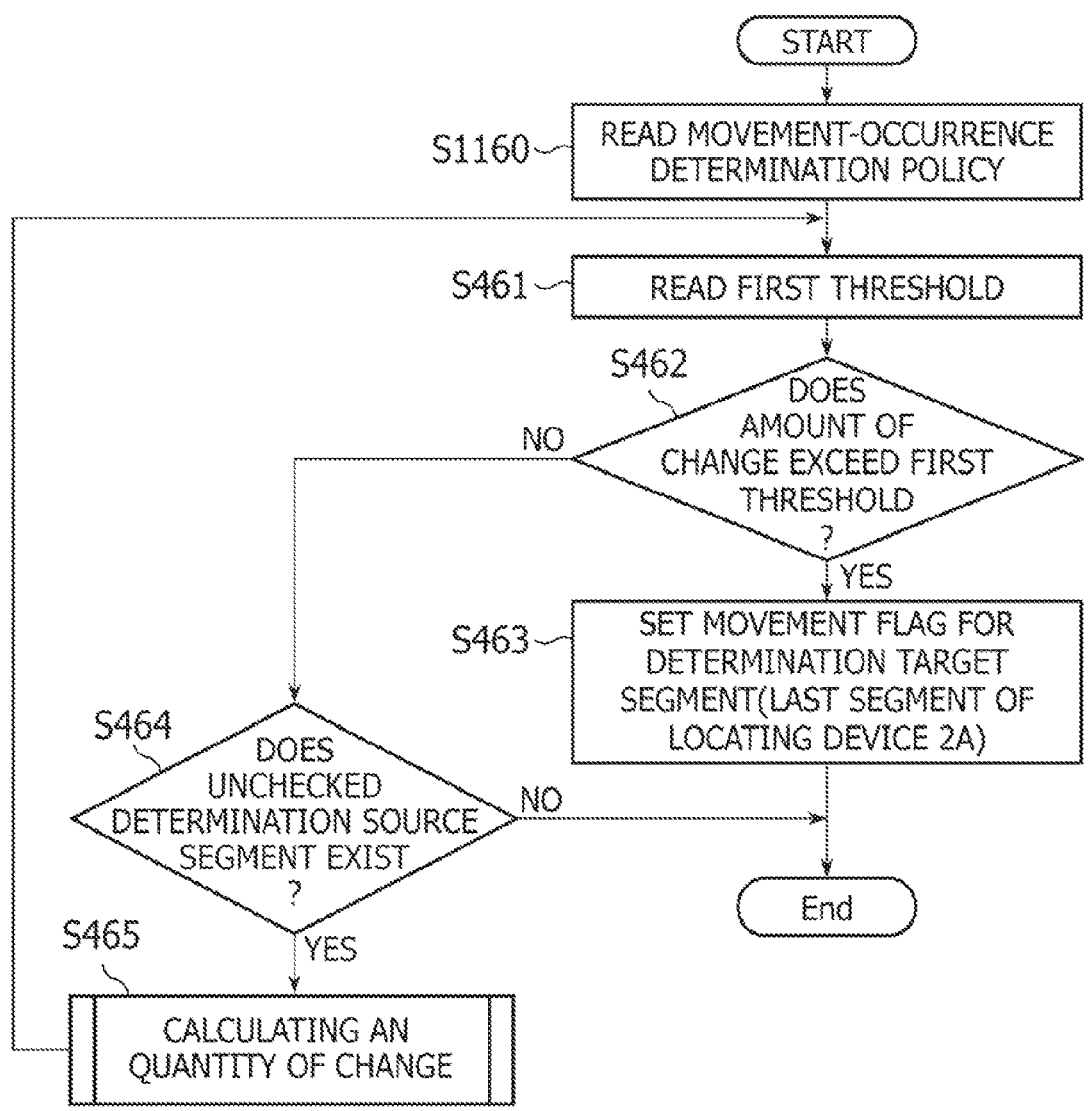
FIG. 39 is a flowchart illustrating a fourth example of a processing procedure for determining occurrence of a movement.

FIG. 39 is a flowchart illustrating a fourth example of a processing procedure for determining occurrence of a movement. In operation S1160, the determining unit 104 reads the movement-occurrence determination policy from the policy storage unit 150. In operation S461, the determining unit 104 reads a first threshold from the storage unit 15. In operation S462, the determining unit 104 determines whether or not the quantity of change exceeds the first threshold.

When the determining unit 104 determines that the quantity of change exceeds the first threshold (YES in operation S462), the process proceeds to operation S463 in which the determining unit 104 sets a movement flag for the last segment of the locating device 2A, i.e., the determination target segment. When the determining unit 104 determines that the quantity of change does not exceed the first threshold (NO in operation S462), the process proceeds to operation S464 in which the determining unit 104 determines whether or not any unchecked determination source segment exists.

When the determining unit 104 determines that no unchecked determination source segment exists (NO in operation S464), the processing ends. When the determining unit 104 determines that any unchecked determination source segment exists (YES in operation S464), the process proceeds to S465 in which the determining unit 104 calculates a quantity of change. After calculating a quantity of change ends, the process returns to operation S461. Processing may be repeatedly performed on the existence regions in other source segments. Subsequently, in the example of FIG. 31, the existence region B2 of the locating device 2B is used as the determination source segment to calculate a quantity of change between the existence region B2 and the existence region A3 of the last segment of the locating device 2A, i.e., the determination target segment.

As a result of the determining unit 104 repeatedly performing the above-described processing, the existence region A3 in the last segment of the locating device 2A and the existence regions B2 and B1 in the prior segments of the locating device 2B are compared with each other. After the processing in operation S463, the determining unit 104 ends the series of processing. FIG. 37 is different from FIG. 15 in how the determination source segment is selected, and it is easily understood that processing in FIGS. 38 and 39 is similar to the processing in FIGS. 16 and 17 from the comparison therebetween.

Figure 40:
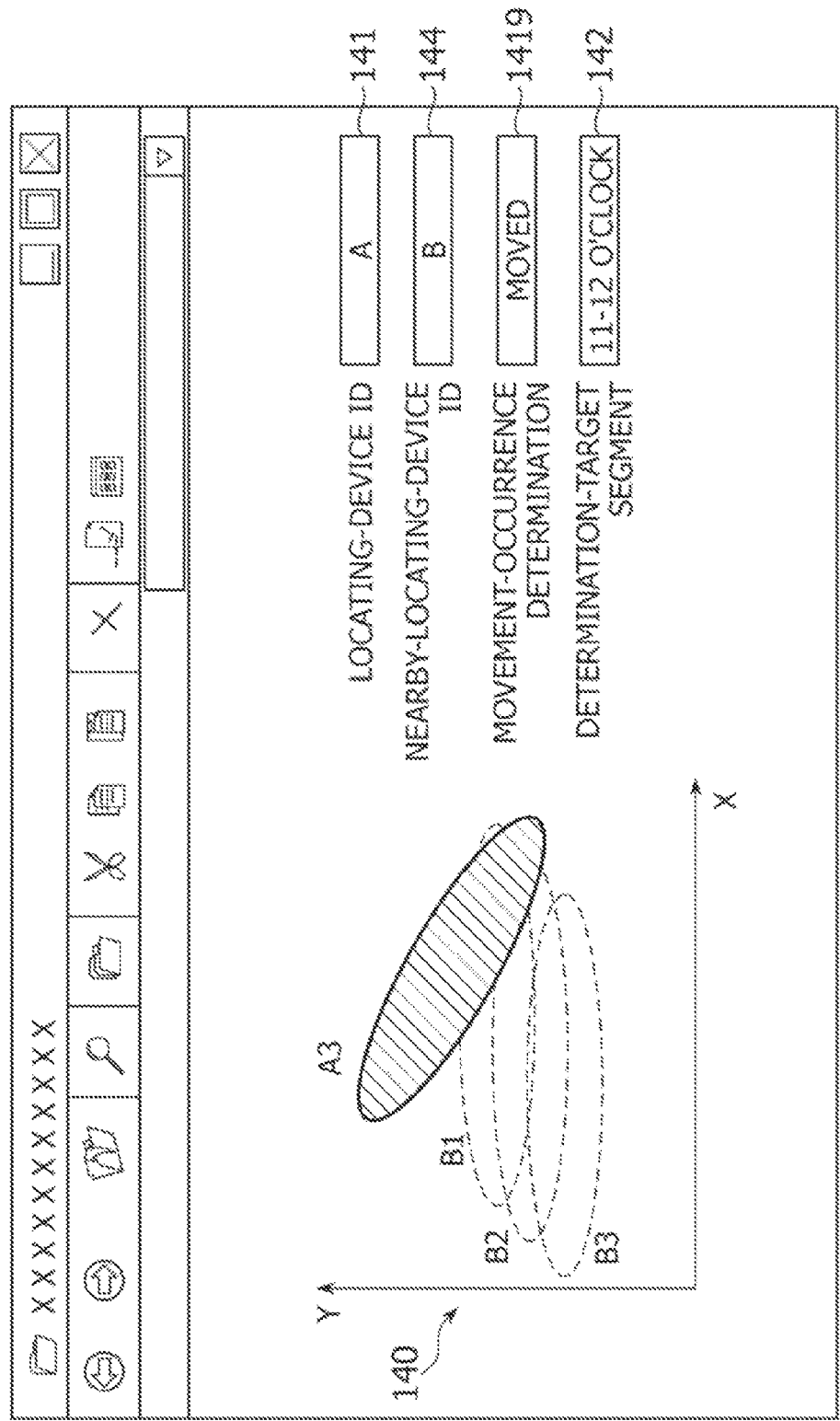
FIG. 40 illustrates a second example of a display image of determination results.

FIG. 40 illustrates a second example of a display image of determination results. The determining unit 104 displays, for example, on the display unit 14, a locating-device ID box 141, a determination-target-segment box 142, a movement-occurrence determination box 1419, a nearby-locating-device-ID box 144, a movement-change graph 140. When the determining unit 104 sets the movement flag in operation S463, it outputs a result onto the display unit 14. The determining unit 104 displays, on the display unit 14, the existence region of the locating device 2B, the existence region being read in operation S444. The determining unit 104 displays, on the display unit 14, the existence region of the locating device 2A in the segment for which the movement flag was set in operation S463. As illustrated in FIG. 40, the determining unit 104 renders the target regions on the movement-change graph 140 with the horizontal axis representing X coordinates and the vertical axis representing Y coordinates.

The determining unit 104 displays, on the movement-change graph 140, the read existence regions B1, B2, and B3 of the locating device 2B. In addition, the determining unit 104 also displays, on the movement-change graph 140 in a superimposed manner, the existence region A3 for which it is determined that the first locating device 2A moved. In this case, the determining unit 104 may display, in a manner distinguishable from the other existence regions, the existence region A3 for which it is determined that the first locating device 2A moved. In the example of FIG. 40, the existence regions B1 to B3 of the locating device 2B are indicated by dotted lines and the existence region A3 of the locating device 2A is indicated by hatching. The existence regions may be displayed in a distinguishable manner by using blinking or using different colors.

The determining unit 104 displays, in the locating-device ID box 141, the locating-device ID of the locating device 2A serving as the determination target. In the example of FIG. 40, the locating-device ID "A" is displayed in the locating-device ID box 141. The determining unit 104 reads, from the existence-region file 152, the segment for which it is determined that a movement occurred and for which the movement flag was set in operation S463 and displays the read segment in the determination-target-segment box 142. In the example of FIG. 40, a segment "11-12 o'clock" is displayed in the determination-target-segment box 142. When it is determined in operation S463 that a movement occurred, the determining unit 104 displays "moved" in the movement-occurrence determination box 1419. In addition, the determining unit 104 displays, in the nearby-locating-device-ID box 144, the locating-device ID of the nearby locating device 2B used for the comparison. The determining unit 104 displays, in the nearby-locating-device-ID box 144, the locating-device ID of the locating device 2B in the same group. In the example of FIG. 40, the locating-device ID "B" is displayed.

Although an example in which the determining unit 104 displays results on the display unit 14 has been described in the present embodiment, the configuration is not limited thereto. The determining unit 104 may also describe, for example, in HTML format, a document for generating the above-described display screen. When the determination apparatus 1 receives, from an external computer, a request for obtaining the document, the determination apparatus 1 reads the document from the storage unit 15 and transmits the document to the external computer via the communication unit 16. The external computer has a browser or other mechanism that displays the screen illustrated in FIG. 40. The determination apparatus 1 may also apply the result display illustrated in FIG. 40 to the eighth embodiment. With this arrangement, the operator or user who monitors the machine tool 3 may easily recognize the state of movement of the machine tool 3.

In addition, even when the determination apparatus 1 may not detect a movement between the existence regions of the locating device 2A, it is possible to accurately determine occurrence of the movement by using the existence regions of the nearby locating device 2B. When the system is configured so as to use the existence region of the locating device 2B instead of the existence of the locating device 2A, the segment in which the existence-region estimation that the locating device 2A needs to perform is only the last segment. In such a case, since the need for the measurement location of the locating device 2A in the segments prior to the last segment is filtered, it is possible to reduce the power consumed by the locating device 2A.

Since other configurations and processing of the ninth embodiment described above are substantially the same as those of the first to eighth embodiments, corresponding elements and operations are denoted by the same reference numerals and detailed descriptions thereof are not given hereinafter.

Tenth Embodiment

Figure 41:
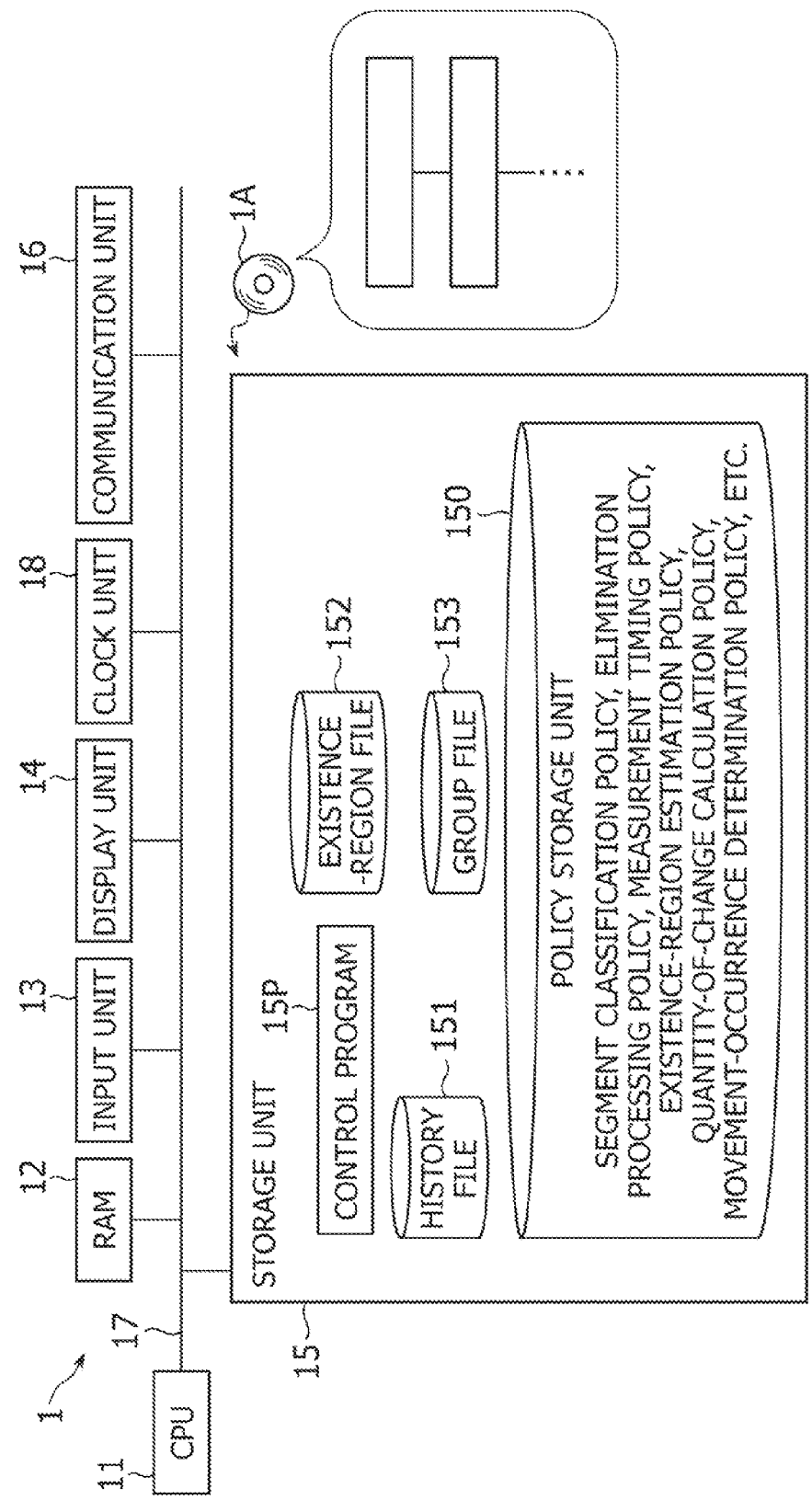
FIG. 41 is a diagram illustrating a third example of hardware of a determination apparatus.

FIG. 41 is a diagram illustrating a third example of hardware of the determination apparatus 1 according to a tenth embodiment. According to the tenth embodiment, a reader (not illustrated) may read, from a portable recording medium 1A such as a CD-ROM, a program for operating the determination apparatus 1 according to the first to ninth embodiments and may store the program in the storage unit 15. The program may also be downloaded from another determination apparatus (not illustrated) connected over a communications network, such as the Internet. Details of such an example will be described below.

The determination apparatus 1 illustrated in FIG. 41 downloads a program for executing various types of software processing described above from the portable recording medium 1A or another determination apparatus (not illustrated) over a communications network. The program is installed as the control program 15P, is loaded into the RAM 12, and is executed. Consequently, the above-described functions of the determination apparatus 1 are realized.

Since other configurations and processing of the tenth embodiment described above are substantially the same as those of the first to ninth embodiments, corresponding elements and operations are denoted by the same reference numerals and detailed descriptions thereof are not given hereinafter.

Eleventh Embodiment

Figure 42:
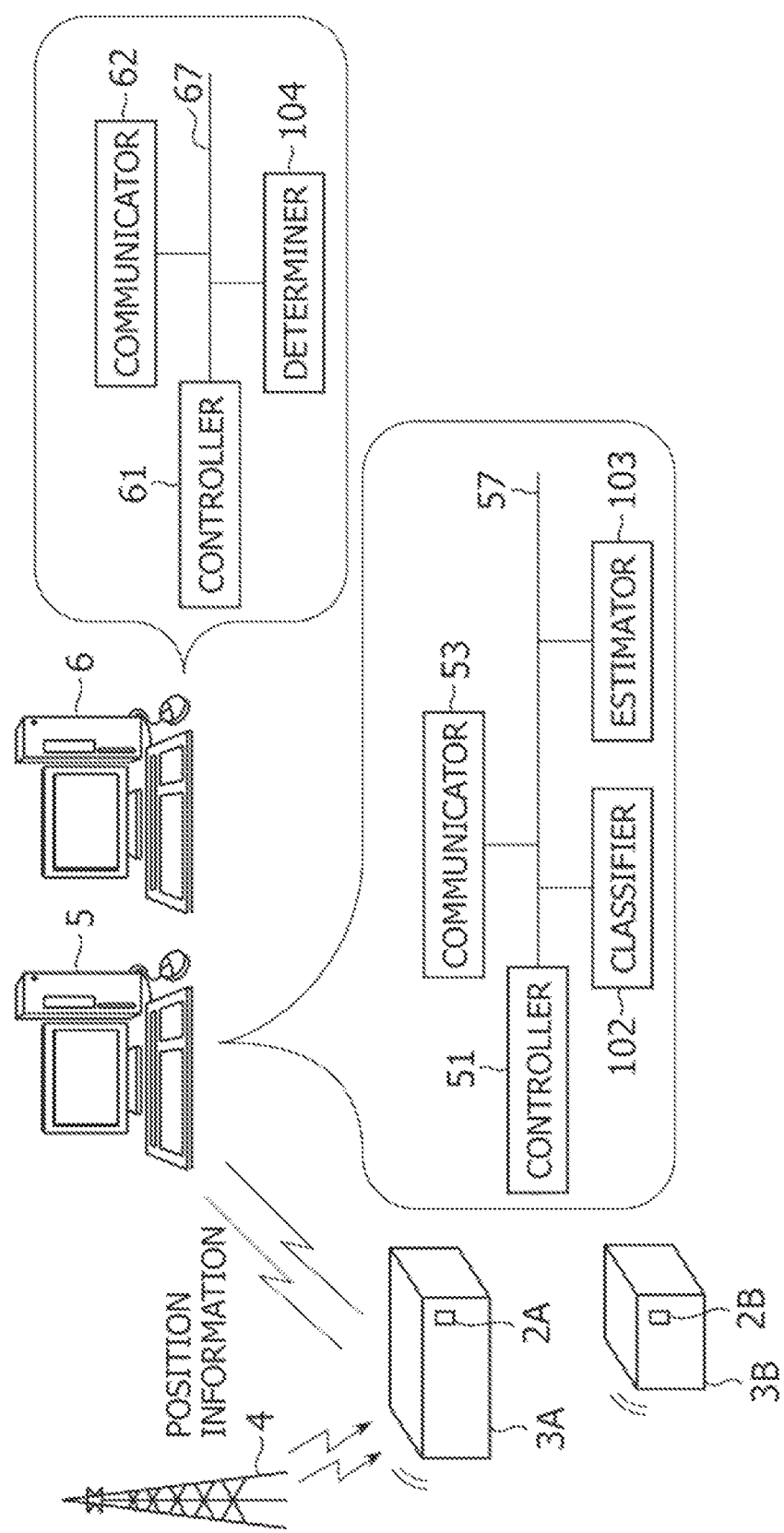
FIG. 42 illustrates a third example of a determination system.

An eleventh embodiment is directed to an embodiment in which the existence-region estimation and the movement-occurrence determination are executed by discrete apparatuses. FIG. 42 illustrates a third example of a determination system according to the eleventh embodiment. In the determination system, an estimation apparatus 5 and a determination apparatus 6 realize the functions of the determination apparatus 1 described in the first to tenth embodiments. The estimation apparatus 5 and the determination apparatus 6 are interconnected through a communications network, such as a LAN (local area network) or the Internet, or a near-field communications network for, for example, infrared or Bluetooth® communication.

The estimation apparatus 5 and the determination apparatus 6 may be placed in a facility, or the estimation apparatus 5 and the determination apparatus 6 may be placed in a facility and outside the facility, respectively. Alternatively, both of the estimation apparatus 5 and the determination apparatus 6 may be placed outside a facility. For example, the estimation apparatus 5 achieves functions for performing the above-described processing involving the position-information acquirement, the position-information classification, and the existence-region estimation of the determination apparatus 1. The hardware configuration of the estimation apparatus 5 is similar to the hardware configuration of the determination apparatus 1 illustrated in FIG. 4. Under the control of a CPU 11, the control program 15P stored in a storage unit 15 in the determination apparatus 5 is executed to achieve the functions of, for example, the acquiring unit 101, the classifying unit 102, and the estimating unit 103 illustrated in FIG. 5. Rather than execution of the control program 15P, a circuit for realizing the functions of the acquiring unit 101, the classifying unit 102, and the estimating unit 103 may also be integrated into the CPU 11.

The hardware configuration of the determination apparatus 6 is also similar to the hardware configuration of the determination apparatus 1 illustrated in FIG. 4. Under the control of a CPU 11, the control program 15P stored in a storage unit 15 in the determination apparatus 6 is executed to achieve the functions of the determining unit 104 illustrated in FIG. 5. Rather than execution of the control program 15P, a circuit for realizing the functions of the determining unit 104 may also be integrated into the CPU 11. This arrangement makes it possible to employ an arrangement in which the estimation apparatus 5 is placed in a facility such as a factory and the determination apparatus 6 is placed in a data center or the like outside the factory.

Since other configurations and processing of the eleventh embodiment described above are substantially the same as those of the first to tenth embodiments, corresponding elements and operations are denoted by the same reference numerals and detailed descriptions thereof are not given hereinafter.

Twelfth Embodiment

Figure 43:
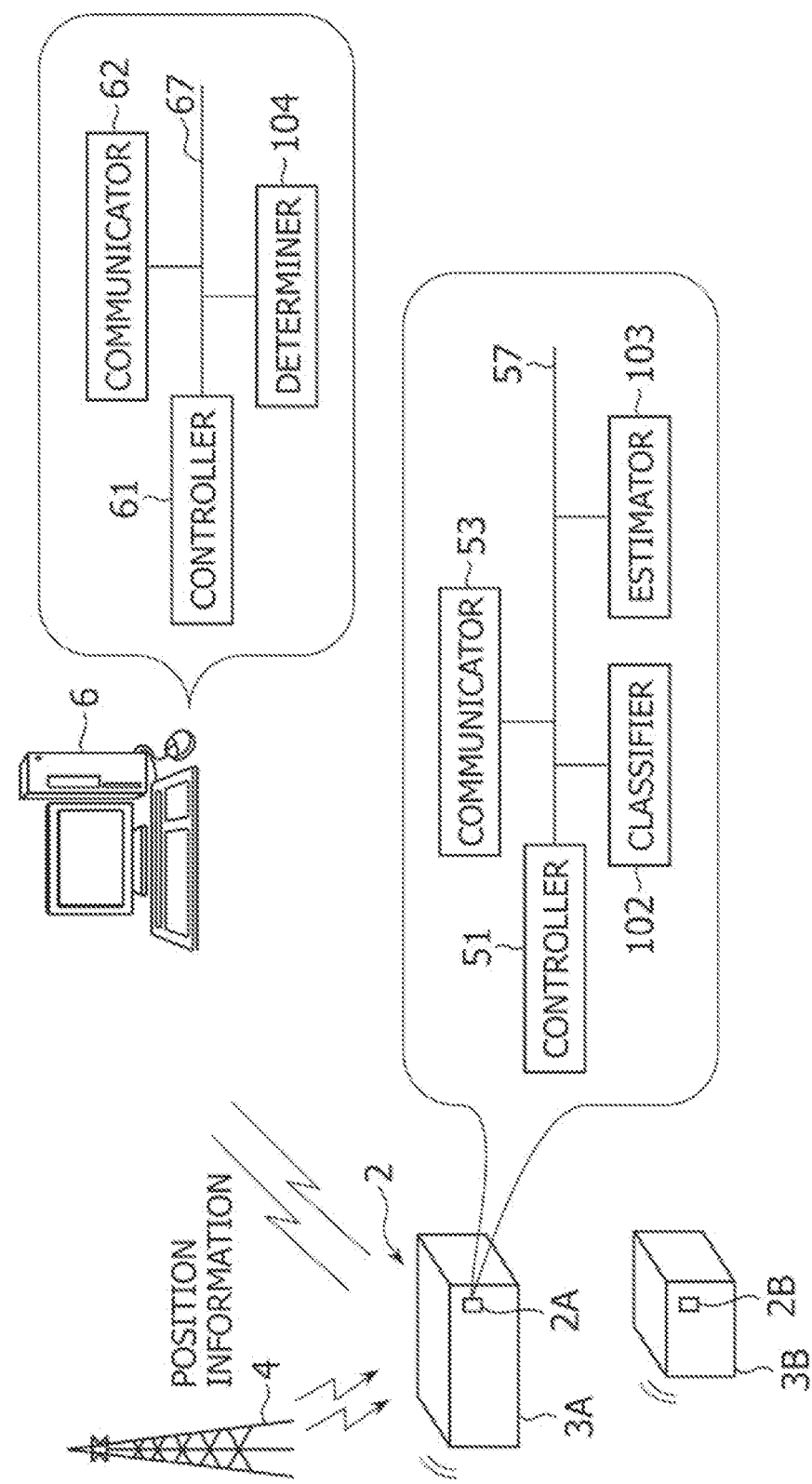
FIG. 43 illustrates a fourth example of a determination system.

The functions of the estimation apparatus 5 may be incorporated into the locating device 2. FIG. 43 illustrates a fourth example of a determination system according to a twelfth embodiment. This determination system includes the determination apparatus 6 and a locating device 2 into which the functions of the estimation apparatus 5 described in the eleventh embodiments incorporated. The locating device 2 and the determination apparatus 6 are interconnected through a communications network, such as a LAN or the Internet, or a near-field communications network for, for example, infrared or Bluetooth® communication. In the locating device 2, a communicator 53 that serves as both a position locator and an acquiring unit is coupled to a controller 51, in addition to the hardware of the estimation apparatus 5. The communicator 53 locates the locating device 2 in accordance with the segment classification policy and the measurement timing policy transmitted from the determination apparatus 6. The segment classification policy and the measurement timing policy may also be pre-stored in a memory (not illustrated) for the controller 51.

The communicator 53 outputs the date and time, the estimated coordinate points, and the error regions, sent from the controller 51, to the classifying unit 102. Processing after the outputting is analogous to the processing described in the eleventh embodiment, and thus a detailed description thereof is not given hereinafter. Incorporation of the existence-region estimation processing described above into the locating device 2 makes it possible to speed up the processing.

Since other configurations and processing of the twelfth embodiment described above are substantially the same as those of the first to eleventh embodiments, corresponding elements and operations are denoted by the same reference numerals and detailed descriptions thereof are not given hereinafter.

Thirteenth Embodiment

FIG. 44 illustrates a fifth example of an overview of a determination system according to a thirteenth embodiment. The determination apparatus 1 and the locating device 2 in the above-described embodiments may be combined to configure a determination apparatus 1. In this case, the determination apparatus 1 is attached to an object 3. The determination apparatus 1 may be implemented by a cellular phone, a PDA, a personal computer, or the like. A description in the present embodiment is given assuming that the determination apparatus 1 is a PDA 1. The PDA 1 includes a CPU 11, a RAM 12, an input unit 13, a display unit 14, a storage unit 15, a communicating unit 16 serving as an acquiring unit, and a clock unit 18. The communicating unit 16 is, for example, a GPS receiver, a radio communication module, or the like and obtains the estimated coordinate points and the error regions.

The communication unit 16 outputs the obtained estimated coordinate points and error regions to the CPU 11. When the CPU 11 detects a movement, it causes information of the segment in which the movement occurred to be displayed on the display unit 14. In addition, when the CPU 11 detects a movement, it may transmit information for identifying the PDA 1 and the information of the segment in which the movement occurred to an external computer via the communication unit 16. The information for identifying the PDA 1 may be, for example, a MAC (media access control) address of the PDA 1 or the communication unit 16 or a pre-assigned ID. When the determination apparatus 1 is implemented by a personal computer, the communication unit 16 may be implemented by a wireless LAN card or a GPS sensor that is connectable to a communication port, such as a USB (universal serial bus) port. Since other elements and operations are similar to those described in the above embodiments, detailed descriptions thereof are not given hereinafter. As described above, the position-information acquirement, the existence-region estimation, and the movement-occurrence determination may be executed by one determination apparatus 1.

Since other configurations and processing of the thirteenth embodiment described above are substantially the same as those of the first to twelfth embodiments, corresponding elements and operations are denoted by the same reference numerals and detailed descriptions thereof are not given hereinafter.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present inventions have been described in detail, it should be understood that the various changes, substitutions, and alterations could be made hereto without departing from the spirit and scope of the invention.

What is claimed is:

1. A movement determination apparatus comprising:
a memory; and
a processor coupled to the memory, the processor configured to
  acquire an error region in which an object is likely to exist or an estimated coordinate point at which the object is estimated to exist,
  classify the acquired error region or the acquired estimated coordinate point into a plurality of measurement segments,
  estimate existence regions of the object in the plurality of measurement segments, on a basis of the classified plurality of the acquired error region or the acquired estimated coordinate point,
  calculate a quantity of change between a first existence region and a second existence region of the existence regions based on coordinate points and shapes of the first existence region and the second existence region, and
  determine movement of the object position by comparing the existence regions based on the quantity of change.

2. The movement determination apparatus according to claim 1, wherein the processor is further configured to:
determine whether or not the quantity of change exceeds a first threshold, and
determine the movement of the object position when it is determined that the quantity of change exceeds the first threshold.

3. The movement determination apparatus according to claim 2, wherein the processor is further configured to:
determine whether or not the quantity of change exceeds a second threshold that is less than the first threshold,
count a number of times it is determined that the quantity of change exceeds the second threshold,
determine whether or not the counted number of times exceeds a third threshold, and
determine the movement of the object position when it is determined that the counted number of times exceeds the third threshold.

4. The movement determination apparatus according to claim 1, wherein the processor is further configured to:
calculate a first quantity of change between the coordinate points of the first existence region and the second existence region,
calculate a difference between the shapes of the first existence region and the second existence region, and
calculate the quantity of change based on the calculated first quantity of change and the calculated difference.

5. The movement determination apparatus according to claim 1, wherein the processor is further configured to:
acquire, periodically, a plurality of position information of a plurality of objects;
classify the plurality of position information of the plurality of objects into plurality of measurement segments for the corresponding objects;
estimate existence regions of the objects in the plurality of measurement segments for the corresponding objects, on a basis of the classified plurality of position information; and
obtain the existence region of a first one of the objects and the existence region of a second one of the objects and determines whether the second object exists in proximity to the first object or not exists in the proximity to the first object by comparing the existence region of the first object with the existence region of the second object.

6. A non-transitory computer readable recording medium which stores a movement determination program causing a computer to perform a process comprising:
acquiring an error region in which an object is likely to exist or an estimated coordinate point at which the object is estimated to exist,
classifying the acquired error region or the acquired estimated coordinate point into a plurality of measurement segments;
estimating existence regions of the object in the plurality of measurement segments, on a basis of the classified plurality of the acquired error region or the acquired estimated coordinate point;
calculating a quantity of change between a first existence region and a second existence region of the existence regions based on coordinate points and shapes of the first existence region and the second existence region; and
determining movement of the object position by comparing the existence regions based on the quantity of change.

7. The non-transitory computer readable recording medium according to claim 6, wherein:
the determining includes:
determining whether or not the quantity of change exceeds a first threshold; and
determining the movement of the object position when it is determined that the quantity of change exceeds the first threshold.

8. The non-transitory computer readable recording medium according to claim 7, wherein the determining further includes:
determining whether or not the quantity of change exceeds a second threshold that is smaller than the first threshold;
determining whether or not the number of times it is determined that the quantity of change exceeds the second threshold exceeds a third threshold; and
determining the movement of the object position when it is determined that the number of times exceeds the third threshold.

9. The non-transitory computer readable recording medium according to claim 6, wherein the calculating includes:
calculating a first quantity of change between the coordinate points of the first existence region and the second existence region;
calculating a difference between the shapes of the first existence region and the second existence region; and
calculating the quantity of change on a basis of the first quantity of change and the difference.

10. The non-transitory computer readable recording medium according to claim 6, the process further comprising:
acquiring, periodically, a plurality of position information of a plurality of objects;
classifying the plurality of position information of the plurality of objects into the plurality of measurement segments for the corresponding objects; and
estimating the plurality of measurement segments for the corresponding objects on a basis of the classified plurality of position information;
obtaining the existence region of a first one of the objects and the existence region of a second one of the objects; and
determining whether or not the second object exists in proximity to the first object by comparing the existence region of the first object with the existence region of the second object.

11. A movement determination method comprising:
acquiring, using a processor, an error region in which an object is likely to exist or an estimated coordinate point at which the object is estimated to exist,
classifying, using the processor, the acquired error region or the acquired estimated coordinate point into a plurality of measurement segments;
estimating, using the processor, existence regions of the object in the plurality of measurement segments, on a basis of the classified plurality of the acquired error region or the acquired estimated coordinate point; and
calculating, using the processor, a quantity of change between a first existence region and a second existence region of the existence regions based on coordinate points and shapes of the first existence region and the second existence region; and
determining, using the processor, whether or not the object moved, by comparing the existence regions based on the quantity of change.

12. The movement determination method according to claim 11, wherein:
the determining includes:
determining whether or not the quantity of change exceeds a first threshold; and
determining the movement of the object position when it is determined that the quantity of change exceeds the first threshold.

13. The movement determination method according to claim 11, wherein the calculating includes:
calculating a first quantity of change between the coordinate points of the first existence region and the second existence region;
calculating a difference between the shapes of the first existence region and the second existence region; and
calculating the quantity of change on a basis of the first quantity of change and the difference.

14. The movement determination method according to claim 12, wherein the determining further includes:
determining whether or not the quantity of change exceeds a second threshold that is smaller than the first threshold;
determining whether or not the number of times it is determined that the quantity of change exceeds the second threshold exceeds a third threshold; and
determining the movement of the object position when it is determined that the number of times exceeds the third threshold.

15. The movement determination method according to claim 11, further comprising
acquiring, periodically, a plurality of position information of a plurality of objects;
classifying the plurality of position information of the plurality of objects into a plurality of measurement segments for the corresponding objects; and
estimating the plurality of measurement segments for the corresponding objects on a basis of the classified plurality of position information;
obtaining the existence region of a first one of the objects and the existence region of a second one of the objects; and
determining whether or not the second object exists in proximity to the first object by comparing the existence region of the first object with the existence region of the second object.

16. The movement determination method according to claim 11, wherein
the calculating includes calculating the quantity of change on the basis of a ratio of the first existence region, the second existence region and an overlapping region of the first existence region and the second existence region.

17. The movement determination apparatus according to claim 1, wherein the processor is configured to calculate the quantity of change by using at least one of a statistical method and a geometric method.

18. The movement determination apparatus according to claim 1, wherein the processor is configured to determine the movement of the object position by comparing the quantity of change to a plurality of thresholds.

* * * * *